United States Patent
Sanghavi et al.

(10) Patent No.: US 12,001,933 B2
(45) Date of Patent: *Jun. 4, 2024

(54) VIRTUAL ASSISTANT IN A COMMUNICATION SESSION

(71) Applicant: Apple Inc., Cupertino, CA (US)

(72) Inventors: Mehul K. Sanghavi, San Jose, CA (US); Jeffrey P. Schwerdtfeger, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,512

(22) Filed: Sep. 21, 2022

(65) Prior Publication Data

US 2023/0017115 A1    Jan. 19, 2023

Related U.S. Application Data

(63) Continuation of application No. 16/595,108, filed on Oct. 7, 2019, now Pat. No. 11,468,282, which is a
(Continued)

(51) Int. Cl.
*G06N 20/00* (2019.01)
*G06F 40/30* (2020.01)
(Continued)

(52) U.S. Cl.
CPC .............. *G06N 3/006* (2013.01); *G06F 40/30* (2020.01); *G06F 40/35* (2020.01); *G06Q 10/10* (2013.01); *H04L 51/02* (2013.01); *H04L 51/212* (2022.05)

(58) Field of Classification Search
CPC ....... G06N 3/006; H04L 51/212; H04L 51/02; G06Q 10/10
See application file for complete search history.

(56) References Cited

U.S. PATENT DOCUMENTS 8,090,571 B2   1/2012  Elshishiny et al.
8,095,364 B2   1/2012  Longe et al.
(Continued)

FOREIGN PATENT DOCUMENTS

AU    2014100581 B4   9/2014
AU    2015203483 A1   7/2015
(Continued)

OTHER PUBLICATIONS

Notice of Allowance received for U.S. Appl. No. 17/158,703, mailed on Jun. 7, 2023, 7 pages.
(Continued)

*Primary Examiner* — Paulinho E Smith
(74) *Attorney, Agent, or Firm* — DLA Piper LLP (US)

(57) ABSTRACT

Disclosed are techniques for utilizing a virtual assistant as part of a communication session. One or more of the participant users can select to utilize a virtual assistant to assist the participant users with tasks during the communication session. A user can use a communication application to enter a message directed to the virtual assistant. The virtual assistant can analyze the entered message and determine that the message was directed to the virtual assistant. As a result, the virtual assistant will assist the user with the identified task. A virtual assistant can assist a user with a variety of different tasks. For example, the virtual assistant can gather requested data for the user from one or more web servers, such as weather data, traffic data, etc.

54 Claims, 19 Drawing Sheets

Related U.S. Application Data continuation of application No. 14/713,410, filed on May 15, 2015, now Pat. No. 10,460,227.

(51) Int. Cl.
| | |
|---|---|
| *G06F 40/35* | (2020.01) |
| *G06N 3/00* | (2023.01) |
| *G06N 3/006* | (2023.01) |
| *G06Q 10/10* | (2023.01) |
| *H04L 51/02* | (2022.01) |
| *H04L 51/212* | (2022.01) |

(56) References Cited

U.S. PATENT DOCUMENTS

| | | | |
|---|---|---|---|
| 8,099,289 | B2 | 1/2012 | Mozer et al. |
| 8,099,395 | B2 | 1/2012 | Pabla et al. |
| 8,099,418 | B2 | 1/2012 | Inoue et al. |
| 8,103,510 | B2 | 1/2012 | Sato |
| 8,103,947 | B2 | 1/2012 | Lunt et al. |
| 8,107,401 | B2 | 1/2012 | John et al. |
| 8,112,275 | B2 | 2/2012 | Kennewick et al. |
| 8,112,280 | B2 | 2/2012 | Lu |
| 8,115,772 | B2 | 2/2012 | Ostermann et al. |
| 8,117,026 | B2 | 2/2012 | Lee et al. |
| 8,117,037 | B2 | 2/2012 | Gazdzinski |
| 8,117,542 | B2 | 2/2012 | Radtke et al. |
| 8,121,413 | B2 | 2/2012 | Hwang et al. |
| 8,121,837 | B2 | 2/2012 | Agapi et al. |
| 8,122,094 | B1 | 2/2012 | Kotab |
| 8,122,353 | B2 | 2/2012 | Bouta |
| 8,130,929 | B2 | 3/2012 | Wilkes et al. |
| 8,131,556 | B2 | 3/2012 | Barton et al. |
| 8,131,557 | B2 | 3/2012 | Davis et al. |
| 8,135,115 | B1 | 3/2012 | Hogg, Jr. et al. |
| 8,138,912 | B2 | 3/2012 | Singh et al. |
| 8,140,330 | B2 | 3/2012 | Cevik et al. |
| 8,140,335 | B2 | 3/2012 | Kennewick et al. |
| 8,140,368 | B2 | 3/2012 | Eggenberger et al. |
| 8,140,567 | B2 | 3/2012 | Padovitz et al. |
| 8,145,489 | B2 | 3/2012 | Freeman et al. |
| 8,150,694 | B2 | 4/2012 | Kennewick et al. |
| 8,150,700 | B2 | 4/2012 | Shin et al. |
| 8,155,956 | B2 | 4/2012 | Cho et al. |
| 8,156,005 | B2 | 4/2012 | Vieri |
| 8,156,060 | B2 | 4/2012 | Borzestowski et al. |
| 8,160,877 | B1 | 4/2012 | Nucci et al. |
| 8,160,883 | B2 | 4/2012 | Lecoeuche |
| 8,165,321 | B2 | 4/2012 | Paquier et al. |
| 8,165,886 | B1 | 4/2012 | Gagnon et al. |
| 8,166,019 | B1 | 4/2012 | Lee et al. |
| 8,166,032 | B2 | 4/2012 | Sommer et al. |
| 8,170,790 | B2 | 5/2012 | Lee et al. |
| 8,170,966 | B1 | 5/2012 | Musat et al. |
| 8,171,137 | B1 | 5/2012 | Parks et al. |
| 8,175,872 | B2 | 5/2012 | Kristjansson et al. |
| 8,175,876 | B2 | 5/2012 | Bou-ghazale et al. |
| 8,179,370 | B1 | 5/2012 | Yamasani et al. |
| 8,188,856 | B2 | 5/2012 | Singh et al. |
| 8,190,359 | B2 | 5/2012 | Bourne |
| 8,190,596 | B2 | 5/2012 | Nambiar et al. |
| 8,194,827 | B2 | 6/2012 | Jaiswal et al. |
| 8,195,467 | B2 | 6/2012 | Mozer et al. |
| 8,195,468 | B2 | 6/2012 | Weider et al. |
| 8,200,489 | B1 | 6/2012 | Baggenstoss |
| 8,200,495 | B2 | 6/2012 | Braho et al. |
| 8,201,109 | B2 | 6/2012 | Van Os et al. |
| 8,204,238 | B2 | 6/2012 | Mozer |
| 8,204,751 | B1 | 6/2012 | Di et al. |
| 8,205,788 | B1 | 6/2012 | Gazdzinski et al. |
| 8,209,177 | B2 | 6/2012 | Sakuma et al. |
| 8,209,183 | B1 | 6/2012 | Patel et al. |
| 8,213,911 | B2 | 7/2012 | Williams et al. |
| 8,219,115 | B1 | 7/2012 | Nelissen |
| 8,219,406 | B2 | 7/2012 | Yu et al. |
| 8,219,407 | B1 | 7/2012 | Roy et al. |
| 8,219,555 | B1 | 7/2012 | Mianji |
| 8,219,608 | B2 | 7/2012 | alSafadi et al. |
| 8,224,649 | B2 | 7/2012 | Chaudhari et al. |
| 8,224,757 | B2 | 7/2012 | Bohle |
| 8,228,299 | B1 | 7/2012 | Maloney et al. |
| 8,233,919 | B2 | 7/2012 | Haag et al. |
| 8,234,111 | B2 | 7/2012 | Lloyd et al. |
| 8,239,206 | B1 | 8/2012 | LeBeau et al. |
| 8,239,207 | B2 | 8/2012 | Seligman et al. |
| 8,244,545 | B2 | 8/2012 | Paek et al. |
| 8,244,712 | B2 | 8/2012 | Serlet et al. |
| 8,250,071 | B1 | 8/2012 | Killalea et al. |
| 8,254,829 | B1 | 8/2012 | Kindred et al. |
| 8,255,216 | B2 | 8/2012 | White |
| 8,255,217 | B2 | 8/2012 | Stent et al. |
| 8,260,117 | B1 | 9/2012 | Xu et al. |
| 8,260,247 | B2 | 9/2012 | Lazaridis et al. |
| 8,260,617 | B2 | 9/2012 | Dhanakshirur et al. |
| 8,260,619 | B1 | 9/2012 | Bansal et al. |
| 8,270,933 | B2 | 9/2012 | Riemer et al. |
| 8,271,287 | B1 | 9/2012 | Kermani |
| 8,275,621 | B2 | 9/2012 | Alewine et al. |
| 8,275,736 | B2 | 9/2012 | Guo et al. |
| 8,279,171 | B2 | 10/2012 | Hirai et al. |
| 8,280,438 | B2 | 10/2012 | Barbera |
| 8,285,546 | B2 | 10/2012 | Reich |
| 8,285,551 | B2 | 10/2012 | Gazdzinski |
| 8,285,553 | B2 | 10/2012 | Gazdzinski |
| 8,285,737 | B1 | 10/2012 | Lynn et al. |
| 8,290,274 | B2 | 10/2012 | Mori et al. |
| 8,290,777 | B1 | 10/2012 | Nguyen et al. |
| 8,290,778 | B2 | 10/2012 | Gazdzinski |
| 8,290,781 | B2 | 10/2012 | Gazdzinski |
| 8,296,124 | B1 | 10/2012 | Holsztynska et al. |
| 8,296,145 | B2 | 10/2012 | Clark et al. |
| 8,296,146 | B2 | 10/2012 | Gazdzinski |
| 8,296,153 | B2 | 10/2012 | Gazdzinski |
| 8,296,380 | B1 | 10/2012 | Kelly et al. |
| 8,296,383 | B2 | 10/2012 | Lindahl |
| 8,300,776 | B2 | 10/2012 | Davies et al. |
| 8,300,801 | B2 | 10/2012 | Sweeney et al. |
| 8,301,456 | B2 | 10/2012 | Gazdzinski |
| 8,311,189 | B2 | 11/2012 | Champlin et al. |
| 8,311,834 | B1 | 11/2012 | Gazdzinski |
| 8,311,835 | B2 | 11/2012 | Lecoeuche |
| 8,311,838 | B2 | 11/2012 | Lindahl et al. |
| 8,312,017 | B2 | 11/2012 | Martin et al. |
| 8,321,786 | B2 | 11/2012 | Lunati |
| 8,326,627 | B2 | 12/2012 | Kennewick et al. |
| 8,332,205 | B2 | 12/2012 | Krishnan et al. |
| 8,332,218 | B2 | 12/2012 | Cross, Jr. et al. |
| 8,332,224 | B2 | 12/2012 | Di Cristo et al. |
| 8,332,748 | B1 | 12/2012 | Karam |
| 8,335,689 | B2 | 12/2012 | Wittenstein et al. |
| 8,340,975 | B1 | 12/2012 | Rosenberger |
| 8,345,665 | B2 | 1/2013 | Vieri et al. |
| 8,346,563 | B1 | 1/2013 | Hjelm et al. |
| 8,346,757 | B1 | 1/2013 | Lamping et al. |
| 8,352,183 | B2 | 1/2013 | Thota et al. |
| 8,352,268 | B2 | 1/2013 | Naik et al. |
| 8,352,272 | B2 | 1/2013 | Rogers et al. |
| 8,355,919 | B2 | 1/2013 | Silverman et al. |
| 8,359,234 | B2 | 1/2013 | Vieri |
| 8,370,145 | B2 | 2/2013 | Endo et al. |
| 8,370,158 | B2 | 2/2013 | Gazdzinski |
| 8,371,503 | B2 | 2/2013 | Gazdzinski |
| 8,374,871 | B2 | 2/2013 | Ehsani et al. |
| 8,375,320 | B2 | 2/2013 | Kotler et al. |
| 8,380,504 | B1 | 2/2013 | Peden et al. |
| 8,380,507 | B2 | 2/2013 | Herman et al. |
| 8,381,107 | B2 | 2/2013 | Rottler et al. |
| 8,381,135 | B2 | 2/2013 | Hotelling et al. |
| 8,386,485 | B2 | 2/2013 | Kerschberg et al. |
| 8,386,926 | B1 | 2/2013 | Matsuoka et al. |
| 8,391,844 | B2 | 3/2013 | Novick et al. |
| 8,392,717 | B2 | 3/2013 | Chai et al. |
| 8,396,295 | B2 | 3/2013 | Gao et al. |
| 8,396,714 | B2 | 3/2013 | Rogers et al. |

(56) References Cited

U.S. PATENT DOCUMENTS

| | | |
|---|---|---|
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,473,289 B2 | 6/2013 | Jitkoff et al. |
| 8,473,485 B2 | 6/2013 | Wong et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,670 B2 | 7/2013 | Cha et al. |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1 | 8/2013 | Lloyd et al. |
| 8,521,531 B1 | 8/2013 | Kim |
| 8,521,533 B1 | 8/2013 | Ostermann et al. |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,577,683 B2 | 11/2013 | Dewitt |
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,161 B2 | 11/2013 | Kennewick et al. |
| 8,589,374 B2 | 11/2013 | Chaudhri |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda et al. |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B2 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,273 B1 | 3/2014 | Fujisaki |
| 8,676,583 B2 | 3/2014 | Gupta et al. |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,341 B1 | 7/2014 | Commons |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,684 B1 | 8/2014 | Aleksic et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,825,474 B1 | 9/2014 | Zhai et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,111 B1 | 10/2014 | Kahn et al. |
| 8,868,409 B1 | 10/2014 | Mengibar et al. |
| 8,868,431 B2 | 10/2014 | Yamazaki et al. |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |

(56) References Cited

U.S. PATENT DOCUMENTS

| | | |
|---|---|---|
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,964,947 B1 | 2/2015 | Noolu et al. |
| 8,965,770 B2 | 2/2015 | Petrushin |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,550 B2 | 3/2015 | Ko et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-jefri et al. |
| 9,043,208 B2 | 5/2015 | Koch et al. |
| 9,043,211 B2 | 5/2015 | Haiut et al. |
| 82 A1 | 6/2015 | Jitkoff et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,075,824 B2 | 7/2015 | Gordo et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,092,789 B2 | 7/2015 | Anshul |
| 9,094,576 B1 | 7/2015 | Karakotsios |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,212 B2 | 8/2015 | Sheets et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,172,747 B2 | 10/2015 | Walters et al. |
| 9,183,845 B1 | 11/2015 | Gopalakrishnan et al. |
| 9,190,062 B2 | 11/2015 | Haughay |
| 9,196,245 B2 | 11/2015 | Larcheveque et al. |
| 9,201,955 B1 | 12/2015 | Quintao et al. |
| 9,202,520 B1 | 12/2015 | Tang |
| 9,208,153 B1 | 12/2015 | Zaveri et al. |
| 9,213,754 B1 | 12/2015 | Zhan et al. |
| 9,218,122 B2 | 12/2015 | Thoma et al. |
| 9,218,809 B2 | 12/2015 | Bellegard et al. |
| 9,218,819 B1 | 12/2015 | Stekkelpa et al. |
| 9,223,537 B2 | 12/2015 | Brown et al. |
| 9,230,561 B2 | 1/2016 | Ostermann et al. |
| 9,232,293 B1 | 1/2016 | Hanson |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,250,703 B2 | 2/2016 | Hernandez-Abrego et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,257,120 B1 | 2/2016 | Alvarez Guevara et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,274,598 B2 | 3/2016 | Beymer et al. |
| 9,280,535 B2 | 3/2016 | Varma et al. |
| 9,282,211 B2 | 3/2016 | Osawa |
| 9,286,727 B2 | 3/2016 | Kim et al. |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 * | 5/2016 | Van Os .......... H04N 21/4122 |
| 9,342,829 B2 | 5/2016 | Zhou et al. |
| 9,342,930 B1 | 5/2016 | Kraft et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,400,779 B2 | 7/2016 | Convertino et al. |
| 9,401,140 B1 | 7/2016 | Weber et al. |
| 9,401,147 B2 | 7/2016 | Jitkoff et al. |
| 9,405,741 B1 | 8/2016 | Schaaf et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |

(56) References Cited

U.S. PATENT DOCUMENTS

| | | |
|---|---|---|
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,294 B1 | 10/2016 | Tunstall-pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,485,286 B1 | 11/2016 | Sellier et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,575,964 B2 | 2/2017 | Yadgar et al. |
| 9,576,575 B2 | 2/2017 | Heide |
| 9,578,173 B2 | 2/2017 | Sanghavi et al. |
| 9,584,946 B1 | 2/2017 | Lyren et al. |
| 9,586,318 B2 | 3/2017 | Djugash et al. |
| 9,602,946 B2 | 3/2017 | Karkkainen et al. |
| 9,607,612 B2 | 3/2017 | Deleeuw |
| 9,612,999 B2 | 4/2017 | Prakah-asante et al. |
| 9,619,200 B2 | 4/2017 | Chakladar et al. |
| 9,619,459 B2 | 4/2017 | Hebert et al. |
| 9,620,113 B2 | 4/2017 | Kennewick et al. |
| 9,620,126 B2 | 4/2017 | Chiba |
| 9,626,695 B2 | 4/2017 | Balasubramanian et al. |
| 9,626,799 B2 | 4/2017 | McArdle et al. |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,646,313 B2 | 5/2017 | Kim et al. |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 * | 5/2017 | Lynch ............... H04M 3/4938 |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,690,542 B2 | 6/2017 | Reddy et al. |
| 9,691,161 B1 | 6/2017 | Yalniz et al. |
| 9,691,378 B1 | 6/2017 | Meyers et al. |
| 9,696,963 B2 | 7/2017 | Son et al. |
| 9,697,016 B2 | 7/2017 | Jacob |
| 9,697,822 B1 | 7/2017 | Naik et al. |
| 9,697,827 B1 | 7/2017 | Lilly et al. |
| 9,697,828 B1 | 7/2017 | Prasad et al. |
| 9,698,999 B2 | 7/2017 | Mutagi |
| 9,711,148 B1 | 7/2017 | Sharifi et al. |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,824,692 B1 | 11/2017 | Khoury et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,911,415 B2 | 3/2018 | Vanblon et al. |
| 9,916,839 B1 | 3/2018 | Scalise et al. |
| 9,922,642 B2 | 3/2018 | Pitschel et al. |
| 9,928,835 B1 | 3/2018 | Tang |
| 9,934,777 B1 | 4/2018 | Joseph et al. |
| 9,934,785 B1 | 4/2018 | Hulaud |
| 9,946,862 B2 | 4/2018 | Yun et al. |
| 9,948,728 B2 | 4/2018 | Linn et al. |
| 9,959,129 B2 | 5/2018 | Kannan et al. |
| 9,959,506 B1 | 5/2018 | Karppanen |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,990,921 B2 | 6/2018 | Vanblon et al. |
| 9,990,926 B1 | 6/2018 | Pearce |
| 9,996,626 B1 | 6/2018 | Bailey et al. |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,025,378 B2 | 7/2018 | Venable et al. |
| 10,026,209 B1 | 7/2018 | Dagley et al. |
| 10,027,662 B1 | 7/2018 | Mutagi et al. |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,049,161 B2 | 8/2018 | Kaneko |
| 10,049,663 B2 | 8/2018 | Orr et al. |
| 10,049,668 B2 | 8/2018 | Huang et al. |

(56) References Cited

U.S. PATENT DOCUMENTS

| | | |
|---|---|---|
| 10,055,390 B2 | 8/2018 | Sharifi et al. |
| 10,055,681 B2 | 8/2018 | Brown et al. |
| 10,068,570 B2 | 9/2018 | Dai et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,134,425 B1 | 11/2018 | Johnson, Jr. |
| 10,135,965 B2 | 11/2018 | Woolsey et al. |
| 10,146,923 B2 | 12/2018 | Pitkänen et al. |
| 10,147,421 B2 | 12/2018 | Liddell et al. |
| 10,147,441 B1 | 12/2018 | Pogue et al. |
| 10,149,156 B1 | 12/2018 | Tiku et al. |
| 10,162,817 B2 | 12/2018 | Schlesinger et al. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,198,877 B1 | 2/2019 | Maltsev et al. |
| 10,199,051 B2 | 2/2019 | Binder et al. |
| 10,200,824 B2 | 2/2019 | Gross et al. |
| 10,204,627 B2 | 2/2019 | Nitz et al. |
| 10,210,860 B1 | 2/2019 | Ward et al. |
| 10,216,351 B2 | 2/2019 | Yang |
| 10,216,832 B2 | 2/2019 | Bangalore et al. |
| 10,223,066 B2 | 3/2019 | Martel et al. |
| 10,225,711 B2 | 3/2019 | Parks et al. |
| 10,228,904 B2 | 3/2019 | Raux |
| 10,229,109 B1 | 3/2019 | Cherepanov et al. |
| 10,229,356 B1 | 3/2019 | Liu et al. |
| 10,237,711 B2 | 3/2019 | Linn et al. |
| 10,242,501 B1 | 3/2019 | Pusch et al. |
| 10,248,308 B2 | 4/2019 | Karunamuni et al. |
| 10,249,300 B2 | 4/2019 | Booker et al. |
| 10,249,305 B2 | 4/2019 | Yu |
| 10,255,922 B1 | 4/2019 | Sharifi et al. |
| 10,261,672 B1 | 4/2019 | Dolbakian et al. |
| 10,261,830 B2 | 4/2019 | Gupta et al. |
| 10,269,345 B2 | 4/2019 | Castillo Sanchez et al. |
| 10,275,513 B1 | 4/2019 | Cowan et al. |
| 10,282,737 B2 | 5/2019 | Clark et al. |
| 10,289,205 B1 | 5/2019 | Sumter et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,332,509 B2 | 6/2019 | Catanzaro et al. |
| 10,332,513 B1 | 6/2019 | D'souza et al. |
| 10,332,518 B2 | 6/2019 | Garg et al. |
| 10,339,224 B2 | 7/2019 | Fukuoka |
| 10,339,714 B2 | 7/2019 | Corso et al. |
| 10,339,925 B1 | 7/2019 | Rastrow et al. |
| 10,346,540 B2 | 7/2019 | Karov et al. |
| 10,346,541 B1 | 7/2019 | Phillips et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,168 B2 | 7/2019 | Bluche |
| 10,354,677 B2 | 7/2019 | Mohamed et al. |
| 10,356,243 B2 | 7/2019 | Sanghavi et al. |
| 10,360,305 B2 | 7/2019 | Larcheveque et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,431,210 B1 | 10/2019 | Huang et al. |
| 10,437,928 B2 | 10/2019 | Bhaya et al. |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,475,446 B2 | 11/2019 | Gruber et al. |
| 10,482,875 B2 | 11/2019 | Henry |
| 10,490,195 B1 | 11/2019 | Krishnamoorthy et al. |
| 10,496,364 B2 | 12/2019 | Yao |
| 10,496,705 B1 | 12/2019 | Irani et al. |
| 10,497,365 B2 | 12/2019 | Gruber et al. |
| 10,497,366 B2 | 12/2019 | Sapugay et al. |
| 10,504,518 B1 | 12/2019 | Irani et al. |
| 10,512,750 B1 | 12/2019 | Lewin et al. |
| 10,515,133 B1 | 12/2019 | Sharifi |
| 10,515,623 B1 | 12/2019 | Grizzel |
| 10,521,946 B1 | 12/2019 | Roche et al. |
| 10,528,386 B2 | 1/2020 | Yu |
| 10,540,976 B2 | 1/2020 | Van Os et al. |
| 10,558,893 B2 | 2/2020 | Bluche |
| 10,559,225 B1 | 2/2020 | Tao et al. |
| 10,559,299 B1 | 2/2020 | Arel et al. |
| 10,566,007 B2 | 2/2020 | Fawaz et al. |
| 10,568,032 B2 | 2/2020 | Freeman et al. |
| 10,572,885 B1 | 2/2020 | Guo et al. |
| 10,579,401 B2 | 3/2020 | Dawes |
| 10,580,409 B2 | 3/2020 | Walker, II et al. |
| 10,582,355 B1 | 3/2020 | Lebeau et al. |
| 10,585,957 B2 | 3/2020 | Heck et al. |
| 10,586,369 B1 | 3/2020 | Roche et al. |
| 10,599,449 B1 | 3/2020 | Chatzipanagiotis et al. |
| 10,629,186 B1 | 4/2020 | Slifka |
| 10,630,795 B2 | 4/2020 | Aoki et al. |
| 10,642,934 B2 | 5/2020 | Heck et al. |
| 10,659,851 B2 | 5/2020 | Lister et al. |
| 10,671,428 B2 | 6/2020 | Zeitlin |
| 10,679,007 B2 | 6/2020 | Jia et al. |
| 10,679,608 B2 | 6/2020 | Mixter et al. |
| 10,684,099 B2 | 6/2020 | Zaetterqvist |
| 10,684,703 B2 | 6/2020 | Hindi et al. |
| 10,699,697 B2 | 6/2020 | Qian et al. |
| 10,706,841 B2 | 7/2020 | Gruber et al. |
| 10,721,190 B2 | 7/2020 | Zhao et al. |
| 10,732,708 B1 | 8/2020 | Roche et al. |
| 10,743,107 B1 | 8/2020 | Yoshioka et al. |
| 10,748,529 B1 | 8/2020 | Milden |
| 10,748,546 B2 | 8/2020 | Kim et al. |
| 10,754,658 B2 | 8/2020 | Tamiya |
| 10,755,032 B2 | 8/2020 | Douglas et al. |
| 10,757,499 B1 | 8/2020 | Vautrin et al. |
| 10,769,385 B2 | 9/2020 | Evermann |
| 10,778,839 B1 | 9/2020 | Newstadt et al. |
| 10,783,151 B1 | 9/2020 | Bushkin et al. |

(56) References Cited

U.S. PATENT DOCUMENTS

| | | |
|---|---|---|
| 10,783,883 B2 | 9/2020 | Mixter et al. |
| 10,789,945 B2 | 9/2020 | Acero et al. |
| 10,791,176 B2 | 9/2020 | Phipps et al. |
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,818,288 B2 | 10/2020 | Garcia et al. |
| 10,832,684 B2 | 11/2020 | Sarikaya |
| 10,842,968 B1 | 11/2020 | Kahn et al. |
| 10,846,618 B2 | 11/2020 | Ravi et al. |
| 10,847,142 B2 | 11/2020 | Newendorp et al. |
| 10,860,629 B1 | 12/2020 | Gangadharaiah et al. |
| 10,861,483 B2 | 12/2020 | Feinauer et al. |
| 10,877,637 B1 | 12/2020 | Antos et al. |
| 10,880,668 B1 | 12/2020 | Robinson et al. |
| 10,885,277 B2 | 1/2021 | Ravi et al. |
| 10,892,996 B2 | 1/2021 | Piersol |
| 10,909,459 B2 | 2/2021 | Tsatsin et al. |
| 10,944,859 B2 | 3/2021 | Weinstein et al. |
| 10,957,311 B2 | 3/2021 | Solomon et al. |
| 10,957,337 B2 | 3/2021 | Chen et al. |
| 10,970,660 B1 | 4/2021 | Harris et al. |
| 10,974,139 B2 | 4/2021 | Feder et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,009,970 B2 | 5/2021 | Hindi et al. |
| 11,017,766 B2 | 5/2021 | Chao et al. |
| 11,037,565 B2 | 6/2021 | Kudurshian et al. |
| 11,038,934 B1 | 6/2021 | Hansen et al. |
| 11,043,220 B1 | 6/2021 | Hansen et al. |
| 11,061,543 B1 | 7/2021 | Blatz et al. |
| 11,072,344 B2 | 7/2021 | Provost et al. |
| 11,076,039 B2 | 7/2021 | Weinstein et al. |
| 11,094,311 B2 | 8/2021 | Candelore et al. |
| 11,113,598 B2 | 9/2021 | Socher et al. |
| 11,132,172 B1 | 9/2021 | Naik et al. |
| 11,169,660 B2 | 11/2021 | Gupta et al. |
| 11,181,988 B1 | 11/2021 | Bellegarda et al. |
| 11,183,193 B1 | 11/2021 | Hansen et al. |
| 11,183,205 B1 | 11/2021 | Ebenezer et al. |
| 11,200,027 B2 | 12/2021 | Aggarwal et al. |
| 11,204,787 B2 | 12/2021 | Radebaugh et al. |
| 11,210,477 B2 | 12/2021 | Srinivasan et al. |
| 11,269,426 B2 | 3/2022 | Jorasch et al. |
| 11,283,631 B2 | 3/2022 | Yan et al. |
| 2005/0075875 A1 | 4/2005 | Shozakai et al. |
| 2010/0332236 A1 | 12/2010 | Tan |
| 2011/0202594 A1* | 8/2011 | Ricci ............... H04M 3/4931 455/414.1 |
| 2011/0295590 A1 | 12/2011 | Lloyd et al. |
| 2012/0002820 A1 | 1/2012 | Leichter |
| 2012/0005224 A1 | 1/2012 | Ahrens et al. |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0020503 A1 | 1/2012 | Endo et al. |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022865 A1 | 1/2012 | Milstein |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0026395 A1 | 2/2012 | Jin et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0039578 A1 | 2/2012 | Issa et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0052945 A1 | 3/2012 | Miyamoto et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0055253 A1 | 3/2012 | Sinha |
| 2012/0056815 A1 | 3/2012 | Mehra |
| 2012/0058783 A1 | 3/2012 | Kim et al. |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0064975 A1 | 3/2012 | Gault et al. |
| 2012/0065972 A1 | 3/2012 | Strifler et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084087 A1 | 4/2012 | Yang et al. |
| 2012/0084089 A1 | 4/2012 | Lloyd et al. |
| 2012/0084251 A1 | 4/2012 | Lingenfelder et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0089659 A1 | 4/2012 | Halevi et al. |
| 2012/0094645 A1 | 4/2012 | Jeffrey |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109753 A1 | 5/2012 | Kennewick et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0117590 A1 | 5/2012 | Agnihotri et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130717 A1 | 5/2012 | Xu et al. |
| 2012/0130978 A1 | 5/2012 | Li et al. |
| 2012/0130995 A1 | 5/2012 | Risvik et al. |
| 2012/0135714 A1 | 5/2012 | King, II |

(56) References Cited

U.S. PATENT DOCUMENTS

| | | |
|---|---|---|
| 2012/0136529 A1 | 5/2012 | Curtis et al. |
| 2012/0136572 A1 | 5/2012 | Norton |
| 2012/0136649 A1 | 5/2012 | Freising et al. |
| 2012/0136658 A1 | 5/2012 | Shrum, Jr. et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0287067 A1 | 5/2012 | Ikegami |
| 2012/0148077 A1 | 6/2012 | Aldaz et al. |
| 2012/0149342 A1 | 6/2012 | Cohen et al. |
| 2012/0149394 A1 | 6/2012 | Singh et al. |
| 2012/0150532 A1 | 6/2012 | Mirowski et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0162540 A1 | 6/2012 | Ouchi et al. |
| 2012/0163710 A1 | 6/2012 | Skaff et al. |
| 2012/0166177 A1 | 6/2012 | Beld et al. |
| 2012/0166196 A1 | 6/2012 | Ju et al. |
| 2012/0166429 A1 | 6/2012 | Moore et al. |
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0176255 A1 | 7/2012 | Choi et al. |
| 2012/0179457 A1 | 7/2012 | Newman et al. |
| 2012/0179467 A1 | 7/2012 | Williams et al. |
| 2012/0179471 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0185803 A1 | 7/2012 | Wang et al. |
| 2012/0185821 A1 | 7/2012 | Yaseen et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197967 A1 | 8/2012 | Sivavakeesar |
| 2012/0197995 A1 | 8/2012 | Caruso |
| 2012/0197998 A1 | 8/2012 | Kessel et al. |
| 2012/0200489 A1 | 8/2012 | Miyashita et al. |
| 2012/0201362 A1 | 8/2012 | Crossan et al. |
| 2012/0203767 A1 | 8/2012 | Williams et al. |
| 2012/0208592 A1 | 8/2012 | Davis et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0210378 A1 | 8/2012 | Mccoy et al. |
| 2012/0214141 A1 | 8/2012 | Raya et al. |
| 2012/0214517 A1 | 8/2012 | Singh et al. |
| 2012/0215640 A1 | 8/2012 | Ramer et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0222132 A1 | 8/2012 | Burger et al. |
| 2012/0223889 A1 | 9/2012 | Medlock et al. |
| 2012/0223936 A1 | 9/2012 | Aughey et al. |
| 2012/0226491 A1 | 9/2012 | Yamazaki et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239403 A1 | 9/2012 | Cano et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245924 A1 | 9/2012 | Brun |
| 2012/0245939 A1 | 9/2012 | Braho et al. |
| 2012/0245941 A1 | 9/2012 | Cheyer |
| 2012/0245944 A1* | 9/2012 | Gruber .................. G10L 13/08 704/270.1 |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0259638 A1 | 10/2012 | Kalinli |
| 2012/0262296 A1 | 10/2012 | Bezar |
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265787 A1 | 10/2012 | Hsu et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0272177 A1 | 10/2012 | Vaghefinazari et al. |
| 2012/0275377 A1 | 11/2012 | Lehane et al. |
| 2012/0278073 A1 | 11/2012 | Weider et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0290657 A1 | 11/2012 | Parks et al. |
| 2012/0290680 A1 | 11/2012 | Hwang |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297341 A1 | 11/2012 | Glazer et al. |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0304239 A1 | 11/2012 | Shahraray et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O"Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316774 A1 | 12/2012 | Yariv et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0316955 A1 | 12/2012 | Panguluri et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Perez Cortes et al. |
| 2012/0324391 A1 | 12/2012 | Tocci |
| 2012/0327009 A1 | 12/2012 | Fleizach |
| 2012/0329529 A1 | 12/2012 | Van Der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |

(56) References Cited

U.S. PATENT DOCUMENTS

| | | |
|---|---|---|
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |
| 2013/0018863 A1 | 1/2013 | Regan et al. |
| 2013/0022189 A1 | 1/2013 | Ganong et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0176208 A1 | 1/2013 | Tanaka et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0035994 A1 | 2/2013 | Pattan et al. |
| 2013/0036200 A1 | 2/2013 | Roberts et al. |
| 2013/0038618 A1 | 2/2013 | Urbach |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041685 A1 | 2/2013 | Yegnanarayanan |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0054945 A1 | 2/2013 | Free et al. |
| 2013/0055099 A1 | 2/2013 | Yao et al. |
| 2013/0055147 A1 | 2/2013 | Vasudev et al. |
| 2013/0055201 A1 | 2/2013 | No et al. |
| 2013/0060571 A1 | 3/2013 | Soemo et al. |
| 2013/0060807 A1 | 3/2013 | Rambhia et al. |
| 2013/0061139 A1 | 3/2013 | Mahkovec et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0080972 A1 | 3/2013 | Moshrefi et al. |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |
| 2013/0085757 A1 | 4/2013 | Nakamura et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | LeBeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103383 A1 | 4/2013 | Du et al. |
| 2013/0103391 A1 | 4/2013 | Millmore et al. |
| 2013/0103405 A1 | 4/2013 | Namba et al. |
| 2013/0103698 A1 | 4/2013 | Schlipf |
| 2013/0106742 A1 | 5/2013 | Lee et al. |
| 2013/0107053 A1 | 5/2013 | Ozaki |
| 2013/0109412 A1 | 5/2013 | Nguyen et al. |
| 2013/0110505 A1 | 5/2013 | Gruber et al. |
| 2013/0110511 A1 | 5/2013 | Spiegel et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124187 A1 | 5/2013 | Qin |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0130669 A1 | 5/2013 | Xiao et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132094 A1 | 5/2013 | Lim |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0173614 A1 | 7/2013 | Ismalon |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |

(56) References Cited

U.S. PATENT DOCUMENTS

| | | |
|---|---|---|
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0223279 A1 | 8/2013 | Tinnakornsrisuphap et al. |
| 2013/0225128 A1 | 8/2013 | Gomar |
| 2013/0226580 A1 | 8/2013 | Witt-ehsani |
| 2013/0226935 A1 | 8/2013 | Bai et al. |
| 2013/0226996 A1 | 8/2013 | Itagaki et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238312 A1 | 9/2013 | Waibel |
| 2013/0238326 A1 | 9/2013 | Kim et al. |
| 2013/0238334 A1 | 9/2013 | Ma et al. |
| 2013/0238540 A1 | 9/2013 | O'donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0244633 A1 | 9/2013 | Jacobs et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0246920 A1 | 9/2013 | Fields et al. |
| 2013/0253911 A1 | 9/2013 | Petri et al. |
| 2013/0253912 A1 | 9/2013 | Medlock et al. |
| 2013/0260739 A1 | 10/2013 | Saino |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290001 A1 | 10/2013 | Yun et al. |
| 2013/0290222 A1 | 10/2013 | Gordo et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0298139 A1 | 11/2013 | Resnick et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325460 A1 | 12/2013 | Kim et al. |
| 2013/0325473 A1 | 12/2013 | Larcher et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0339028 A1 | 12/2013 | Rosner et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346016 A1 | 12/2013 | Suzuki et al. |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0346488 A1 | 12/2013 | Lunt et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |

(56) References Cited

U.S. PATENT DOCUMENTS

| | | |
|---|---|---|
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006191 A1 | 1/2014 | Shankar et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006951 A1 | 1/2014 | Hunter |
| 2014/0006955 A1* | 1/2014 | Greenzeiger ............ G06F 3/14 715/733 |
| 2014/0008163 A1 | 1/2014 | Mikonaho et al. |
| 2014/0012574 A1 | 1/2014 | Pasupalak et al. |
| 2014/0012575 A1 | 1/2014 | Ganong et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0013336 A1 | 1/2014 | Yang |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0026037 A1 | 1/2014 | Garb et al. |
| 2014/0028029 A1 | 1/2014 | Jochman |
| 2014/0028477 A1 | 1/2014 | Michalske |
| 2014/0028603 A1 | 1/2014 | Xie et al. |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040905 A1 | 2/2014 | Tsunoda et al. |
| 2014/0040918 A1 | 2/2014 | Li |
| 2014/0040961 A1 | 2/2014 | Green et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0059423 A1 | 2/2014 | Gorga et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0067740 A1 | 3/2014 | Solari |
| 2014/0068751 A1 | 3/2014 | Last |
| 2014/0071241 A1 | 3/2014 | Yang et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0074846 A1 | 3/2014 | Moss et al. |
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095432 A1 | 4/2014 | Trumbull et al. |
| 2014/0095601 A1 | 4/2014 | Abuelsaad et al. |
| 2014/0095965 A1 | 4/2014 | Li |
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108357 A1 | 4/2014 | Procops et al. |
| 2014/0108391 A1 | 4/2014 | Volkert |
| 2014/0108792 A1 | 4/2014 | Borzycki et al. |
| 2014/0112556 A1 | 4/2014 | Kalinli-akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122057 A1 | 5/2014 | Chelba et al. |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0123022 A1 | 5/2014 | Lee et al. |
| 2014/0128021 A1 | 5/2014 | Walker et al. |
| 2014/0129006 A1 | 5/2014 | Chen et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142934 A1 | 5/2014 | Kim |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0148209 A1 | 5/2014 | Weng et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156269 A1 | 6/2014 | Lee et al. |
| 2014/0156279 A1 | 6/2014 | Okamoto et al. |
| 2014/0156564 A1 | 6/2014 | Knight et al. |
| 2014/0157319 A1 | 6/2014 | Kimura et al. |

(56) References Cited

U.S. PATENT DOCUMENTS

| | | |
|---|---|---|
| 2014/0157422 A1 | 6/2014 | Livshits et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1* | 6/2014 | Lynch ............... H04L 12/1818 709/206 |
| 2014/0164533 A1* | 6/2014 | Lynch ............... H04L 51/046 709/206 |
| 2014/0164953 A1 | 6/2014 | Lynch et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181123 A1 | 6/2014 | Tuffet Blaise et al. |
| 2014/0181741 A1* | 6/2014 | Apacible ............. G06Q 10/109 715/764 |
| 2014/0181865 A1 | 6/2014 | Koganei |
| 2014/0188335 A1 | 7/2014 | Madhok et al. |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0200891 A1 | 7/2014 | Larcheveque et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222422 A1 | 8/2014 | Sarikaya et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0253455 A1 | 9/2014 | Mauro et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1* | 9/2014 | Tran ................. G06F 40/30 704/9 |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0280757 A1 | 9/2014 | Tran |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |

(56) References Cited

U.S. PATENT DOCUMENTS

| | | |
|---|---|---|
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1* | 10/2014 | Gruber ............... G10L 15/183 704/257 |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0343834 A1 | 11/2014 | Demerchant et al. |
| 2014/0343943 A1 | 11/2014 | Al-telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358521 A1 | 12/2014 | Mikutel et al. |
| 2014/0358523 A1 | 12/2014 | Sheth et al. |
| 2014/0358549 A1 | 12/2014 | O'connor et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379326 A1 | 12/2014 | Sarikaya et al. |
| 2014/0379334 A1 | 12/2014 | Fry |
| 2014/0379338 A1 | 12/2014 | Fry |
| 2014/0379341 A1 | 12/2014 | Seo et al. |
| 2014/0379798 A1 | 12/2014 | Bunner et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0005009 A1 | 1/2015 | Tomkins et al. |
| 2015/0006147 A1 | 1/2015 | Schmidt |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019445 A1 | 1/2015 | Glass et al. |
| 2015/0019944 A1 | 1/2015 | Kalgi |
| 2015/0019954 A1 | 1/2015 | Dalal et al. |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033130 A1 | 1/2015 | Scheessele |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0042640 A1 | 2/2015 | Algreatly |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046375 A1 | 2/2015 | Mandel et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0051901 A1 | 2/2015 | Stonehouse et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066473 A1 | 3/2015 | Jeong et al. |
| 2015/0066479 A1 | 3/2015 | Pasupalak et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1* | 3/2015 | Slayton ............... G06N 5/04 706/11 |
| 2015/0067485 A1 | 3/2015 | Kim et al. |
| 2015/0067819 A1 | 3/2015 | Shribman et al. |
| 2015/0067822 A1 | 3/2015 | Randall |

(56) References Cited

U.S. PATENT DOCUMENTS

| | | |
|---|---|---|
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1* | 3/2015 | Typrin ............... G10L 17/00 704/231 |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095159 A1 | 4/2015 | Kennewick et al. |
| 2015/0095268 A1* | 4/2015 | Greenzeiger .... G06Q 10/06311 706/11 |
| 2015/0095278 A1 | 4/2015 | Flinn et al. |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106061 A1 | 4/2015 | Yang et al. |
| 2015/0106085 A1 | 4/2015 | Lindahl |
| 2015/0106093 A1 | 4/2015 | Weeks et al. |
| 2015/0106737 A1 | 4/2015 | Montoy-Wilson et al. |
| 2015/0112684 A1 | 4/2015 | Scheffer et al. |
| 2015/0113407 A1 | 4/2015 | Hoffert et al. |
| 2015/0113435 A1 | 4/2015 | Phillips |
| 2015/0113454 A1 | 4/2015 | McLaughlin |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0123898 A1 | 5/2015 | Kim et al. |
| 2015/0127336 A1 | 5/2015 | Lei et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0128058 A1 | 5/2015 | Anajwala |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134323 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0140990 A1 | 5/2015 | Kim et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142440 A1 | 5/2015 | Parkinson et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149146 A1 | 5/2015 | Abramovitz et al. |
| 2015/0149177 A1 | 5/2015 | Kalns et al. |
| 2015/0149182 A1 | 5/2015 | Kalns et al. |
| 2015/0149354 A1 | 5/2015 | McCoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162000 A1 | 6/2015 | Di Censo et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169195 A1 | 6/2015 | Choi |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0178785 A1 | 6/2015 | Salonen |
| 2015/0179168 A1 | 6/2015 | Hakkani-tur et al. |
| 2015/0179176 A1 | 6/2015 | Ryu et al. |
| 2015/0181285 A1 | 6/2015 | Zhang et al. |
| 2015/0185718 A1 | 7/2015 | Tappan et al. |
| 2015/0185964 A1 | 7/2015 | Stout |
| 2015/0185993 A1 | 7/2015 | Wheatley et al. |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0186892 A1 | 7/2015 | Zhang et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0200879 A1 | 7/2015 | Wu et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205632 A1 | 7/2015 | Gaster |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0217870 A1 | 8/2015 | Mccullough et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221302 A1 | 8/2015 | Han et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0224848 A1 | 8/2015 | Eisenhour |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228282 A1 | 8/2015 | Evrard |

(56) References Cited

U.S. PATENT DOCUMENTS

| | | |
|---|---|---|
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234556 A1 | 8/2015 | Shaofeng et al. |
| 2015/0234636 A1 | 8/2015 | Barnes, Jr. |
| 2015/0234800 A1 | 8/2015 | Patrick et al. |
| 2015/0235434 A1 | 8/2015 | Miller et al. |
| 2015/0235540 A1 | 8/2015 | Verna et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0249715 A1 | 9/2015 | Helvik et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255068 A1 | 9/2015 | Kim et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0261944 A1 | 9/2015 | Hosom et al. |
| 2015/0262443 A1 | 9/2015 | Chong |
| 2015/0262573 A1 | 9/2015 | Brooks et al. |
| 2015/0262583 A1 | 9/2015 | Kanda et al. |
| 2015/0269139 A1 | 9/2015 | McAteer et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278199 A1 | 10/2015 | Hazen et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279354 A1 | 10/2015 | Gruenstein et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287408 A1 | 10/2015 | Svendsen et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0296065 A1 | 10/2015 | Narita et al. |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310852 A1 | 10/2015 | Spizzo et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319264 A1 | 11/2015 | Allen et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350147 A1 | 12/2015 | Shepherd et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0365251 A1 | 12/2015 | Kinoshita et al. |
| 2015/0370455 A1 | 12/2015 | Van Os et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-Or et al. |
| 2015/0371665 A1 | 12/2015 | Naik et al. |
| 2015/0373183 A1 | 12/2015 | Woolsey et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2016/0004499 A1 | 1/2016 | Kim et al. |
| 2016/0004690 A1 | 1/2016 | Bangalore et al. |
| 2016/0005320 A1 | 1/2016 | deCharms et al. |
| 2016/0006795 A1 | 1/2016 | Yunten |
| 2016/0012038 A1 | 1/2016 | Edwards et al. |
| 2016/0014476 A1 | 1/2016 | Caliendo, Jr. et al. |

(56) References Cited

U.S. PATENT DOCUMENTS

| | | |
|---|---|---|
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0019896 A1 | 1/2016 | Alvarez Guevara et al. |
| 2016/0021414 A1 | 1/2016 | Padi et al. |
| 2016/0026242 A1 | 1/2016 | Burns et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0028802 A1 | 1/2016 | Balasingh et al. |
| 2016/0029316 A1 | 1/2016 | Mohan et al. |
| 2016/0034042 A1 | 2/2016 | Joo |
| 2016/0034447 A1 | 2/2016 | Shin et al. |
| 2016/0034811 A1 | 2/2016 | Paulik et al. |
| 2016/0036750 A1 | 2/2016 | Yuan et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0057203 A1 | 2/2016 | Gärdenfors et al. |
| 2016/0057475 A1 | 2/2016 | Liu |
| 2016/0061623 A1 | 3/2016 | Pahwa et al. |
| 2016/0062459 A1 | 3/2016 | Publicover et al. |
| 2016/0062605 A1 | 3/2016 | Agarwal et al. |
| 2016/0063094 A1 | 3/2016 | Udupa et al. |
| 2016/0063095 A1 | 3/2016 | Nassar et al. |
| 2016/0063998 A1 | 3/2016 | Krishnamoorthy et al. |
| 2016/0065155 A1 | 3/2016 | Bharj et al. |
| 2016/0065626 A1 | 3/2016 | Jain et al. |
| 2016/0066020 A1 | 3/2016 | Mountain |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071520 A1 | 3/2016 | Hayakawa |
| 2016/0071521 A1 | 3/2016 | Haughay |
| 2016/0072940 A1 | 3/2016 | Cronin |
| 2016/0077794 A1 | 3/2016 | Kim et al. |
| 2016/0078359 A1 | 3/2016 | Csurka et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092046 A1 | 3/2016 | Hong et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0105308 A1 | 4/2016 | Dutt |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0147739 A1 | 5/2016 | Lim et al. |
| 2016/0148610 A1 | 5/2016 | Kennewick, Jr. et al. |
| 2016/0148612 A1 | 5/2016 | Guo et al. |
| 2016/0148613 A1 | 5/2016 | Kwon et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0156990 A1 | 6/2016 | Miccoy et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170710 A1 | 6/2016 | Kim et al. |
| 2016/0170966 A1 | 6/2016 | Kolo |
| 2016/0171980 A1 | 6/2016 | Liddell et al. |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189198 A1 | 6/2016 | Daniel et al. |
| 2016/0189715 A1 | 6/2016 | Nishikawa |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0203002 A1 | 7/2016 | Kannan et al. |
| 2016/0203193 A1 | 7/2016 | Kevin et al. |
| 2016/0210551 A1 | 7/2016 | Lee et al. |
| 2016/0210981 A1 | 7/2016 | Lee |
| 2016/0212206 A1 | 7/2016 | Wu et al. |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0217794 A1 | 7/2016 | Imoto et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0226956 A1 | 8/2016 | Hong et al. |
| 2016/0227107 A1 | 8/2016 | Beaumont |
| 2016/0227633 A1 | 8/2016 | Sun et al. |
| 2016/0232500 A1 | 8/2016 | Wang et al. |
| 2016/0234206 A1 | 8/2016 | Tunnell et al. |
| 2016/0239480 A1 | 8/2016 | Larcheveque et al. |
| 2016/0239568 A1 | 8/2016 | Packer et al. |
| 2016/0239645 A1 | 8/2016 | Heo et al. |
| 2016/0239848 A1 | 8/2016 | Chang et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0242148 A1 | 8/2016 | Reed |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |

(56) References Cited

U.S. PATENT DOCUMENTS

| | | |
|---|---|---|
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0262442 A1 | 9/2016 | Davila et al. |
| 2016/0266871 A1 | 9/2016 | Schmid et al. |
| 2016/0267904 A1 | 9/2016 | Biadsy et al. |
| 2016/0269540 A1 | 9/2016 | Butcher et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293157 A1 | 10/2016 | Chen et al. |
| 2016/0293167 A1 | 10/2016 | Chen et al. |
| 2016/0293168 A1 | 10/2016 | Chen |
| 2016/0294755 A1 | 10/2016 | Prabhu |
| 2016/0294813 A1 | 10/2016 | Zou |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0306683 A1 | 10/2016 | Standley et al. |
| 2016/0307566 A1 | 10/2016 | Bellegarda |
| 2016/0308799 A1 | 10/2016 | Schubert et al. |
| 2016/0309035 A1 | 10/2016 | Li |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0316349 A1 | 10/2016 | Lee et al. |
| 2016/0317924 A1 | 11/2016 | Tanaka et al. |
| 2016/0320838 A1 | 11/2016 | Teller et al. |
| 2016/0321239 A1 | 11/2016 | Iso-Sipilä et al. |
| 2016/0321243 A1 | 11/2016 | Walia et al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0322055 A1 | 11/2016 | Sainath et al. |
| 2016/0328134 A1 | 11/2016 | Xu |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335138 A1 | 11/2016 | Surti et al. |
| 2016/0335139 A1 | 11/2016 | Hurley et al. |
| 2016/0335532 A1* | 11/2016 | Sanghavi ............... H04L 51/02 |
| 2016/0336007 A1 | 11/2016 | Hanazawa et al. |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0350650 A1 | 12/2016 | Leeman-Munk et al. |
| 2016/0350812 A1 | 12/2016 | Priness et al. |
| 2016/0351190 A1 | 12/2016 | Piernot et al. |
| 2016/0352567 A1 | 12/2016 | Robbins et al. |
| 2016/0352924 A1 | 12/2016 | Senarath et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1* | 12/2016 | Sanghavi ............... H04L 51/046 |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0373571 A1 | 12/2016 | Woolsey et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0000348 A1 | 1/2017 | Karsten et al. |
| 2017/0003931 A1 | 1/2017 | Dvortsov et al. |
| 2017/0004209 A1 | 1/2017 | Johl et al. |
| 2017/0004824 A1 | 1/2017 | Yoo et al. |
| 2017/0005818 A1 | 1/2017 | Gould |
| 2017/0006329 A1 | 1/2017 | Jang et al. |
| 2017/0011091 A1 | 1/2017 | Chehreghani |
| 2017/0011279 A1 | 1/2017 | Soldevila et al. |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0027522 A1 | 2/2017 | Van Hasselt et al. |
| 2017/0031576 A1 | 2/2017 | Saoji et al. |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0041388 A1 | 2/2017 | Tal et al. |
| 2017/0047063 A1 | 2/2017 | Ohmura et al. |
| 2017/0052760 A1 | 2/2017 | Johnson et al. |
| 2017/0053652 A1 | 2/2017 | Choi et al. |
| 2017/0055895 A1 | 3/2017 | Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0069321 A1 | 3/2017 | Toiyama |
| 2017/0069327 A1 | 3/2017 | Heigold et al. |
| 2017/0075653 A1 | 3/2017 | Dawidowsky et al. |
| 2017/0076518 A1 | 3/2017 | Patterson et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0083506 A1 | 3/2017 | Liu et al. |
| 2017/0084277 A1 | 3/2017 | Sharifi |
| 2017/0085547 A1 | 3/2017 | De Aguiar et al. |
| 2017/0085696 A1 | 3/2017 | Abkairov |

(56) References Cited

U.S. PATENT DOCUMENTS

| | | |
|---|---|---|
| 2017/0090428 A1 | 3/2017 | Oohara |
| 2017/0090569 A1 | 3/2017 | Levesque |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0108236 A1 | 4/2017 | Guan et al. |
| 2017/0110117 A1 | 4/2017 | Chakladar et al. |
| 2017/0110125 A1 | 4/2017 | Xu et al. |
| 2017/0116177 A1 | 4/2017 | Walia |
| 2017/0116982 A1 | 4/2017 | Gelfenbeyn et al. |
| 2017/0116987 A1 | 4/2017 | Kang et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0124531 A1 | 5/2017 | McCormack |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147722 A1 | 5/2017 | Greenwood |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0154628 A1 | 6/2017 | Mohajer et al. |
| 2017/0155940 A1 | 6/2017 | Jin et al. |
| 2017/0155965 A1 | 6/2017 | Ward |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0161439 A1 | 6/2017 | Raduchel et al. |
| 2017/0161500 A1 | 6/2017 | Yang |
| 2017/0162191 A1 | 6/2017 | Grost et al. |
| 2017/0162202 A1 | 6/2017 | Anthony et al. |
| 2017/0162203 A1 | 6/2017 | Huang et al. |
| 2017/0169506 A1 | 6/2017 | Wishne et al. |
| 2017/0169818 A1 | 6/2017 | Vanblon et al. |
| 2017/0169819 A1 | 6/2017 | Mese et al. |
| 2017/0177080 A1 | 6/2017 | Deleeuw |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0178666 A1 | 6/2017 | Yu |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0195856 A1 | 7/2017 | Snyder et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0201846 A1 | 7/2017 | Katayama et al. |
| 2017/0206899 A1 | 7/2017 | Bryant et al. |
| 2017/0215052 A1 | 7/2017 | Koum et al. |
| 2017/0220212 A1 | 8/2017 | Yang et al. |
| 2017/0221486 A1 | 8/2017 | Kurata et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0229121 A1 | 8/2017 | Taki et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0236517 A1 | 8/2017 | Yu et al. |
| 2017/0238039 A1 | 8/2017 | Sabattini |
| 2017/0242478 A1 | 8/2017 | Ma |
| 2017/0242653 A1 | 8/2017 | Lang et al. |
| 2017/0242657 A1 | 8/2017 | Jarvis et al. |
| 2017/0242840 A1 | 8/2017 | Lu et al. |
| 2017/0243468 A1 | 8/2017 | Dotan-Cohen et al. |
| 2017/0243576 A1 | 8/2017 | Millington et al. |
| 2017/0243583 A1 | 8/2017 | Raichelgauz et al. |
| 2017/0243586 A1 | 8/2017 | Civelli et al. |
| 2017/0249309 A1 | 8/2017 | Sarikaya |
| 2017/0256256 A1 | 9/2017 | Wang et al. |
| 2017/0257723 A1 | 9/2017 | Morishita et al. |
| 2017/0262051 A1 | 9/2017 | Tall et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270715 A1 | 9/2017 | Lindsay et al. |
| 2017/0270822 A1 | 9/2017 | Cohen |
| 2017/0270912 A1 | 9/2017 | Levit et al. |
| 2017/0278513 A1 | 9/2017 | Li et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0286407 A1 | 10/2017 | Chochowski et al. |
| 2017/0287218 A1 | 10/2017 | Nuernberger et al. |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0301348 A1 | 10/2017 | Chen et al. |
| 2017/0308552 A1 | 10/2017 | Soni et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |
| 2017/0337478 A1 | 11/2017 | Sarikaya et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1* | 11/2017 | Sanghavi ............ H04L 65/1069 |
| 2017/0347180 A1 | 11/2017 | Petrank |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |

(56) References Cited

U.S. PATENT DOCUMENTS

| | | |
|---|---|---|
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371885 A1 | 12/2017 | Aggarwal et al. |
| 2017/0374093 A1 | 12/2017 | Dhar et al. |
| 2017/0374176 A1 | 12/2017 | Agrawal et al. |
| 2018/0004372 A1 | 1/2018 | Zurek et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018590 A1 | 1/2018 | Szeto et al. |
| 2018/0018814 A1 | 1/2018 | Patrik et al. |
| 2018/0018959 A1 | 1/2018 | Des Jardins et al. |
| 2018/0018973 A1 | 1/2018 | Moreno et al. |
| 2018/0024985 A1 | 1/2018 | Asano |
| 2018/0025124 A1 | 1/2018 | Mohr et al. |
| 2018/0025287 A1 | 1/2018 | Mathew et al. |
| 2018/0028918 A1 | 2/2018 | Tang et al. |
| 2018/0033431 A1 | 2/2018 | Newendorp et al. |
| 2018/0033435 A1 | 2/2018 | Jacobs, II |
| 2018/0033436 A1 | 2/2018 | Zhou |
| 2018/0045963 A1 | 2/2018 | Hoover et al. |
| 2018/0046340 A1 | 2/2018 | Mall |
| 2018/0047201 A1 | 2/2018 | Filev et al. |
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0060555 A1 | 3/2018 | Boesen |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0067929 A1 | 3/2018 | Ahn |
| 2018/0068074 A1 | 3/2018 | Shen |
| 2018/0068194 A1 | 3/2018 | Matsuda |
| 2018/0069743 A1 | 3/2018 | Bakken et al. |
| 2018/0075847 A1 | 3/2018 | Lee et al. |
| 2018/0075849 A1 | 3/2018 | Khoury et al. |
| 2018/0077095 A1 | 3/2018 | Deyle et al. |
| 2018/0077648 A1 | 3/2018 | Nguyen |
| 2018/0082692 A1 | 3/2018 | Khoury et al. |
| 2018/0088788 A1 | 3/2018 | Cheung et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091732 A1 | 3/2018 | Wilson et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0101599 A1 | 4/2018 | Kenneth et al. |
| 2018/0101925 A1 | 4/2018 | Brinig et al. |
| 2018/0102914 A1 | 4/2018 | Kawachi et al. |
| 2018/0103209 A1 | 4/2018 | Fischler et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0108351 A1 | 4/2018 | Beckhardt et al. |
| 2018/0108357 A1 | 4/2018 | Liu |
| 2018/0109920 A1 | 4/2018 | Aggarwal et al. |
| 2018/0113673 A1 | 4/2018 | Sheynblat |
| 2018/0314362 A1 | 4/2018 | Kim et al. |
| 2018/0121430 A1 | 5/2018 | Kagoshima et al. |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143857 A1 | 5/2018 | Anbazhagan et al. |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0152803 A1 | 5/2018 | Seefeldt et al. |
| 2018/0157372 A1 | 6/2018 | Kurabayashi |
| 2018/0157408 A1 | 6/2018 | Yu et al. |
| 2018/0157992 A1 | 6/2018 | Susskind et al. |
| 2018/0158548 A1 | 6/2018 | Taheri et al. |
| 2018/0158552 A1 | 6/2018 | Liu et al. |
| 2018/0165857 A1 | 6/2018 | Lee et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0181370 A1 | 6/2018 | Parkinson |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0205983 A1 | 7/2018 | Lee et al. |
| 2018/0210874 A1 | 7/2018 | Fuxman et al. |
| 2018/0213448 A1 | 7/2018 | Segal et al. |
| 2018/0214061 A1 | 8/2018 | Knoth et al. |
| 2018/0217810 A1 | 8/2018 | Agrawal |
| 2018/0218735 A1 | 8/2018 | Hunt et al. |
| 2018/0221783 A1 | 8/2018 | Gamero |
| 2018/0225131 A1 | 8/2018 | Tommy et al. |
| 2018/0225274 A1 | 8/2018 | Tommy et al. |
| 2018/0232203 A1 | 8/2018 | Gelfenbeyn et al. |
| 2018/0232608 A1 | 8/2018 | Pradeep et al. |
| 2018/0232688 A1 | 8/2018 | Pike et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0268023 A1 | 9/2018 | Korpusik et al. |
| 2018/0268106 A1 | 9/2018 | Velaga |
| 2018/0268337 A1 | 9/2018 | Miller et al. |
| 2018/0270343 A1 | 9/2018 | Rout et al. |
| 2018/0275839 A1 | 9/2018 | Kocienda et al. |

(56) References Cited

U.S. PATENT DOCUMENTS

| | | |
|---|---|---|
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293984 A1 | 10/2018 | Lindahl |
| 2018/0293988 A1 | 10/2018 | Huang et al. |
| 2018/0293989 A1 | 10/2018 | De et al. |
| 2018/0299878 A1 | 10/2018 | Cella et al. |
| 2018/0300317 A1 | 10/2018 | Bradbury |
| 2018/0300400 A1 | 10/2018 | Paulus |
| 2018/0300608 A1 | 10/2018 | Sevrens et al. |
| 2018/0300952 A1 | 10/2018 | Evans et al. |
| 2018/0307216 A1 | 10/2018 | Ypma et al. |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0308491 A1 | 10/2018 | Oktem et al. |
| 2018/0314552 A1 | 11/2018 | Kim et al. |
| 2018/0314689 A1 | 11/2018 | Wang et al. |
| 2018/0315415 A1 | 11/2018 | Mosley et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329508 A1 | 11/2018 | Klein et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0335903 A1 | 11/2018 | Coffman et al. |
| 2018/0336006 A1 | 11/2018 | Chakraborty et al. |
| 2018/0336049 A1 | 11/2018 | Mukherjee et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336880 A1 | 11/2018 | Arik et al. |
| 2018/0336885 A1 | 11/2018 | Mukherjee et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336911 A1 | 11/2018 | Dahl et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0366110 A1 | 12/2018 | Hashem et al. |
| 2018/0366116 A1 | 12/2018 | Nicholson et al. |
| 2018/0366118 A1 | 12/2018 | Lovitt et al. |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0007228 A1 | 1/2019 | Vuskovic et al. |
| 2019/0012141 A1 | 1/2019 | Piersol et al. |
| 2019/0012445 A1 | 1/2019 | Lesso et al. |
| 2019/0012449 A1 | 1/2019 | Cheyer |
| 2019/0012599 A1 | 1/2019 | El Kaliouby et al. |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0020482 A1 | 1/2019 | Gupta et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035385 A1 | 1/2019 | Lawson et al. |
| 2019/0035405 A1 | 1/2019 | Haughay |
| 2019/0037258 A1 | 1/2019 | Justin et al. |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0044854 A1 | 2/2019 | Yang et al. |
| 2019/0045040 A1 | 2/2019 | Lee et al. |
| 2019/0051306 A1 | 2/2019 | Torama et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0173996 A1 | 2/2019 | Butcher et al. |
| 2019/0073607 A1 | 3/2019 | Jia et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0079724 A1 | 3/2019 | Feuz et al. |
| 2019/0080685 A1 | 3/2019 | Johnson, Jr. |
| 2019/0080698 A1 | 3/2019 | Miller |
| 2019/0082044 A1 | 3/2019 | Olivia et al. |
| 2019/0087412 A1 | 3/2019 | Seyed Ibrahim et al. |
| 2019/0087455 A1 | 3/2019 | He et al. |
| 2019/0095050 A1 | 3/2019 | Gruber et al. |
| 2019/0095069 A1 | 3/2019 | Proctor et al. |
| 2019/0095171 A1 | 3/2019 | Carson et al. |
| 2019/0102145 A1 | 4/2019 | Wilberding et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0108834 A1 | 4/2019 | Nelson et al. |
| 2019/0114320 A1 | 4/2019 | Patwardhan et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129499 A1 | 5/2019 | Li |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139541 A1 | 5/2019 | Andersen et al. |
| 2019/0139563 A1 | 5/2019 | Chen et al. |
| 2019/0141494 A1 | 5/2019 | Gross et al. |
| 2019/0147052 A1 | 5/2019 | Lu et al. |
| 2019/0147369 A1 | 5/2019 | Gupta et al. |
| 2019/0147880 A1 | 5/2019 | Booker et al. |
| 2019/0147883 A1 | 5/2019 | Mellenthin et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0163667 A1 | 5/2019 | Feuz et al. |

(56) References Cited

U.S. PATENT DOCUMENTS

| | | |
|---|---|---|
| 2019/0164546 A1 | 5/2019 | Piernot et al. |
| 2019/0172243 A1 | 6/2019 | Mishra et al. |
| 2019/0172458 A1 | 6/2019 | Mishra et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0190898 A1 | 6/2019 | Cui |
| 2019/0197053 A1 | 6/2019 | Graham et al. |
| 2019/0213498 A1 | 7/2019 | Adjaoute |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220704 A1 | 7/2019 | Schulz-Trieglaff et al. |
| 2019/0220727 A1 | 7/2019 | Dohrmann et al. |
| 2019/0222684 A1 | 7/2019 | Li et al. |
| 2019/0224049 A1 | 7/2019 | Creasy et al. |
| 2019/0230215 A1 | 7/2019 | Zhu et al. |
| 2019/0230426 A1 | 7/2019 | Chun |
| 2019/0236130 A1 | 8/2019 | Li et al. |
| 2019/0236459 A1 | 8/2019 | Cheyer et al. |
| 2019/0237061 A1 | 8/2019 | Rusak et al. |
| 2019/0243902 A1 | 8/2019 | Saeki et al. |
| 2019/0244618 A1 | 8/2019 | Newendorp et al. |
| 2019/0251167 A1 | 8/2019 | Krishnapura Subbaraya et al. |
| 2019/0251339 A1 | 8/2019 | Hawker |
| 2019/0251960 A1 | 8/2019 | Maker et al. |
| 2019/0259386 A1 | 8/2019 | Kudurshian et al. |
| 2019/0266246 A1 | 8/2019 | Wang et al. |
| 2019/0272318 A1 | 9/2019 | Suzuki et al. |
| 2019/0272818 A1 | 9/2019 | Fernandez et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0279622 A1 | 9/2019 | Liu et al. |
| 2019/0281387 A1 | 9/2019 | Woo et al. |
| 2019/0287012 A1 | 9/2019 | Asli et al. |
| 2019/0287522 A1 | 9/2019 | Lambourne et al. |
| 2019/0294769 A1 | 9/2019 | Lesso |
| 2019/0294962 A1 | 9/2019 | Vezer et al. |
| 2019/0295529 A1 | 9/2019 | Tomita |
| 2019/0295540 A1 | 9/2019 | Grima |
| 2019/0295544 A1 | 9/2019 | Garcia et al. |
| 2019/0303442 A1 | 10/2019 | Peitz et al. |
| 2019/0303504 A1 | 10/2019 | Pasumarthy |
| 2019/0304438 A1 | 10/2019 | Qian et al. |
| 2019/0310765 A1 | 10/2019 | Napolitano et al. |
| 2019/0311708 A1 | 10/2019 | Bengio et al. |
| 2019/0311720 A1 | 10/2019 | Pasko |
| 2019/0318722 A1 | 10/2019 | Bromand |
| 2019/0318724 A1 | 10/2019 | Chao et al. |
| 2019/0318725 A1 | 10/2019 | Le Roux et al. |
| 2019/0318732 A1 | 10/2019 | Huang et al. |
| 2019/0318735 A1 | 10/2019 | Chao et al. |
| 2019/0318739 A1 | 10/2019 | Garg et al. |
| 2019/0325866 A1 | 10/2019 | Bromand et al. |
| 2019/0333523 A1 | 10/2019 | Kim et al. |
| 2019/0339784 A1 | 11/2019 | Lemay et al. |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0347525 A1 | 11/2019 | Liem et al. |
| 2019/0348022 A1 | 11/2019 | Park et al. |
| 2019/0349333 A1 | 11/2019 | Pickover et al. |
| 2019/0349622 A1 | 11/2019 | Kim et al. |
| 2019/0354548 A1 | 11/2019 | Orr et al. |
| 2019/0355346 A1 | 11/2019 | Bellegarda |
| 2019/0355384 A1 | 11/2019 | Sereshki et al. |
| 2019/0361729 A1 | 11/2019 | Gruber et al. |
| 2019/0361978 A1 | 11/2019 | Ray et al. |
| 2019/0362557 A1 | 11/2019 | Lacey et al. |
| 2019/0369748 A1 | 12/2019 | Hindi et al. |
| 2019/0369842 A1 | 12/2019 | Dolbakian et al. |
| 2019/0369868 A1 | 12/2019 | Jin et al. |
| 2019/0370292 A1 | 12/2019 | Irani et al. |
| 2019/0370323 A1 | 12/2019 | Davidson et al. |
| 2019/0370443 A1 | 12/2019 | Lesso |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0377955 A1 | 12/2019 | Swaminathan et al. |
| 2019/0385418 A1 | 12/2019 | Mixter et al. |
| 2019/0387352 A1 | 12/2019 | Jot et al. |
| 2020/0019609 A1 | 1/2020 | Yu et al. |
| 2020/0020326 A1 | 1/2020 | Srinivasan et al. |
| 2020/0034421 A1 | 1/2020 | Ferrucci et al. |
| 2020/0035224 A1 | 1/2020 | Ward et al. |
| 2020/0042334 A1 | 2/2020 | Radebaugh et al. |
| 2020/0043467 A1 | 2/2020 | Qian et al. |
| 2020/0043471 A1 | 2/2020 | Ma et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0051565 A1 | 2/2020 | Singh |
| 2020/0051583 A1 | 2/2020 | Wu et al. |
| 2020/0053218 A1 | 2/2020 | Gray |
| 2020/0058299 A1 | 2/2020 | Lee et al. |
| 2020/0065601 A1 | 2/2020 | Andreassen |
| 2020/0073629 A1 | 3/2020 | Lee et al. |
| 2020/0075018 A1 | 3/2020 | Chen |
| 2020/0075040 A1 | 3/2020 | Provost et al. |
| 2020/0076538 A1 | 3/2020 | Soultan et al. |
| 2020/0081615 A1 | 3/2020 | Yi et al. |
| 2020/0082807 A1 | 3/2020 | Kim et al. |
| 2020/0084572 A1 | 3/2020 | Jadav et al. |
| 2020/0090393 A1 | 3/2020 | Shin et al. |
| 2020/0091958 A1 | 3/2020 | Curtis et al. |
| 2020/0092625 A1 | 3/2020 | Raffle |
| 2020/0098352 A1 | 3/2020 | Feinstein et al. |
| 2020/0098362 A1 | 3/2020 | Piemot et al. |
| 2020/0098368 A1 | 3/2020 | Lemay et al. |
| 2020/0103963 A1 | 4/2020 | Kelly et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piemot et al. |
| 2020/0112454 A1 | 4/2020 | Brown et al. |
| 2020/0117717 A1 | 4/2020 | Ramamurti et al. |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0134316 A1 | 4/2020 | Krishnamurthy et al. |
| 2020/0135180 A1 | 4/2020 | Mukherjee et al. |
| 2020/0135209 A1 | 4/2020 | Delfarah et al. |
| 2020/0135226 A1 | 4/2020 | Mittal et al. |
| 2020/0137230 A1 | 4/2020 | Spohrer |
| 2020/0143812 A1 | 5/2020 | Walker, II et al. |
| 2020/0143819 A1 | 5/2020 | Delcroix et al. |
| 2020/0152186 A1 | 5/2020 | Koh et al. |
| 2020/0159579 A1 | 5/2020 | Shear et al. |
| 2020/0159651 A1 | 5/2020 | Myers |
| 2020/0159801 A1 | 5/2020 | Sekine |
| 2020/0160179 A1 | 5/2020 | Chien et al. |
| 2020/0160838 A1 | 5/2020 | Lee |
| 2020/0168120 A1 | 5/2020 | Rodriguez Bravo |
| 2020/0169637 A1 | 5/2020 | Sanghavi et al. |
| 2020/0175566 A1 | 6/2020 | Bender et al. |
| 2020/0176004 A1 | 6/2020 | Kleijn et al. |

(56) References Cited

U.S. PATENT DOCUMENTS

| | | |
|---|---|---|
| 2020/0176018 A1 | 6/2020 | Feinauer et al. |
| 2020/0184057 A1 | 6/2020 | Mukund |
| 2020/0184964 A1 | 6/2020 | Myers et al. |
| 2020/0184966 A1 | 6/2020 | Yavagal |
| 2020/0193997 A1 | 6/2020 | Piernot et al. |
| 2020/0210142 A1 | 7/2020 | Mu et al. |
| 2020/0211566 A1 | 7/2020 | Kang et al. |
| 2020/0218074 A1 | 7/2020 | Hoover et al. |
| 2020/0218780 A1 | 7/2020 | Jun et al. |
| 2020/0219517 A1 | 7/2020 | Wang et al. |
| 2020/0221155 A1 | 7/2020 | Hansen et al. |
| 2020/0226823 A1 | 7/2020 | Stachniak et al. |
| 2020/0227034 A1 | 7/2020 | Summa et al. |
| 2020/0227044 A1 | 7/2020 | Lindahl |
| 2020/0228774 A1 | 7/2020 | Kar et al. |
| 2020/0243069 A1 | 7/2020 | Amores et al. |
| 2020/0243094 A1 | 7/2020 | Thomson et al. |
| 2020/0249985 A1 | 8/2020 | Zeitlin |
| 2020/0252508 A1 | 8/2020 | Gray |
| 2020/0258508 A1 | 8/2020 | Aggarwal et al. |
| 2020/0267222 A1 | 8/2020 | Phipps et al. |
| 2020/0272485 A1 | 8/2020 | Karashchuk et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294487 A1 | 9/2020 | Donohoe et al. |
| 2020/0294494 A1 | 9/2020 | Suyama et al. |
| 2020/0298394 A1 | 9/2020 | Han et al. |
| 2020/0301950 A1 | 9/2020 | Theo et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312315 A1 | 10/2020 | Li et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0320592 A1 | 10/2020 | Soule et al. |
| 2020/0327895 A1 | 10/2020 | Gruber et al. |
| 2020/0333875 A1 | 10/2020 | Bansal et al. |
| 2020/0334492 A1 | 10/2020 | Zheng et al. |
| 2020/0335121 A1 | 10/2020 | Mosseri et al. |
| 2020/0342082 A1 | 10/2020 | Sapozhnykov et al. |
| 2020/0342849 A1 | 10/2020 | Yu et al. |
| 2020/0342863 A1 | 10/2020 | Aggarwal et al. |
| 2020/0356243 A1 | 11/2020 | Meyer et al. |
| 2020/0356589 A1 | 11/2020 | Rekik et al. |
| 2020/0356634 A1 | 11/2020 | Srinivasan et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0364858 A1 | 11/2020 | Kaethner et al. |
| 2020/0365155 A1 | 11/2020 | Milden |
| 2020/0367006 A1 | 11/2020 | Beckhardt |
| 2020/0372633 A1 | 11/2020 | Lee, II et al. |
| 2020/0372904 A1 | 11/2020 | Vescovi et al. |
| 2020/0372905 A1 | 11/2020 | Wang et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2021/0110106 A1 | 12/2020 | Vescovi et al. |
| 2021/0006943 A1 | 1/2021 | Gross et al. |
| 2021/0011557 A1 | 1/2021 | Lemay et al. |
| 2021/0012113 A1 | 1/2021 | Petill et al. |
| 2021/0012775 A1 | 1/2021 | Kang et al. |
| 2021/0012776 A1 | 1/2021 | Peterson et al. |
| 2021/0043190 A1 | 2/2021 | Wang et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0074264 A1 | 3/2021 | Liang et al. |
| 2021/0074295 A1 | 3/2021 | Moreno et al. |
| 2021/0082400 A1 | 3/2021 | Vishnoi et al. |
| 2021/0090314 A1 | 3/2021 | Hussen et al. |
| 2021/0097998 A1 | 4/2021 | Kim et al. |
| 2021/0104232 A1 | 4/2021 | Lee et al. |
| 2021/0105528 A1 | 4/2021 | Van Os et al. |
| 2021/0110115 A1 | 4/2021 | Moritz et al. |
| 2021/0110254 A1 | 4/2021 | Duy et al. |
| 2021/0124597 A1 | 4/2021 | Ramakrishnan et al. |
| 2021/0127220 A1 | 4/2021 | Mathieu et al. |
| 2021/0134318 A1 | 5/2021 | Harvey et al. |
| 2021/0141839 A1 | 5/2021 | Tang et al. |
| 2021/0143987 A1 | 5/2021 | Xu et al. |
| 2021/0149629 A1 | 5/2021 | Martel et al. |
| 2021/0149996 A1 | 5/2021 | Bellegarda |
| 2021/0150151 A1 | 5/2021 | Jiaming et al. |
| 2021/0151041 A1 | 5/2021 | Gruber et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |
| 2021/0176521 A1 | 6/2021 | Matthews |
| 2021/0182716 A1 | 6/2021 | Muramoto et al. |
| 2021/0191603 A1 | 6/2021 | Napolitano et al. |
| 2021/0191968 A1 | 6/2021 | Orr et al. |
| 2021/0208752 A1 | 7/2021 | Hwang |
| 2021/0208841 A1 | 7/2021 | Wilberding |
| 2021/0216134 A1 | 7/2021 | Fukunaga et al. |
| 2021/0216760 A1 | 7/2021 | Dominic et al. |
| 2021/0224032 A1 | 7/2021 | Ryan et al. |
| 2021/0224474 A1 | 7/2021 | Jerome et al. |
| 2021/0233532 A1 | 7/2021 | Aram et al. |
| 2021/0248804 A1 | 8/2021 | Hussen Abdelaziz et al. |
| 2021/0249009 A1 | 8/2021 | Manjunath et al. |
| 2021/0258881 A1 | 8/2021 | Freeman et al. |
| 2021/0264913 A1 | 8/2021 | Schramm et al. |
| 2021/0264916 A1 | 8/2021 | Kim et al. |
| 2021/0271333 A1 | 9/2021 | Hindi et al. |
| 2021/0273894 A1 | 9/2021 | Tian et al. |
| 2021/0278956 A1 | 9/2021 | Dolbakian et al. |
| 2021/0281965 A1 | 9/2021 | Malik et al. |
| 2021/0294569 A1 | 9/2021 | Piersol et al. |
| 2021/0294571 A1 | 9/2021 | Carson et al. |
| 2021/0295602 A1 | 9/2021 | Scapel et al. |
| 2021/0303116 A1 | 9/2021 | Barlow |
| 2021/0303342 A1 | 9/2021 | Dunn et al. |
| 2021/0304075 A1 | 9/2021 | Duong et al. |
| 2021/0306812 A1 | 9/2021 | Gross et al. |
| 2021/0312930 A1 | 10/2021 | Sugaya |
| 2021/0312931 A1 | 10/2021 | Paulik et al. |
| 2021/0314440 A1 | 10/2021 | Matias et al. |
| 2021/0318901 A1 | 10/2021 | Gruber et al. |
| 2021/0327409 A1 | 10/2021 | Naik |
| 2021/0327410 A1 | 10/2021 | Beaufays et al. |
| 2021/0334528 A1 | 10/2021 | Bray et al. |
| 2021/0335342 A1 | 10/2021 | Yuan et al. |
| 2021/0349605 A1 | 11/2021 | Nonaka et al. |
| 2021/0349608 A1 | 11/2021 | Blatz et al. |
| 2021/0350799 A1 | 11/2021 | Hansen et al. |
| 2021/0350803 A1 | 11/2021 | Hansen et al. |
| 2021/0350810 A1 | 11/2021 | Phipps et al. |
| 2021/0352115 A1 | 11/2021 | Hansen et al. |
| 2021/0357172 A1 | 11/2021 | Sinesio et al. |

(56) References Cited

U.S. PATENT DOCUMENTS

| | | |
|---|---|---|
| 2021/0365161 A1 | 11/2021 | Ellis et al. |
| 2021/0365174 A1 | 11/2021 | Ellis et al. |
| 2021/0365641 A1 | 11/2021 | Zhang et al. |
| 2021/0366473 A1 | 11/2021 | Maeng |
| 2021/0366480 A1 | 11/2021 | Lemay et al. |
| 2021/0373851 A1 | 12/2021 | Stasior et al. |
| 2021/0375290 A1 | 12/2021 | Hu et al. |
| 2021/0377381 A1 | 12/2021 | Aggarwal et al. |
| 2021/0390259 A1 | 12/2021 | Hildick-Smith et al. |
| 2021/0390955 A1 | 12/2021 | Piernot et al. |
| 2021/0393168 A1 | 12/2021 | Santarelli et al. |
| 2021/0402306 A1 | 12/2021 | Huang |
| 2021/0407318 A1 | 12/2021 | Pitschel et al. |
| 2021/0407502 A1 | 12/2021 | Vescovi et al. |
| 2022/0004825 A1 | 1/2022 | Xie et al. |
| 2022/0013106 A1 | 1/2022 | Deng et al. |
| 2022/0019292 A1 | 1/2022 | Lemay et al. |
| 2022/0021631 A1 | 1/2022 | Jina et al. |
| 2022/0021978 A1 | 1/2022 | Gui et al. |
| 2022/0028387 A1 | 1/2022 | Walker et al. |
| 2022/0030345 A1 | 1/2022 | Gong et al. |
| 2022/0035999 A1 | 2/2022 | Pawelec |
| 2022/0043986 A1 | 2/2022 | Nell et al. |
| 2022/0067283 A1 | 3/2022 | Bellegarda et al. |
| 2022/0068278 A1 | 3/2022 | York et al. |
| 2022/0083986 A1 | 3/2022 | Duffy et al. |
| 2022/0084511 A1 | 3/2022 | Nickson et al. |
| 2022/0093088 A1 | 3/2022 | Sridhar et al. |
| 2022/0093095 A1 | 3/2022 | Dighe et al. |
| 2022/0093101 A1 | 3/2022 | Krishnan et al. |
| 2022/0093109 A1 | 3/2022 | Orr et al. |
| 2022/0093110 A1 | 3/2022 | Kim et al. |
| 2022/0094765 A1 | 3/2022 | Niewczas |
| 2022/0107780 A1 | 4/2022 | Gruber et al. |
| 2022/0122615 A1 | 4/2022 | Chen et al. |
| 2022/0130126 A1 | 4/2022 | Delgado et al. |
| 2022/0139396 A1 | 5/2022 | Gada et al. |
| 2022/0148587 A1 | 5/2022 | Drummie et al. |
| 2022/0156041 A1 | 5/2022 | Newendorp et al. |
| 2022/0157310 A1 | 5/2022 | Newendorp et al. |
| 2022/0157315 A1 | 5/2022 | Raux et al. |
| 2022/0197491 A1 | 6/2022 | Meyer et al. |
| 2022/0206298 A1 | 6/2022 | Goodman |
| 2022/0214775 A1 | 7/2022 | Shah et al. |
| 2022/0229985 A1 | 7/2022 | Bellegarda et al. |
| 2022/0230653 A1 | 7/2022 | Binder et al. |
| 2022/0253969 A1 | 8/2022 | Kamenetskaya et al. |
| 2022/0254338 A1 | 8/2022 | Gruber et al. |
| 2022/0254339 A1 | 8/2022 | Acero et al. |
| 2022/0254347 A1 | 8/2022 | Lindahl |
| 2022/0262354 A1 | 8/2022 | Greborio et al. |
| 2022/0264262 A1 | 8/2022 | Gruber et al. |
| 2022/0284901 A1 | 9/2022 | Novitchenko et al. |
| 2022/0293124 A1 | 9/2022 | Weinberg et al. |
| 2022/0293125 A1 | 9/2022 | Maddika et al. |
| 2022/0300094 A1 | 9/2022 | Hindi et al. |
| 2022/0301566 A1 | 9/2022 | Van Os et al. |
| 2022/0329691 A1 | 10/2022 | Chinthakunta et al. |
| 2023/0013615 A1 | 1/2023 | Sanghavi et al. |
| 2023/0058929 A1 | 2/2023 | Lasko et al. |
| 2023/0215435 A1 | 7/2023 | Manjunath et al. |

FOREIGN PATENT DOCUMENTS

| | | |
|---|---|---|
| AU | 2015101171 A4 | 10/2015 |
| AU | 2018100187 A4 | 3/2018 |
| AU | 2017222436 A1 | 10/2018 |
| CA | 2666438 C | 6/2013 |
| CH | 709795 A1 | 12/2015 |
| CN | 102324233 A | 1/2012 |
| CN | 102340590 A | 2/2012 |
| CN | 102346557 A | 2/2012 |
| CN | 102346719 A | 2/2012 |
| CN | 102368256 A | 3/2012 |
| CN | 102402985 A | 4/2012 |
| CN | 102405463 A | 4/2012 |
| CN | 102449438 A | 5/2012 |
| CN | 102483915 A | 5/2012 |
| CN | 102495406 A | 6/2012 |
| CN | 102498457 A | 6/2012 |
| CN | 102510426 A | 6/2012 |
| CN | 102520789 A | 6/2012 |
| CN | 101661754 B | 7/2012 |
| CN | 102629246 A | 8/2012 |
| CN | 102647628 A | 8/2012 |
| CN | 102651217 A | 8/2012 |
| CN | 102663016 A | 9/2012 |
| CN | 102681761 A | 9/2012 |
| CN | 102681896 A | 9/2012 |
| CN | 102682769 A | 9/2012 |
| CN | 102682771 A | 9/2012 |
| CN | 102685295 A | 9/2012 |
| CN | 102693725 A | 9/2012 |
| CN | 102694909 A | 9/2012 |
| CN | 202453859 U | 9/2012 |
| CN | 102708867 A | 10/2012 |
| CN | 102710976 A | 10/2012 |
| CN | 102722478 A | 10/2012 |
| CN | 102737104 A | 10/2012 |
| CN | 102750087 A | 10/2012 |
| CN | 102820033 A | 10/2012 |
| CN | 102792320 A | 11/2012 |
| CN | 102801853 A | 11/2012 |
| CN | 102820033 A | 12/2012 |
| CN | 102844738 A | 12/2012 |
| CN | 102866828 A | 1/2013 |
| CN | 102870065 A | 1/2013 |
| CN | 102882752 A | 1/2013 |
| CN | 102890936 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103093334 A | 5/2013 |
| CN | 103093755 A | 5/2013 |
| CN | 103109249 A | 5/2013 |
| CN | 103135916 A | 6/2013 |
| CN | 103187053 A | 7/2013 |
| CN | 103197963 A | 7/2013 |
| CN | 103198831 A | 7/2013 |
| CN | 103209369 A | 7/2013 |
| CN | 103217892 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103280218 A | 9/2013 |
| CN | 103282957 A | 9/2013 |
| CN | 103292437 A | 9/2013 |
| CN | 103324100 A | 9/2013 |
| CN | 103327063 A | 9/2013 |
| CN | 103365279 A | 10/2013 |
| CN | 103366741 A | 10/2013 |
| CN | 203249629 U | 10/2013 |
| CN | 103390016 A | 11/2013 |
| CN | 103412789 A | 11/2013 |
| CN | 103414949 A | 11/2013 |
| CN | 103426428 A | 12/2013 |
| CN | 103455234 A | 12/2013 |
| CN | 103456303 A | 12/2013 |
| CN | 103456304 A | 12/2013 |
| CN | 103456306 A | 12/2013 |
| CN | 103457837 A | 12/2013 |
| CN | 103475551 A | 12/2013 |
| CN | 103477592 A | 12/2013 |
| CN | 103533143 A | 1/2014 |
| CN | 103533154 A | 1/2014 |
| CN | 103543902 A | 1/2014 |
| CN | 103546453 A | 1/2014 |

(56) References Cited

FOREIGN PATENT DOCUMENTS

| | | | |
|---|---|---|---|
| CN | 103562863 A | 2/2014 |
| CN | 103582896 A | 2/2014 |
| CN | 103593054 A | 2/2014 |
| CN | 103608859 A | 2/2014 |
| CN | 103620605 A | 3/2014 |
| CN | 103645876 A | 3/2014 |
| CN | 103677261 A | 3/2014 |
| CN | 103686723 A | 3/2014 |
| CN | 103714816 A | 4/2014 |
| CN | 103716454 A | 4/2014 |
| CN | 103727948 A | 4/2014 |
| CN | 103730120 A | 4/2014 |
| CN | 103744761 A | 4/2014 |
| CN | 103760984 A | 4/2014 |
| CN | 103761104 A | 4/2014 |
| CN | 103765385 A | 4/2014 |
| CN | 103778527 A | 5/2014 |
| CN | 103780758 A | 5/2014 |
| CN | 103792985 A | 5/2014 |
| CN | 103794212 A | 5/2014 |
| CN | 103795850 A | 5/2014 |
| CN | 103809548 A | 5/2014 |
| CN | 103841268 A | 6/2014 |
| CN | 103885663 A | 6/2014 |
| CN | 103902373 A | 7/2014 |
| CN | 103930945 A | 7/2014 |
| CN | 103942932 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 102693729 B | 9/2014 |
| CN | 104036774 A | 9/2014 |
| CN | 104038621 A | 9/2014 |
| CN | 104050153 A | 9/2014 |
| CN | 104090652 A | 10/2014 |
| CN | 104092829 A | 10/2014 |
| CN | 104113471 A | 10/2014 |
| CN | 104125322 A | 10/2014 |
| CN | 104144377 A | 11/2014 |
| CN | 104145304 A | 11/2014 |
| CN | 104169837 A | 11/2014 |
| CN | 104180815 A | 12/2014 |
| CN | 104185868 A | 12/2014 |
| CN | 104219785 A | 12/2014 |
| CN | 104240701 A | 12/2014 |
| CN | 104243699 A | 12/2014 |
| CN | 104281259 A | 1/2015 |
| CN | 104281390 A | 1/2015 |
| CN | 104284257 A | 1/2015 |
| CN | 104284486 A | 1/2015 |
| CN | 104335207 A | 2/2015 |
| CN | 104335234 A | 2/2015 |
| CN | 104350454 A | 2/2015 |
| CN | 104360990 A | 2/2015 |
| CN | 104374399 A | 2/2015 |
| CN | 104423625 A | 3/2015 |
| CN | 104423780 A | 3/2015 |
| CN | 104427104 A | 3/2015 |
| CN | 104463552 A | 3/2015 |
| CN | 104464733 A | 3/2015 |
| CN | 104487929 A | 4/2015 |
| CN | 104516522 A | 4/2015 |
| CN | 104573472 A | 4/2015 |
| CN | 104575493 A | 4/2015 |
| CN | 104575501 A | 4/2015 |
| CN | 104575504 A | 4/2015 |
| CN | 104584010 A | 4/2015 |
| CN | 104584096 A | 4/2015 |
| CN | 104584601 A | 4/2015 |
| CN | 104604274 A | 5/2015 |
| CN | 104679472 A | 6/2015 |
| CN | 104685898 A | 6/2015 |
| CN | 104699746 A | 6/2015 |
| CN | 104731441 A | 6/2015 |
| CN | 104769584 A | 7/2015 |
| CN | 104769670 A | 7/2015 |
| CN | 104798012 A | 7/2015 |
| CN | 104821167 A | 8/2015 |
| CN | 104821934 A | 8/2015 |
| CN | 104836909 A | 8/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105144136 A | 12/2015 |
| CN | 105164678 A | 12/2015 |
| CN | 105164719 A | 12/2015 |
| CN | 105190607 A | 12/2015 |
| CN | 105247511 A | 1/2016 |
| CN | 105247551 A | 1/2016 |
| CN | 105264524 A | 1/2016 |
| CN | 105278681 A | 1/2016 |
| CN | 105320251 A | 2/2016 |
| CN | 105320726 A | 2/2016 |
| CN | 105338425 A | 2/2016 |
| CN | 105379234 A | 3/2016 |
| CN | 105430186 A | 3/2016 |
| CN | 105471705 A | 4/2016 |
| CN | 105472587 A | 4/2016 |
| CN | 105516441 A | 4/2016 |
| CN | 105554217 A | 5/2016 |
| CN | 105556592 A | 5/2016 |
| CN | 105808200 A | 7/2016 |
| CN | 105830048 A | 8/2016 |
| CN | 105869641 A | 8/2016 |
| CN | 105872222 A | 8/2016 |
| CN | 105917311 A | 8/2016 |
| CN | 106030699 A | 10/2016 |
| CN | 106062734 A | 10/2016 |
| CN | 106062790 A | 10/2016 |
| CN | 106415412 A | 2/2017 |
| CN | 106462383 A | 2/2017 |
| CN | 106463114 A | 2/2017 |
| CN | 106465074 A | 2/2017 |
| CN | 106471570 A | 3/2017 |
| CN | 106534469 A | 3/2017 |
| CN | 106558310 A | 4/2017 |
| CN | 106773742 A | 5/2017 |
| CN | 106776581 A | 5/2017 |
| CN | 107004412 A | 8/2017 |
| CN | 107450800 A | 12/2017 |
| CN | 107480161 A | 12/2017 |
| CN | 107491285 A | 12/2017 |
| CN | 107491468 A | 12/2017 |
| CN | 107506037 A | 12/2017 |
| CN | 107545262 A | 1/2018 |
| CN | 107608998 A | 1/2018 |
| CN | 107615378 A | 1/2018 |
| CN | 107623616 A | 1/2018 |
| CN | 107786730 A | 3/2018 |
| CN | 107852436 A | 3/2018 |
| CN | 107871500 A | 4/2018 |
| CN | 107919123 A | 4/2018 |
| CN | 107924313 A | 4/2018 |
| CN | 107978313 A | 5/2018 |
| CN | 108268187 A | 7/2018 |
| CN | 108647681 A | 10/2018 |
| CN | 109447234 A | 3/2019 |
| CN | 109657629 A | 4/2019 |
| CN | 110135411 A | 6/2019 |
| CN | 110135411 A | 8/2019 |
| CN | 110263144 A | 9/2019 |
| CN | 105164719 B | 11/2019 |
| CN | 110531860 A | 12/2019 |
| CN | 110598671 A | 12/2019 |
| CN | 110647274 A | 1/2020 |

(56) References Cited

FOREIGN PATENT DOCUMENTS

| | | |
|---|---|---|
| CN | 110825469 A | 2/2020 |
| CN | 110945840 A | 3/2020 |
| CN | 111124224 A | 5/2020 |
| CN | 107123417 B | 6/2020 |
| CN | 111316203 A | 6/2020 |
| CN | 112204507 A | 1/2021 |
| DE | 202016008226 U1 | 5/2017 |
| EP | 2431842 A2 | 3/2012 |
| EP | 2523109 A1 | 11/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2743846 A2 | 6/2014 |
| EP | 2760015 A1 | 7/2014 |
| EP | 2779160 A1 | 9/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2915021 A2 | 9/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2973380 A2 | 1/2016 |
| EP | 2985984 A2 | 2/2016 |
| EP | 2988513 A1 | 2/2016 |
| EP | 2891049 A4 | 3/2016 |
| EP | 3032532 A1 | 6/2016 |
| EP | 3035329 A1 | 6/2016 |
| EP | 3038333 A1 | 6/2016 |
| EP | 3107101 A1 | 12/2016 |
| EP | 3115905 A1 | 1/2017 |
| EP | 3125097 A2 | 2/2017 |
| EP | 2672231 B1 | 5/2017 |
| EP | 3161612 A1 | 5/2017 |
| EP | 3200185 A1 | 8/2017 |
| EP | 3224708 A1 | 10/2017 |
| EP | 3227771 A1 | 10/2017 |
| EP | 3246916 A1 | 11/2017 |
| EP | 3270658 A1 | 1/2018 |
| EP | 3300074 A1 | 3/2018 |
| EP | 3336805 A1 | 6/2018 |
| EP | 2973380 B1 | 8/2018 |
| EP | 2983065 B1 | 8/2018 |
| EP | 3382530 A1 | 10/2018 |
| EP | 3392876 A1 | 10/2018 |
| EP | 3401773 A1 | 11/2018 |
| EP | 2973002 B1 | 6/2019 |
| EP | 3506151 A1 | 7/2019 |
| EP | 3550483 A1 | 10/2019 |
| EP | 3567584 A1 | 11/2019 |
| EP | 3323058 B1 | 2/2020 |
| EP | 3321928 B1 | 4/2020 |
| IN | 2011MU03716 A | 2/2012 |
| IN | 2012MU01227 A | 6/2012 |
| JP | 2012-14394 A | 1/2012 |
| JP | 2012-502377 A | 1/2012 |
| JP | 2012-22478 A | 2/2012 |
| JP | 2012-33997 A | 2/2012 |
| JP | 2012-37619 A | 2/2012 |
| JP | 2012-40655 A | 2/2012 |
| JP | 2012-40655 A | 3/2012 |
| JP | 2012-63536 A | 3/2012 |
| JP | 2012-508530 A | 4/2012 |
| JP | 2012-89020 A | 5/2012 |
| JP | 2012-511774 A | 5/2012 |
| JP | 10-2012-0066523 A | 6/2012 |
| JP | 2012-116442 A | 6/2012 |
| JP | 2012-142744 A | 7/2012 |
| JP | 2012-147063 A | 8/2012 |
| JP | 2012-150804 A | 8/2012 |
| JP | 2012-164070 A | 8/2012 |
| JP | 2012-165084 A | 8/2012 |
| JP | 2012-518847 A | 8/2012 |
| JP | 2012-211932 A | 11/2012 |
| JP | 2012-220959 A | 11/2012 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-517566 A | 5/2013 |
| JP | 2013-131087 A | 7/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2012-22478 A | 8/2013 |
| JP | 2013-148419 A | 8/2013 |
| JP | 2013-156349 A | 8/2013 |
| JP | 2012-37619 A | 9/2013 |
| JP | 2013-174987 A | 9/2013 |
| JP | 2013-535059 A | 9/2013 |
| JP | 2013-200265 A | 10/2013 |
| JP | 2013-200423 A | 10/2013 |
| JP | 2013-205999 A | 10/2013 |
| JP | 2013-238935 A | 11/2013 |
| JP | 2013-238936 A | 11/2013 |
| JP | 2013-248292 A | 12/2013 |
| JP | 2013-257694 A | 12/2013 |
| JP | 2013-258600 A | 12/2013 |
| JP | 10-2014-0007282 A | 1/2014 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 10-2014-0042994 A | 4/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 10-2014-0071208 A | 6/2014 |
| JP | 2014-109889 A | 6/2014 |
| JP | 2014-124332 A | 7/2014 |
| JP | 2014-126600 A | 7/2014 |
| JP | 2014-127754 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-524627 A | 9/2014 |
| JP | 2014-191272 A | 10/2014 |

(56) References Cited

FOREIGN PATENT DOCUMENTS

| | | |
|---|---|---|
| JP | 2014-219614 A | 11/2014 |
| JP | 2014-222514 A | 11/2014 |
| JP | 2015-1931 A | 1/2015 |
| JP | 2015-4928 A | 1/2015 |
| JP | 2015-8001 A | 1/2015 |
| JP | 2015-12301 A | 1/2015 |
| JP | 2015-18365 A | 1/2015 |
| JP | 2015-501022 A | 1/2015 |
| JP | 2015-501034 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 10-2015-0039380 A | 4/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 10-2015-0062811 A | 6/2015 |
| JP | 2015-519675 A | 7/2015 |
| JP | 2015-520409 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-35614 A | 2/2016 |
| JP | 2016-504651 A | 2/2016 |
| JP | 2016-35614 A | 3/2016 |
| JP | 2016-508007 A | 3/2016 |
| JP | 10-2016-0055839 A | 5/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 10-2016-0105847 A | 9/2016 |
| JP | 2016-156845 A | 9/2016 |
| JP | 10-2016-0121585 A | 10/2016 |
| JP | 2016-536648 A | 11/2016 |
| JP | 2017-11608 A | 1/2017 |
| JP | 2017-19331 A | 1/2017 |
| JP | 2017-516153 A | 6/2017 |
| JP | 2017-123187 A | 7/2017 |
| JP | 2017-211608 A | 11/2017 |
| JP | 2017-537361 A | 12/2017 |
| JP | 6291147 B1 | 2/2018 |
| JP | 2018-64297 A | 3/2018 |
| JP | 2018-64297 A | 4/2018 |
| JP | 2018-511095 A | 4/2018 |
| JP | 2018-101242 A | 6/2018 |
| JP | 2018-113035 A | 7/2018 |
| JP | 2018-525950 A | 9/2018 |
| JP | 2018-536889 A | 12/2018 |
| JP | 10-2020-0105519 A | 9/2020 |
| KR | 10-2012-0020164 A | 3/2012 |
| KR | 10-2012-0031722 A | 4/2012 |
| KR | 10-2012-0066523 A | 6/2012 |
| KR | 10-2012-0082371 A | 7/2012 |
| KR | 10-2012-0084472 A | 7/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0086750 A | 8/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0007282 A | 1/2014 |
| KR | 10-2014-0024271 A | 2/2014 |
| KR | 10-2014-0025996 A | 3/2014 |
| KR | 10-2014-0031283 A | 3/2014 |
| KR | 10-2014-0033574 A | 3/2014 |
| KR | 10-2014-0042994 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0071208 A | 6/2014 |
| KR | 10-2014-0088449 A | 7/2014 |
| KR | 10-2014-0093949 A | 7/2014 |
| KR | 10-2014-0106715 A | 9/2014 |
| KR | 10-2014-0107253 A | 9/2014 |
| KR | 10-2014-0147557 A | 12/2014 |
| KR | 10-2015-0006454 A | 1/2015 |
| KR | 10-2015-0013631 A | 2/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-1510013 B1 | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0131262 A | 11/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101079 A | 8/2016 |
| KR | 10-2016-0101198 A | 8/2016 |
| KR | 10-2016-0105847 A | 9/2016 |
| KR | 10-2016-0121585 A | 10/2016 |
| KR | 10-2016-0127165 A | 11/2016 |
| KR | 10-2016-0140694 A | 12/2016 |
| KR | 10-2016-0147854 A | 12/2016 |
| KR | 10-2017-0004482 A | 1/2017 |
| KR | 10-2017-0036805 A | 4/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-2018-0135877 A | 12/2018 |
| KR | 10-1959328 B1 | 3/2019 |
| KR | 10-2020-0105519 A | 9/2020 |
| RU | 2012141604 A | 4/2014 |
| TW | 201227715 A | 7/2012 |
| TW | 201245989 A | 11/2012 |
| TW | 201312548 A | 3/2013 |
| TW | 201407184 A | 2/2014 |
| TW | 201610982 A | 3/2016 |
| TW | 201629750 A | 8/2016 |
| WO | 2007/009225 A1 | 1/2007 |
| WO | 2010/109358 A1 | 9/2010 |
| WO | 2011/088053 A2 | 7/2011 |
| WO | 2011/133573 A2 | 10/2011 |
| WO | 2011/097309 A3 | 12/2011 |
| WO | 2011/088053 A3 | 1/2012 |
| WO | 2012/008434 A1 | 1/2012 |
| WO | 2012/019020 A1 | 2/2012 |
| WO | 2012/019637 A1 | 2/2012 |
| WO | 2012/033312 A1 | 3/2012 |
| WO | 2012/056463 A1 | 5/2012 |
| WO | 2012/063260 A2 | 5/2012 |
| WO | 2012/084965 A1 | 6/2012 |
| WO | 2012/092562 A1 | 7/2012 |
| WO | 2012/112331 A2 | 8/2012 |
| WO | 2012/129231 A1 | 9/2012 |
| WO | 2012/063260 A3 | 10/2012 |
| WO | 2012/135157 A2 | 10/2012 |
| WO | 2012/154317 A1 | 11/2012 |
| WO | 2012/154748 A1 | 11/2012 |
| WO | 2012/155079 A2 | 11/2012 |

(56) References Cited

FOREIGN PATENT DOCUMENTS

| | | |
|---|---|---|
| WO | 2012/160567 A1 | 11/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/101489 A1 | 7/2013 |
| WO | 2013/118988 A1 | 8/2013 |
| WO | 2013/122310 A1 | 8/2013 |
| WO | 2013/128999 A1 | 9/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/018580 A1 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/040022 A2 | 3/2014 |
| WO | 2014/046475 A1 | 3/2014 |
| WO | 2014/047047 A1 | 3/2014 |
| WO | 2014/048855 A1 | 4/2014 |
| WO | 2014/066352 A1 | 5/2014 |
| WO | 2014/070872 A2 | 5/2014 |
| WO | 2014/073825 A1 | 5/2014 |
| WO | 2014/078965 A1 | 5/2014 |
| WO | 2014/093339 A1 | 6/2014 |
| WO | 2014/093911 A2 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/149473 A1 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197339 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/204659 A2 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/036817 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/054141 A1 | 4/2015 |
| WO | 2015/080530 A1 | 6/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |
| WO | 2015/112625 A1 | 7/2015 |
| WO | 2015/116151 A1 | 8/2015 |
| WO | 2015/121449 A1 | 8/2015 |
| WO | 2015/127404 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183368 A1 | 12/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/040721 A1 | 3/2016 |
| WO | 2016/048789 A1 | 3/2016 |
| WO | 2016/051519 A1 | 4/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/089029 A1 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/200777 A1 | 11/2017 |
| WO | 2017/203484 A1 | 11/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/044633 A1 | 3/2018 |
| WO | 2018/057269 A1 | 3/2018 |
| WO | 2018/067528 A1 | 4/2018 |
| WO | 2018/176053 A1 | 9/2018 |
| WO | 2018/209152 A1 | 11/2018 |
| WO | 2018/213401 A1 | 11/2018 |
| WO | 2018/213415 A1 | 11/2018 |
| WO | 2018/231307 A1 | 12/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/236217 A1 | 12/2019 |
| WO | 2020/010530 A1 | 1/2020 |
| WO | 2020/022572 A1 | 1/2020 |

(56) References Cited

FOREIGN PATENT DOCUMENTS

| | | |
|---|---|---|
| WO | 2020/109074 A1 | 6/2020 |
| WO | 2021/054565 A1 | 3/2021 |
| WO | 2021/252230 A1 | 12/2021 |

OTHER PUBLICATIONS

"Alexa, Turn Up the Heat!, Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Alfred App, "Alfred", Online available at:—<http://www.alfredapp.com/>, retrieved on Feb. 8, 2012, 5 pages.
Anania Peter, "Amazon Echo with Home Automation (Smartthings)", Online available at:—<https://www.youtube.com/watch?v=LMW6aXmsWNE>, Dec. 20, 2015, 1 page.
Apple, "VoiceOver for OS X", Online available at:—<http://www.apple.com/accessibility/voiceover/>, May 19, 2014, pp. 1-3.
Asakura et al., "What LG thinks; How the TV should be in the Living Room", HiVi, vol. 31, No. 7, Stereo Sound Publishing, Inc., Jun. 17, 2013, pp. 68-71.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
beointegration.com, "BeoLink Gateway—Programming Example", Online Available at: <https:/ /www.youtube.com/watch?v=TXDaJFm5UH4>, Mar. 4, 2015, 3 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Butcher, Mike, "Evi Arrives in Town to go Toe-to-Toe with Siri", TechCrunch, Jan. 23, 2012, pp. 1-2.
Cambria et al., "Jumping NLP curves: A Review of Natural Language Processing Research.", IEEE Computational Intelligence magazine, 2014, vol. 9, May 2014, pp. 48-57.
Caraballo et al., "Language Identification Based on a Discriminative Text Categorization Technique", Iberspeech 2012—VII Jornadas En Tecnologia Del Habla and III Iberian Sltech Workshop, Nov. 21, 2012, pp. 1-10.
Castleos, "Whole House Voice Control Demonstration", Online available at:—<https://www.youtube.com/watch?v=9SRCoxrZ_W4>, Jun. 2, 2012, 1 pages.
Chang et al., "Monaural Multi-Talker Speech Recognition with Attention Mechanism and Gated Convolutional Networks", Interspeech 2018, Sep. 2-6, 2018, pp. 1586-1590.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Yi, "Multimedia Siri Finds and Plays Whatever You Ask for", PSFK Report, Feb. 9, 2012, pp. 1-9.
Cheyer, Adam, "Adam Cheyer—About", Online available at:—<http://www.adam.cheyer.com/about.html>, retrieved on Sep. 17, 2012, pp. 1-2.
Colt, Sam, "Here's One Way Apple's Smartwatch Could Be Better Than Anything Else", Business Insider, Aug. 21, 2014, pp. 1-4.
Czech Lucas, "A System for Recognizing Natural Spelling of English Words", Diploma Thesis, Karlsruhe Institute of Technology, May 7, 2014, 107 pages.
Decision on Appeal received for Korean Patent Application No. 10-2017-7033045, mailed on Feb. 19, 2020, 32 pages.
Decision to Grant received for Japanese Patent Application No. 2017-553158, mailed on Jun. 14, 2019, 5 pages.
Decision to Refuse received for European Patent Application No. 16725334.3, mailed on Jul. 13, 2021, 13 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
"Directv™ Voice", Now Part of the Directtv Mobile App for Phones, Sep. 18, 2013, 5 pages.
Earthling 1984, "Samsung Galaxy Smart Stay Feature Explained", Online available at:—<https://www.youtube.com/watch?v=RpjBNtSjupl>, May 29, 2013, 1 page.
Evi, "Meet Evi: The One Mobile Application that Provides Solutions for your Everyday Problems", Feb. 2012, 3 pages.
Filipowicz, Luke, "How to use the QuickType keyboard in iOS 8", Online available at:—<https://www.imore.com/comment/568232>, Oct. 11, 2014, pp. 1-17.
Final Office Action received for U.S. Appl. No. 14/713,410, mailed on Nov. 30, 2018, 11 pages.
Findlater et al., "Beyond QWERTY: Augmenting Touch-Screen Keyboards with Multi-Touch Gestures for Non-Alphanumeric Input", CHI '12, May 5-10, 2012, 4 pages.
"Galaxy S7: How to Adjust Screen Timeout & Lock Screen Timeout", Online available at :—<https://www.youtube.com/watch?v=n6e1WKUS2ww>, Jun. 9, 2016, 1 page.
Google Developers, "Voice search in your app", Online available at:—<https://www.youtube.com/watch?v=PS1FbB5qWEI>, Nov. 12, 2014, 1 page.
Guim, Mark, "How to Set a Person-Based Reminder with Cortana", Online available at:—<http://www.wpcentral.com/how-to-person-based-reminder-cortana>, Apr. 26, 2014, 15 pages.
Gupta et al., "I-vector-based Speaker Adaptation of Deep Neural Networks for French Broadcast Audio Transcription", ICASSP, 2014, 2014, pp. 6334-6338.
Hardawar, Devindra, "Driving App Waze Builds its own Siri for Hands-Free Voice Control", Online available at:—<http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co., Ltd., vol. 1, Jul. 5, 2012, pp. 8, 130, 131.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
"Hey Google: How to Create a Shopping List with Your Google Assistant", Online available at:—<https://www.youtube.com/watch?v=w9NCsElax1Y>, May 25, 2018, 1 page.
Hershey et al., "Deep Clustering: Discriminative Embeddings for Segmentation and Separation", Proc. ICASSP, Mar. 2016, 6 pages.
"How to Enable Google Assistant on Galaxy S7 and Other Android Phones (No Root)", Online available at:—<https://www.youtube.com/watch?v=HekIQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
id3.org, "id3v2.4.0—Frames", Online available at:—<http://id3.org/id3v2.4.0-frames?action=print>, retrieved on Jan. 22, 2015, pp. 1-41.
Ikeda, Masaru, "beGLOBAL Seoul 2015 Startup Battle: Talkey", YouTube Publisher, Online Available at:—<https://www.youtube.com/watch?v=4Wkp7sAAldg>, May 14, 2015, 1 page.

(56) References Cited

OTHER PUBLICATIONS

Inews and Tech, "How to Use The QuickType Keyboard in IOS 8", Online available at:—http://www.inewsandtech.com/how-to-use-the-quicktype-keyboard-in-ios-8/>, Sep. 17, 2014, 6 pages.
International Preliminary Report on Patentability received for PCT Patent Application No. PCT/US2016/032763, mailed on Nov. 30, 2017, 10 pages.
International Search Report and Written Opinion received for PCT Patent Application No. PCT/US2016/032763, mailed on Jun. 27, 2016, 12 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
"Interactive Voice", Online available at:—<http://www.helloivee.com/company/>, retrieved on Feb. 10, 2014, 2 pages.
Isik et al., "Single-Channel Multi-Speaker Separation using Deep Clustering", Interspeech 2016, Sep. 8-12, 2016, pp. 545-549.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Karn, Ujjwal, "An Intuitive Explanation of Convolutional Neural Networks", The Data Science Blog, Aug. 11, 2016, 23 pages.
Kazmucha Allyson, "How to Send Map Locations Using iMessage", iMore.com, Online available at:—<http://www.imore.com/how-use-imessage-share-your-location-your-iphone>, Aug. 2, 2012, 6 pages.
Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
King et al., "Robust Speech Recognition via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 22-24, 2013, pp. 442-451.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Marketing Land, "Amazon Echo: Play music", Online Available at:—<https://www.youtube.com/watch?v=A7V5NPbsXi4>, Apr. 27, 2015, 3 pages.
"Meet Ivee, Your Wi-Fi Voice Activated Assistant", Availale Online at:—<http://www.helloivee.com/>, retrieved on Feb. 10, 2014, 8 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
Minutes of Oral Proceedings received for European Patent Application No. 16725334.3, mailed on Jul. 9, 2021, 6 pages.
"Mobile Speech Solutions, Mobile Accessibility", SVOX AG Product Information Sheet, Online available at:—<http://www.svox.com/site/bra840604/con782768/mob965831936.aSQ?osLang=1>, Sep. 27, 2012, 1 page.
Morrison Jonathan, "iPhone 5 Siri Demo", Online Available at:—<https://www.youtube.com/watch?v=_wHWwG5IhWc>, Sep. 21, 2012, 3 pages.

My Cool Aids, "What's New", Online available at :—<http://www.mycoolaids.com/>, 2012, 1 page.
Myers, Brad A., "Shortcutter for Palm", Available at: <http://www.cs.cmu.edu/~pebbles/v5/shortcutter/palm/index.html>, retrieved on Jun. 18, 2014, 10 pages.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 14/713,410, mailed on Mar. 28, 2018, 12 pages.
Non-Final Office Action received for U.S. Appl. No. 16/595,108, mailed on Feb. 17, 2022, 17 pages.
Notice of Acceptance received for Australian Patent Application No. 2016265837, mailed on Jun. 4, 2019, 3 pages.
Notice of Allowance received for Korean Patent Application No. 10-2017-7033045, mailed on Mar. 10, 2020, 4 pages.
Notice of Allowance received for U.S. Appl. No. 14/713,410, mailed on Jun. 21, 2019, 5 pages.
Notice of Allowance received for U.S. Appl. No. 16/595,108, mailed on Jul. 7, 2022, 5 pages.
Office Action received European Patent Application No. 16725334.3, mailed on Dec. 11, 2019, 7 pages.
Office Action received for Australian Patent Application No. 2016265837, mailed on Nov. 15, 2018, 3 pages.
Office Action received for Chinese Patent Application No. 201680027821.1, mailed on Aug. 5, 2020, 20 pages.
Office Action received for Chinese Patent Application No. 201680027821.1, mailed on May 31, 2021, 16 pages.
Office Action received for Chinese Patent Application No. 201680027821.1, mailed on Nov. 3, 2021, 13 pages.
Office Action received for Japanese Patent Application No. 2017-553158, mailed on Dec. 3, 2018, 6 pages.
Osxdaily, "Get a List of Siri Commands Directly from Siri", Online available at:—<http://osxdaily.com/2013/02/05/list-siri-commands/>, Feb. 5, 2013, 15 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at:—<https://www.youtube.com/watch?v=0CldLR4fhVU>, Jun. 3, 2014, 3 pages.
Result of Consultation received for European Patent Application No. 16725334.3, mailed on Jun. 28, 2021, 15 pages.
Rios Mafe, "New Bar Search for Facebook", YouTube, available at:—<https://www.youtube.com/watch?v=vwgN1WbvCas>, Jul. 19, 2013, 2 pages.
Routines, "SmartThings Support", Online available at:—<https://web.archive.org/web/20151207165701/https://support.smartthings.com/hc/en-us/articles/205380034-Routines>, 2015, 3 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.

(56) References Cited

OTHER PUBLICATIONS

Seehafer Brent, "Activate Google Assistant on Galaxy S7 with Screen off", Online available at:—<https://productforums.google.com/forum/#!topic/websearch/lp3qIGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Settle et al., "End-to-End Multi-Speaker Speech Recognition", Proc. ICASSP, Apr. 2018, 6 pages.
"Skilled at Playing my iPhone 5", Beijing Hope Electronic Press, Jan. 2013, 6 pages.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
SRI, "SRI Speech: Products: Software Development Kits: EduSpeak", Online available at:—<http://web.archive.org/web/20090828084033/http://www.speechatsri.com/products/eduspeak>shtml, retrieved on Jun. 20, 2013, pp. 1-2..
Sundaram et al., "Latent Perceptual Mapping with Data-Driven Variable-Length Acoustic Units for Template-Based Speech Recognition", ICASSP 2012, Mar. 2012, pp. 4125-4128.
Summons to Attend Oral Proceedings received for European Patent Application No. 16725334.3, mailed on Dec. 15, 2020, 12 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", Interspeech 2012, Sep. 9-13, 2012, pp. 194-197.
Tan et al., "Knowledge Transfer in Permutation Invariant Training for Single-channel Multi-talker Speech Recognition", ICASSP 2018, 2018, pp. 5714-5718.
Tofel et al., "SpeakToit: A Personal Assistant for Older iPhones, iPads", Apple News, Tips and Reviews, Feb. 9, 2012, 7 pages.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Vodafone Deutschland, "Samsung Galaxy S3 Tastatur Spracheingabe", Online available at—<https://www.youtube.com/watch?v=6kOd6Gr8uFE>, Aug. 22, 2012, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
X.Ai, "How it Works", Online available at:—<https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yates Michaelc., "How Can I Exit Google Assistant After I'm Finished with it", |Online available at:—<https://productforums.google.com/forum/#!msg/phone-by-google/faECnR2RJwA/gKNtOkQgAQAJ>, Jan. 11, 2016, 2 pages.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zainab, "Google Input Tools Shows Onscreen Keyboard in Multiple Languages [Chrome]", Online available at:—<http://www.addictivetips.com/internet-tips/google-input-tools-shows-multiple-language-onscreen-keyboards-chrome/>, Jan. 3, 2012, 3 pages.
Zhong et al., "JustSpeak: Enabling Universal Voice Control on Android", W4A'14, Proceedings of the 11th Web for All Conference, No. 36, Apr. 7-9, 2014, 8 pages.
Zmolikova et al., "Speaker-Aware Neural Network Based Beamformer for Speaker Extraction in Speech Mixtures", Interspeech 2017, Aug. 20-24, 2017, pp. 2655-2659.
Chenghao, Yuan, "MacroDroid", Online available at: https://www.ifanr.com/weizhizao/612531, Jan. 25, 2016, 7 pages.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages.
"IPhone 6 Smart Guide Full Version for SoftBank", Gijutsu-Hyohron Co., Ltd., vol. 1, Dec. 1, 2014, 4 pages.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412.
Simonite, Tom, "Confronting Siri: Microsoft Launches Digital Assistant Cortana", 2014, 2 pages.
Song, Yang, "Research of Chinese Continuous Digital Speech Input System Based on HTK", Computer and Digital Engineering, vol. 40, No. 4, Dec. 31, 2012, 5 pages.
"Use Macrodroid skillfully to automatically clock in with Ding Talk", Online available at: https://blog.csdn.net/qq_26614295/article/details/84304541, Nov. 20, 2018, 11 pages.
Ye et al., "iPhone 4S Native Secret", Jun. 30, 2012, 1 page.
Zhan et al., "Play with Android Phones", Feb. 29, 2012, 1 page.
Zhao et al., "Big Data Analysis and Application", Aviation Industry Press, Dec. 2015, pp. 236-241.
Non-Final Office Action received for U.S. Appl. No. 17/158,703, mailed on Dec. 15, 2022, 10 pages.
Applicant-Initiated Interview Summary received for U.S. Appl. No. 17/158,703, mailed on Jan. 26, 2023, 3 pages.
International Search Report and Written Opinion received for PCT Patent Application No. PCT/IB2022/000474, mailed on Dec. 19, 2022, 16 pages.
Notice of Allowance received for U.S. Appl. No. 17/158,703, mailed on Feb. 16, 2023, 7 pages.
Notice of Allowance received for Korean Patent Application No. 10-2022-7027709, mailed on Jul. 19, 2023, 7 pages (2 pages of English Translation and 5 pages of Official Copy).
Applicant-Initiated Interview Summary received for U.S. Appl. No. 17/949,503, mailed on Sep. 1, 2023, 5 pages.

(56) References Cited

OTHER PUBLICATIONS

Non-Final Office Action received for U.S. Appl. No. 17/949,503, mailed on Jul. 19, 2023, 30 pages.
Notice of Allowance received for U.S. Appl. No. 18/115,721, mailed on Aug. 4, 2023, 8 pages.
Corrected Notice of Allowance received for U.S. Appl. No. 18/115,721, mailed on Oct. 5, 2023, 2 pages.
Corrected Notice of Allowance received for U.S. Appl. No. 18/115,721, mailed on Oct. 16, 2023, 5 pages.
Aaaaplay, "Sony Media Remote for iOS and Android", Online available at: <https://www.youtube.com/watch?v=W8QoeQhlGok>, Feb. 4, 2012, 3 pages.
Abdelaziz et al., "Speaker-Independent Speech-Driven Visual Speech Synthesis using Domain-Adapted Acoustic Models", May 15, 2019, 9 pages.
Accessibility on iOS, Apple Inc., Online available at: https://developer.apple.com/accessibility/los/, Retrieved on Jul. 26, 2021, 2 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Android Authority, "How to use Tasker: A Beginner's Guide", Online available at:—<https://youtube.com/watch?v= rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Badshah, et al., "Deep Features-based Speech Emotion Recognition for Smart Affective Services", Multimedia Tools and Applications, Oct. 31, 2017, pp. 5571-5589.
Bell, Jason, "Machine Learning Hands-On for Developers and Technical Professionals", Wiley, 2014, 82 pages.
Bodapati et al., "Neural Word Decomposition Models for Abusive Language Detection", Proceedings of the Third Workshop on Abusive Language Online, Aug. 1, 2019, pp. 135-145.
Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Chen et al., "A Convolutional Neural Network with Dynamic Correlation Pooling", 13th International Conference on Computational Intelligence and Security, IEEE, 2017, pp. 496-499.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages (Official Copy Only). {See communication under 37 CFR § 1.98(a) (3)}.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
"Context-Sensitive User Interface" , Online available at: https://web.archive.org/web/20190407003349/https://en.wikipedia.org/wiki/Context-sensitive_user_interface, Apr. 7, 2019, 3 pages.
Creswell et al., "Generative Adversarial Networks", IEEE Signal Processing Magazine, Jan. 2018, pp. 53-65.
Dai, et al., "Transformer-XL: Attentive Language Models Beyond a Fixed-Length Context", Online available at: arXiv:1901.02860v3, Jun. 2, 2019, 20 pages.
Derrick, Amanda, "How to Set Up Google Home for Multiple Users", Lifewire, Online available at: https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
Dwork et al., "The Algorithmic Foundations of Differential Privacy", Foundations and Trends in Theoretical Computer Science: vol. 9: No. 3-4, 211-407, 2014, 281 pages.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Fitzpatrick, Aidan, "Introducing Camo 1.5: AR modes", Available Online at : "https://reincubate.com/blog/camo-ar-modes-release/", Oct. 28, 2021, 8 pages.
Gadget Hacks, "Tasker Too Complicated? Give MacroDroid a Try [How-To]", Online available at: < https://www.youtube.com/watch?v=8YL9cWCykKc>, May 27, 2016, 1 page.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Graves, Alex, "Sequence Transduction with Recurrent Neural Networks", Proceeding of International Conference of Machine Learning (ICML) Representation Learning Workshop, Nov. 14, 2012, 9 pages.
Gu et al., "BadNets: Evaluating Backdooring Attacks on Deep Neural Networks", IEEE Access, vol. 7, Mar. 21, 2019, pp. 47230-47244.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta, Naresh, "Inside Bluetooth Low Energy", Artech House, 2013, 274 pages.

(56) References Cited

OTHER PUBLICATIONS

Haung et al., "A Study for Improving Device-Directed Speech Detection Toward Frictionless Human-Machine Interaction", in Proc. Interspeech, 2019, 5 pages.
Hawkeye, "Hawkeye—A better user testing platform", Online Available at: https://www.youtube.com/watch?v=el0TW0g_760, Oct. 16, 2019, 3 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hinton et al., "Distilling the Knowledge in a Neural Network", arXiv preprintarXiv:1503.02531, Mar. 2, 2015, 9 pages.
Hook et al., "Automatic speech based emotion recognition using paralinguistics features", Bulletin of the Polish Academy of Sciences, Technical Sciences, vol. 67, No. 3, 2019, pp. 479-488.
"How to adjust the order of control center buttons on iPhone iOS12 version after buying a mobile phone", Available online at: https://jingyan.baidu.com/article/5bbb5albbe5a9 713eba1791b.html?, Jun. 14, 2019, 4 pages (Official Copy only). {See communication under 37 CFR § 1.98(a) (3)}.
Hutsko et al., "iPhone All-in-One for Dummies", 3rd Edition, 2013, 98 pages.
Idasallinen, "What's the 'Like' Meter Based on?", Online Available at:—<https://community.spotify.com/t5/Content-Questions/What-s-the-like-meter-based-on/td-p/1209974>, Sep. 22, 2015, 6 pages.
International Preliminary Report on Patentability received for PCT Patent Application No. PCT/US2021/015629, mailed on Aug. 25, 2022, 9 pages.
International Preliminary Report on Patentability received for PCT Patent Application No. PCT/US2021/015629, mailed on Aug. 25, 2022, 12 pages.
"IPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.
Jeong et al., "Development Trend of N-Screen Service", Journal of Broadcasting Engineering, vol. 17, No. 1, Sep. 2012, 18 pages (6 pages of English Translation and 12 pages of Official Copy).
Kannan et al., "Smart Reply: Automated Response Suggestion for Email", Available Online at: https://arxiv.org/pdf/1606.04870.pdf, Jun. 15, 2016, 10 pages.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
Kondrat, Tomek, "Automation for Everyone with MacroDroid", Online available at: https://www.xda-developers.com/automation-for-everyone-with-macrodroid/, Nov. 17, 2013, 6 pages.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Kumatani et al., "Direct Modeling of Raw Audio with DNNS for Wake Word Detection", in 2017 IEEE Automatic Speech Recognition and Understanding Workshop (ASRU), 2017, 6 pages.
Li et al., "Deep neural network for short-text sentiment classification", International Conference on Database Systems for Advanced Applications, Springer, Cham, 2016, 8 pages.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
Loukides et al., "What Is the Internet of Things?", O'Reilly Media, Inc., Online Available at: <https://www.oreilly.com/library/view/what-is-the/9781491975633/>, 2015, 31 pages.
Maas et al., "Combining Acoustic Embeddings and Decoding Features for End-Of-Utterance Detection in Real-Time Far-Field Speech Recognition Systems", in 2018 IEEE International Conference on Acoustics, Speech and Signal Processing (ICASSP). IEEE, 2018, 5 pages.
Mallidi et al., "Device-Directed Utterance Detection", Proc. Interspeech, Aug. 7, 2018, 4 pages.
"Method to Provide Remote Voice Navigation Capability on the Device", ip.com, Jul. 21, 2016, 4 pages.
Microsoft Soundscape—A map delivered in 3D sound, Microsoft Research, Online available at: https://www.microsoft.com/en-us/research/product/soundscape/, Retrieved on Jul. 26, 2021, 5 pages.
Mnih et al., "Human-Level Control Through Deep Reinforcement Learning", Nature, vol. 518, Feb. 26, 2015, pp. 529-533.
Modern Techies,"Braina-Artificial Personal Assistant for PC(like Cortana, Siri)IIII", Online available at: <https://www.youtube.com/watch?v=_Coo2P8ilqQ>, Feb. 24, 2017, 3 pages.
Müller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.
Non-Final Office Action received for U.S. Appl. No. 17/158,703, mailed on Sep. 30, 2022, 5 pages.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
"Nuance Dragon Naturally Speaking", Version 13 End-User Workbook, Nuance Communications Inc., Sep. 2014, 125 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Philips, Chris, "Thumbprint Radio: A Uniquely Personal Station Inspired by All of Your Thumbs Up", Pandora News, Online Available at:—<https://blog.pandora.com/author/chris-phillips/>, Dec. 14, 2015, 7 pages.
Ping, et al., "Deep Voice 3: Scaling Text to Speech with Convolutional Sequence Learning", Available online at: https://arxiv.org/abs/1710.07654, Feb. 22, 2018, 16 pages.

(56) References Cited

OTHER PUBLICATIONS pocketables.com, "AutoRemote example profile", Online available at: https://www.youtube.com/watch?v=kC_zhUnNZj8, Jun. 25, 2013, 1 page.
"Pose, Cambridge Dictionary Definition of Pose". Available online at: <https://dictionary.cambridge.org/dictionary/english/pose>, 4 pages.
"Radio Stations Tailored to You Based on the Music You Listen to on iTunes", Apple Announces iTunes Radio, Press Release, Jun. 10, 2013, 3 pages.
Rasch, Katharina, "Smart Assistants for Smart Homes", Doctoral Thesis in Electronic and Computer Systems, 2013, 150 pages.
Raux, Antoine, "High-Density Dialog Management the Topic Stack", Adventures in High Density, Online available at: https:/medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Robbins, F Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Rowland et al., "Designing Connected Products: UX for the Consumer Internet of Things", O'Reilly, May 2015, 452 pages.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Seroter et al., "SOA Patterns with BizTalk Server 2013 and Microsoft Azure", Packt Publishing, Jun. 2015, 454 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages (Official Copy Only). {See communication under 37 CFR § 1.98(a) (3)}.
Siou, Serge, "How to Control Apple TV 3rd Generation Using Remote app", Online available at: <https://www.youtube.com/watch?v=PhyKftZ0S9M>, May 12, 2014, 3 pages.
Song, Yang, "Research of Chinese Continuous Digital Speech Input System Based on HTK", Computer and Digital Engineering, vol. 40, No. 4, Dec. 31, 2012, 5 pages (Official Copy Only). {See communication under 37 CFR § 1.98(a) (3)}.

Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at : https://winaero.com/chrome-will-automatically-create-tab-groups/, Sep. 18, 2020, 5 pages.
Tkachenko, Sergey, "Enable Tab Groups Auto Create in Google Chrome", Available online at : https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (Neurl PS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
"What's on Spotify?", Music for everyone, Online Available at:—<https://web.archive.org/web/20160428115328/https://www.spotify.com/us/>, Apr. 28, 2016, 6 pages.
Win, et al., "Myanmar Text to Speech System based on Tacotron-2", International Conference on Information and Communication Tehcnology Convergence (ICTC), Oct. 21-23, 2020, pp. 578-583.
"Working with the Dragon Bar", Nuance Communications, Inc, Jun. 27, 2016, 2 pages.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
Xu et al., "Show, Attend and Tell: Neural Image Caption Generation with Visual Attention", Proceedings of the 32nd International Conference on Machine Learning, Lille, France, 2015, 10 pages.
Yang Astor, "Control Android TV via Mobile Phone APP RKRemoteControl", Online Available at : <https://www.youtube.com/watch?v=zpmUeOX_xro>, Mar. 31, 2015, 4 pages.

(56) References Cited

OTHER PUBLICATIONS

Ye et al., "iPhone 4S Native Secret", Jun. 30, 2012, 1 page (Official Copy Only). {See communication under 37 CFR § 1.98(a) (3)}.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Zhan et al., "Play with Android Phones", Feb. 29, 2012, 1 page (Official Copy Only). {See communication under 37 CFR § 1.98(a) (3)}.
Zhang et al., "Interaction Proxies for Runtime Repair and Enhancement of Mobile Application Accessibility", In Proceedings of the 2017 CHI Conference on Human Factors in. Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-To-End Speech Recognition", IEEE International Conference on Acoustics, Speech and Signal Processing (ICASSP), 2017, 5 pages.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zheng, et al., "Intent Detection and Semantic Parsing for Navigation Dialogue Language Processing", 2017 IEEE 20th International Conference on Intelligent Transportation Systems (ITSC), 2017, 6 pages.
Zhou et al., "Learning Dense Correspondence via 3D-guided Cycle Consistency", Proceedings of the IEEE Conference on Computer Vision and Pattern Recognition (CVPR), 2016, 10 pages.

\* cited by examiner

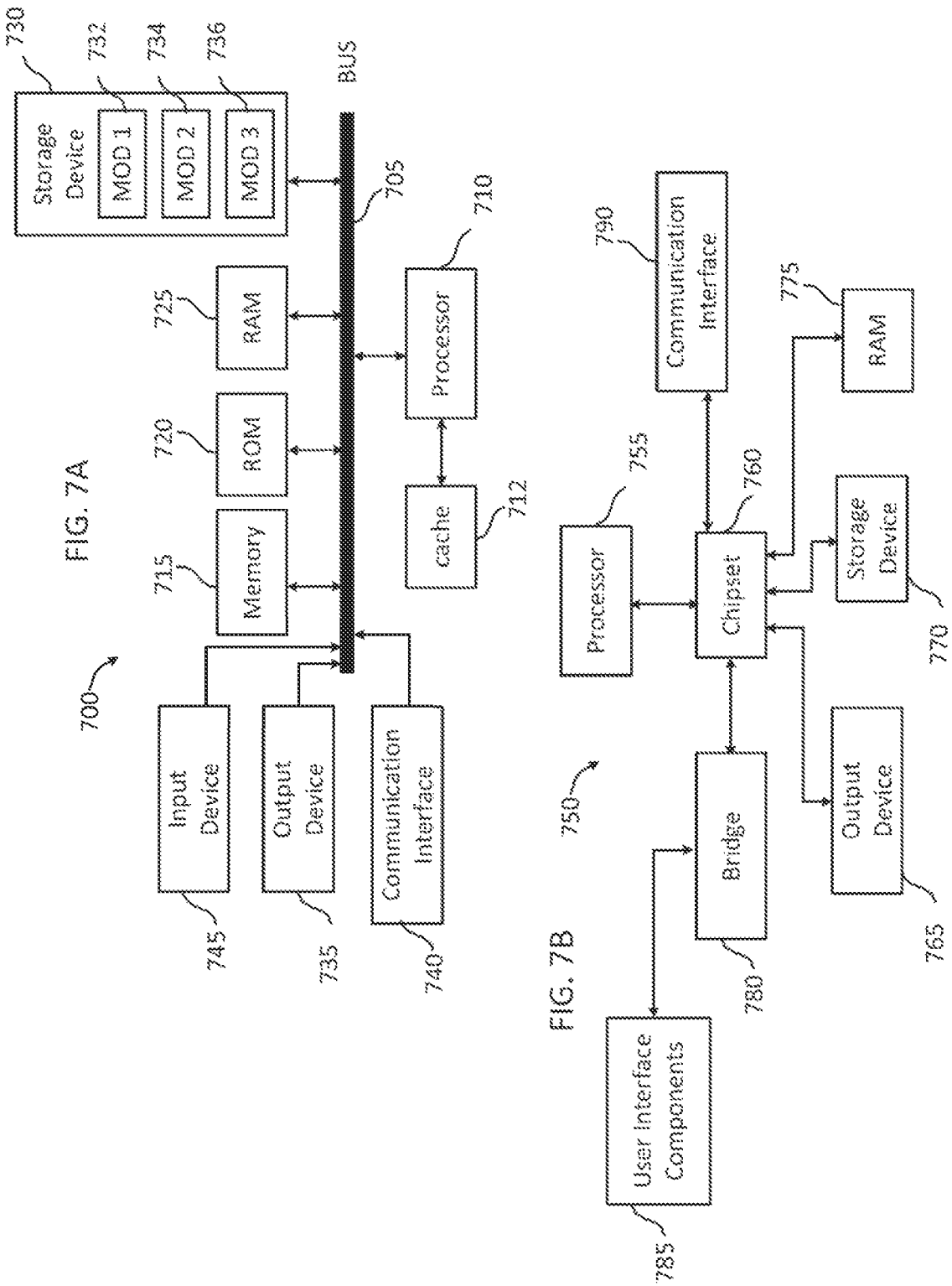

VIRTUAL ASSISTANT IN A COMMUNICATION SESSION

CROSS-REFERENCE TO RELATED APPLICATIONS

This application is a continuation of U.S. application Ser. No. 16/595,108, filed Oct. 7, 2019, entitled "VIRTUAL ASSISTANT IN A COMMUNICATION SESSION," which is a continuation of U.S. application Ser. No. 14/713,410, filed May 15, 2015, entitled "VIRTUAL ASSISTANT IN A COMMUNICATION SESSION." The entire contents of each of these applications are hereby incorporated by reference in their entireties.

TECHNICAL FIELD

The present technology pertains to communication sessions between groups of users, and more specifically pertains to utilizing a virtual assistant to assist one or more users perform tasks during a communication session.

BACKGROUND

Current computing devices can include functionality that enables users to communicate with each other by transmitting and receiving messages. For example, many computing devices include text and/or instant messaging functionality that enable users of the computing devices to transmit text, images, sounds, etc., to the client devices of one or more other users. Users can use this functionality to have conversations, make plans and/or perform any other number of tasks.

While current systems enable users to communicate and perform tasks, users are required to manually perform the tasks. For example, a group of users attempting to schedule lunch needs to determine an available day and time that works for each member of the group. This can require each user to check their calendar and share available times with other users. Likewise, a group of users attempting to perform a financial transaction needs to determine a payment method for performing the transaction. This can require each user to determine the payment methods available to the individual user and then share this data amongst the other members of the group. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for utilizing a virtual assistant as part of a communication session. A communication session can one or more communications transmitted amongst a group of participant users using a communication application. For example, a communication session can be a conversation between multiple users using a text and/or instant messaging application such as iMessage® available by Apple Inc., of Cupertino, Calif.

One or more of the participant users can select to utilize a virtual assistant to assist the participant users with tasks during the communication session. A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic recognition to analyze text and interpret the intended meaning.

A task can be any type of action that a virtual assistant can provide assistance with. For example, a task can include scheduling a meeting, performing a financial transaction, determining an estimated time of arrival, providing directions, providing weather information, alerting a user of relevant information, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant rather than to the other participants of the communication session. As a result, the message will not be transmitted to the other participants of the communication session and the virtual assistant will assist the user with the identified task.

A virtual assistant can assist a user with a variety of different tasks. For example, the virtual assistant can gather requested data for the user from one or more web servers, such as weather data, traffic data, etc. Further, the virtual assistant can coordinate performing a task amongst multiple participant users of a communication session. For example, to assist with scheduling a meeting amongst multiple participant users of a communication session, a virtual assistant can gather calendar information for each of the participant users and recommend one or more proposed times for the meeting.

Alternatively, to assist with performing a financial transaction amongst multiple participant users of a communication session, a virtual assistant can determine the financial applications available and/or utilized by each of the participant users and recommend a financial application to perform the financial transaction.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 7A and 7B illustrate exemplary possible system embodiments.

DESCRIPTION

Figure 1:
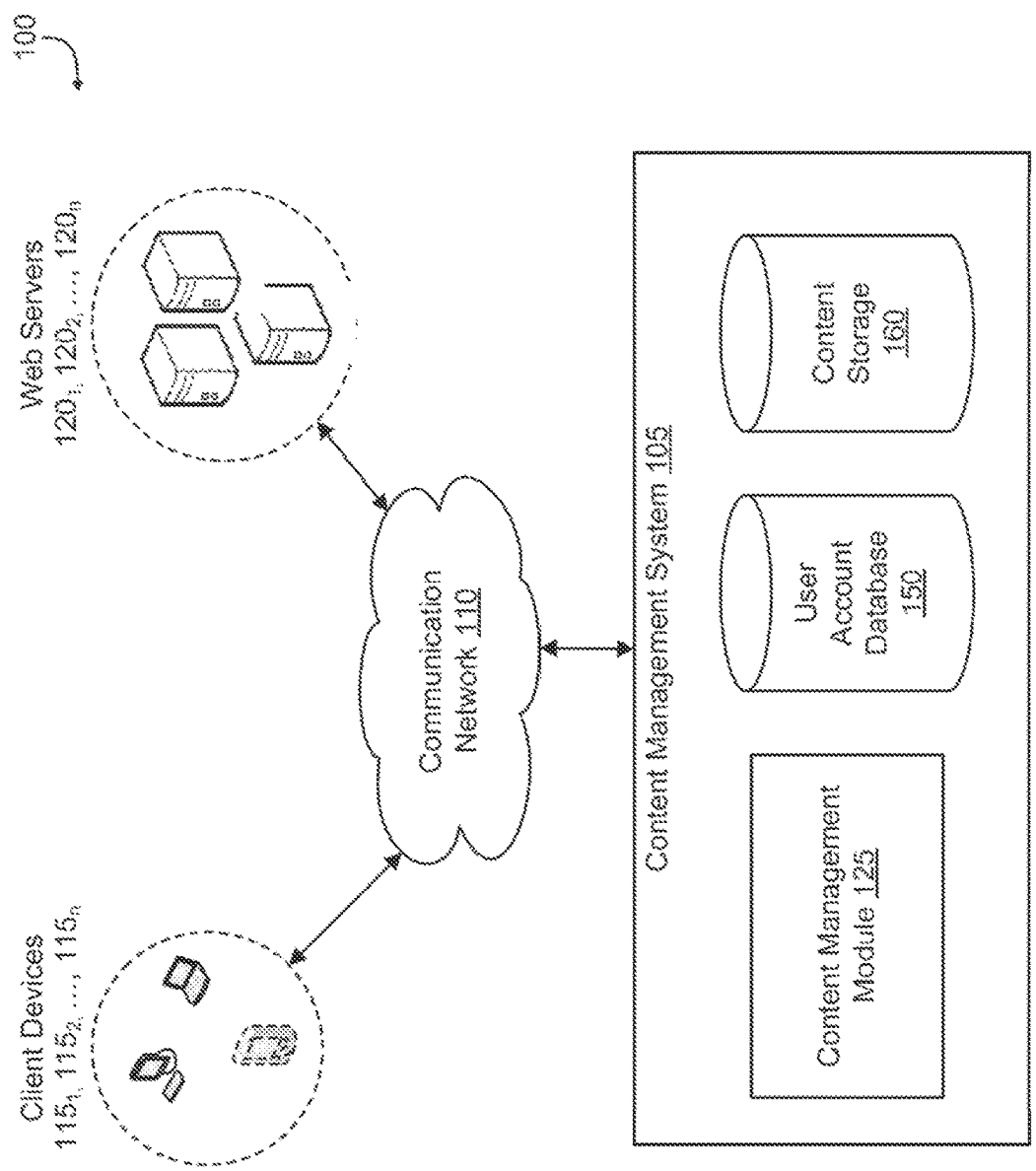
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for utilizing a virtual assistant as part of a communication session. A communication session can one or more communications transmitted amongst a group of participant users using a communication application. For example, a communication session can be a conversation between multiple users using a text and/or instant messaging application such as iMessage® available by Apple Inc., of Cupertino, Calif.

One or more of the participant users can select to utilize a virtual assistant to assist the participant users with tasks during the communication session. A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic recognition to analyze text and interpret the intended meaning.

A task can be any type of action that a virtual assistant can provide assistance with. For example, a task can include scheduling a meeting, performing a financial transaction, determining an estimated time of arrival, providing directions, providing weather information, alerting a user of relevant information, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant rather than to the other participants of the communication session. As a result, the message will not be transmitted to the other participants of the communication session and the virtual assistant will assist the user with the identified task.

A virtual assistant can assist a user with a variety of different tasks. For example, the virtual assistant can gather requested data for the user from one or more web servers, such as weather data, traffic data, etc. Further, the virtual assistant can coordinate performing a task amongst multiple participant users of a communication session. For example, to assist with scheduling a meeting amongst multiple participant users of a communication session, a virtual assistant can gather calendar information for each of the participant users and recommend one or more proposed times for the meeting. Alternatively, to assist with performing a financial transaction amongst multiple participant users of a communication session, a virtual assistant can determine the financial applications available and/or utilized by each of the participant users and recommend a financial application to perform the financial transaction.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 700 of FIGS. 7A and 7B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can communication with other users through use of client devices $115_1$, $115_2$, . . . , $115_n$ (collectively "115") connected to communication network 110. Client devices 115 can be any type of computing device, such as a smart phone, tablet, personal computer, etc. Client devices 115 can include a communication application that enables a user of a client device $115_i$ to transmit and receive messages to and from other client devices 115. For example, a communication application can be a text and/or instant messaging application such as iMessage® available by Apple Inc., of Cupertino, Calif.

A user can also use client devices 115 to interact with web servers $120_1$, $120_2$, . . . , $120_n$ (collectively "120") connected to communication network 110. Web servers 120 can be any type of computing device and be configured to maintain web data and provide the web data to requesting client devices 115. Web data can be data that can be rendered by client devices 115 to present a webpage, website, etc., to a requesting user. Web servers, 120 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices.

System 100 can also include content management system 105. Content management system 105 can include one or more computing devices configured to manage content items for multiple user accounts. A content item can include any type of digital asset such as an application, audio file, text file, video file, etc.

Content management system 105 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_1$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with content management system 105 via a client-side application integrated with the file system or via a webpage displayed using a web browser application.

Content management system 105 can be configured to manage content items and data for multiple user accounts. For example, content management system 105 can allow users to purchase, store and access content items, calendar data, contact data, etc. Furthermore, content management system 105 can make it possible for a user to access the stored data, such as content items, calendar data, contact data, etc., from multiple client devices 115. Accessing a content item can include receiving metadata describing the content item, streaming the content item from content management system 105 and/or downloading the content item to one of client devices 115.

To facilitate the various content management services, a user can create a user account with content management system 105. The account information for each created user account can be maintained in user account database 150. User account database 150 can store profile information for each user account, including a unique account identifier identifying the user account, personal information, username, password, email address, home address, credit card information, banking information, calendar data, contact data, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, etc. For example, content management system 105 can provide an online content retailer where users can purchase a variety of content items. Further, in some embodiments, a user can upload content items from one of client devices 115 to content management system 105. The purchased and uploaded content items can be assigned to the user's account and then accessed by the user from any of client devices 115. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details regarding storage of the content items from client devices 115 such that the location of the content items stored by content management system 105 is not known by client devices 115. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 125 configured to manage and access each user account and the content items assigned to the user accounts. For example, content management module 125 can be configured to communicate with user account database 150 and content storage 160 to adjust privileges with respect to content items and otherwise manage content items.

Upon a user logging into their user account from one of client devices 115, content management module 125 can access the account information associated with the user account to identify the content items assigned to the user account, as well as account configuration data dictating presentation of the content items. Content management module 125 can then present and/or provide the content items to the user according to the account configuration data. For example, content management module 125 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device $115_i$ that was used to access the user account. Client device $115_i$ can then use the received metadata to present the content items that the user account can access. For example, client device $115_i$ can present information identifying the content items available to the user account in a content item library. This can include presenting the title of the content items, images such as an album or book cover, description of the content item, etc.

Figure 2:
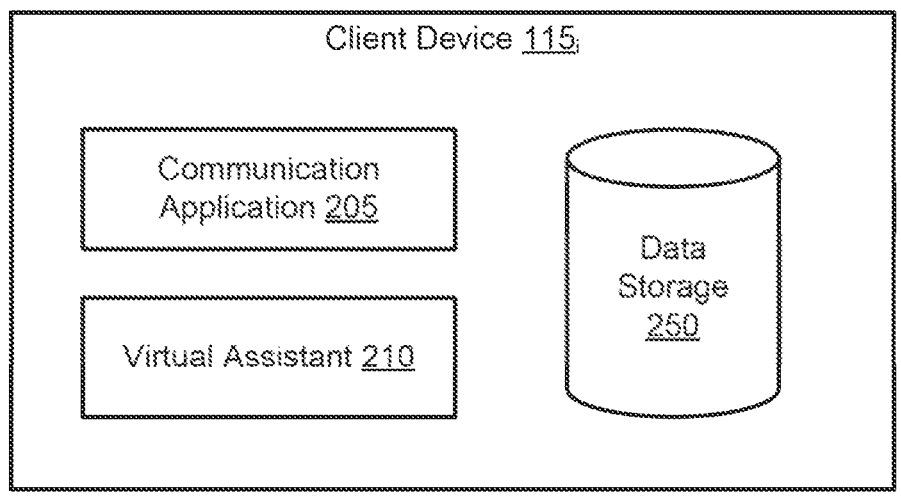
FIG. 2 shows an embodiment of a client device configured to enable a user to utilize a virtual assistant to perform tasks during a communication session.

FIG. 2 shows an embodiment of a client device $115_i$ configured to enable a user to utilize a virtual assistant to perform tasks during a communication session. FIG. 2 is described in view of the system shown in FIG. 1. As shown, client device $105_i$ includes communication application 205. Communication application 205 can be any type of application configured to enable a user to send and receive data messages with one or more other client devices 115. A data message can be any type of data that can be transmitted from one computing device to another, such as text data, image data, sound data, etc. In some embodiments, communication application 205 can be a text and/or instant messaging application such as iMessage® available by Apple Inc., of Cupertino, Calif.

A user of client device $115_i$ can use communication application 205 to conduct communication sessions with one or more groups of users. A communication session can be a group of messages transmitted between a group of users. For example, a communication session can be an instant messaging conversation between a group of two or more users.

Communication application 205 can provide a user with a messaging interface that enables the user to conduct a communication session. For example, the messaging interface can enable a user to create a new communication session by selecting one or more participant users and entering a message to be transmitted to the participant users. Further, the messaging interface can enable a user to view existing communication session and enter and transmit new messages as part of the existing communication sessions.

Client device $115_i$ can also include virtual assistant 210 configured to assist the user with tasks during a communication session. Virtual assistant 210 can be an application, module, software, etc., capable of analyzing messages included in a communication session to identify tasks and provide the user with assistance completing the identified tasks. For example, virtual assistant 210 can be an application such as Siri® available by Apple Inc., of Cupertino, Calif., that uses semantic recognition to analyze text and interpret the intended meaning.

A task can be any type of function, actions, etc., with which virtual assistant 210 can assist a user. For example, a task can be retrieving information, such as retrieving the current time, retrieving directions to a specified destination, retrieving sports scores, retrieving weather information, retrieving movie times, etc. Further a task can be coordinating and executing a transaction, such as scheduling a meeting, performing a financial transaction, purchasing tickets, etc.

Client device $105_i$ can enable a user to select to utilize virtual assistant 210 in relation to one or more communication sessions. In some embodiments, communication application 205 can be configured to enable a user to select to utilize virtual assistant 210 by adding virtual assistant 210 as a participant of the communication session. For example, the user can add a nickname associated with virtual assistant 210 as a participant to a communication session. In response, communication application 205 can communicate with virtual assistant 210 to utilize virtual assistant 210 to assist with the communication session.

Further, in some embodiments, communication application 205 can transmit a notification message to the other participants of the communication session indicating that the user of client device $115_i$ has selected to utilize virtual assistant 205. For example, communication application 205 can transmit a message as part of the communication session indicating that the user of client device $115_i$ is utilizing virtual assistant 205. As another example, the nickname associated with virtual assistant 210 can be presented as a member of the communication session, thereby indicating that at least one participant of the communication session is utilizing the virtual assistant. In some embodiments, the other participants can be prompted regarding whether they would like to utilize the virtual assistant in regards to the communication session.

To assist a user with a communication session, virtual assistant 210 can analyze messages included in the communication session to identify tasks. For example, virtual assistant 210 can use semantic analysis to recognize terms, sets of terms, etc., indicating a task that the user may need assistance with.

In some embodiments, virtual assistant 210 can analyze messages transmitted amongst the participant users of the communication session to identify tasks. This can include messages entered by a user of client device $115_i$ to be transmitted to the other participants as part of the communication session, as well as messages received from other users as part of the communication session.

Further, in some embodiments, virtual assistant 210 can determine whether a message provided by the user of client device $115_i$ was intended for the other participants of the communication session or intended for the virtual assistant. A user can use communication application 205 to enter a message intended for virtual assistant 210, such as a request or command that the virtual assistant assist the user with a specified task. For example, a user can enter a request such as "help us schedule a meeting" and virtual assistant can determine that the message was intended for virtual assistant 210. Alternatively, in some embodiments, a user can address messages intended for the virtual assistant by using a nickname for the personal assistant. For example, the user can enter a messages such as "Assistant, help us schedule a meeting." Virtual assistant 210 can determine that the message was intended for the virtual assistant based on the use of the nickname addressing the virtual assistant 210.

In some embodiments, messages determined by virtual assistant 210 to be intended for virtual assistant 210 will not be transmitted to the other participant users of the communication session. Likewise, responses provided by virtual assistant 210 can be presented as part of the communication session on client device $115_i$, while not being presented to the other participant users of the communication session. In this way, a user of client device $115_i$ can have a separate conversation with virtual assistant 210 to perform a specified task.

To assist a user with a task, virtual assistant 210 can communicate with one or more computing devices to gather data and perform requested operations. For example, virtual assistant 210 can gather data maintained by client device $115_i$ in memory and/or from other applications on client device $115_i$, such as calendar data, contact data, financial information, etc. Further, virtual assistant 210 can gather data from one or more components of client device $115_i$, such as geographic coordinate data from Global positioning system (GPS) component, temperature data, sound data, etc. Virtual assistant 210 can further edit, modify or delete data, such as creating new calendar entries, modifying contact information, etc.

Virtual assistant 210 can also gather data from one or more computing devices in network communication with client device $115_1$. For example, virtual assistant 210 can communicate with one or more of web servers 120 to request and receive data. For example, virtual assistant 210 can communicate with web servers 120 to gather sports scores, movie show times, driving directions, etc. Further, virtual assistant 210 can perform requested operations, such as purchase movie tickets, login to a user account, provide payment information, etc.

Further, virtual assistant 210 can also gather data from client devices 115. For example, to assist a user in determining the estimated time of arrival of a participant of the communication session, virtual assistant 210 can communicate with a client device $115_j$ of the participant user to gather geographic location data of the user, which can then be used to calculate the estimated time of arrival. In some embodiments, virtual assistant 210 can be required to receive approval from the participant of the communication session prior to receiving data from the participants client device $115_j$. For example, virtual assistant 210 can transmit a message as part of the communication session to the client device $115_j$ requesting the specified data and the receiving participant can select to either approve or deny the request.

In some embodiments, virtual assistant 210 can gather data from content management system 105. For example, virtual assistant 210 can gather data from user accounts maintained by content managements system 210. This can include demographic data for one or more participants of the communication session, contact information, content items assigned to each user, such as applications utilized by each user, etc. In some embodiments, virtual assistant 210 can be required to receive approval from the participant of the communication session prior to being able to access data from the participant's user account. For example, virtual assistant 210 can transmit a message as part of the communication session to the client device $115_j$ requesting approval to access the participant's user account and the receiving participant can select to either approve or deny the request.

Alternatively, a participant can authorize virtual assistant 210 to access their user account by selecting to utilize the virtual assistant with respect to the communication session. Thus, virtual assistant 210 can be automatically authorized to access the user account of each participant of the communication session that has selected to utilize the virtual assistant 210. Virtual assistant 210 can transmit messages requesting approval to access the user account of any participant that has not selected to utilize the personal assistant 210.

In some embodiments, virtual assistant 210 can gather data directly from the participants of a communication session. For example, virtual assistant 210 can present a poll as part of the communication session to gather feedback from the users. This can include presenting the users with multiple options, such as potential restaurants, meeting times, etc. The poll can enable each participant to enter their selection and virtual assistant 210 can select a time, restaurant, etc., based on the provided selections.

In some embodiments, the options presented to the users as part of a poll can be based on data gathered by virtual assistant 210 from the users. For example, to help with the task of selecting a restaurant, the virtual assistant can gather location information from each participant and select restaurants that are nearby or equidistance from the participants. The selected restaurants can then be presented to the users in a poll.

As another example, to assist users schedule a meeting, virtual assistant 210 can gather calendar information from each user to identify a set of candidate times that works best for the participants. Virtual assistant 210 can then present the candidate times to the users as part of the communication session and allow the users to provide feedback.

In some embodiments, virtual assistant 210 can place a temporary hold on the candidate times while the users are providing feedback. The temporary hold will indicate the candidate times as taken or potentially taken until virtual assistant 210 can finalize a time for the meeting. Once virtual assistant 210 finalizes the time for the meeting, the unselected candidate times will no longer be held and the selected candidate time will be scheduled for the meeting.

As another example, to assist a user to perform a financial transaction with one or more other users, virtual assistant 210 can gather data indicating payment methods available to each user and select a set of candidate payment methods that are available to each user. For example, a payment method can be an application that enables a user to transfer money from one party to another. Virtual assistant 210 can determine which payment methods are installed on each user's client device 115 and then present a set of candidate payments methods from which the user can select.

Figure 3:
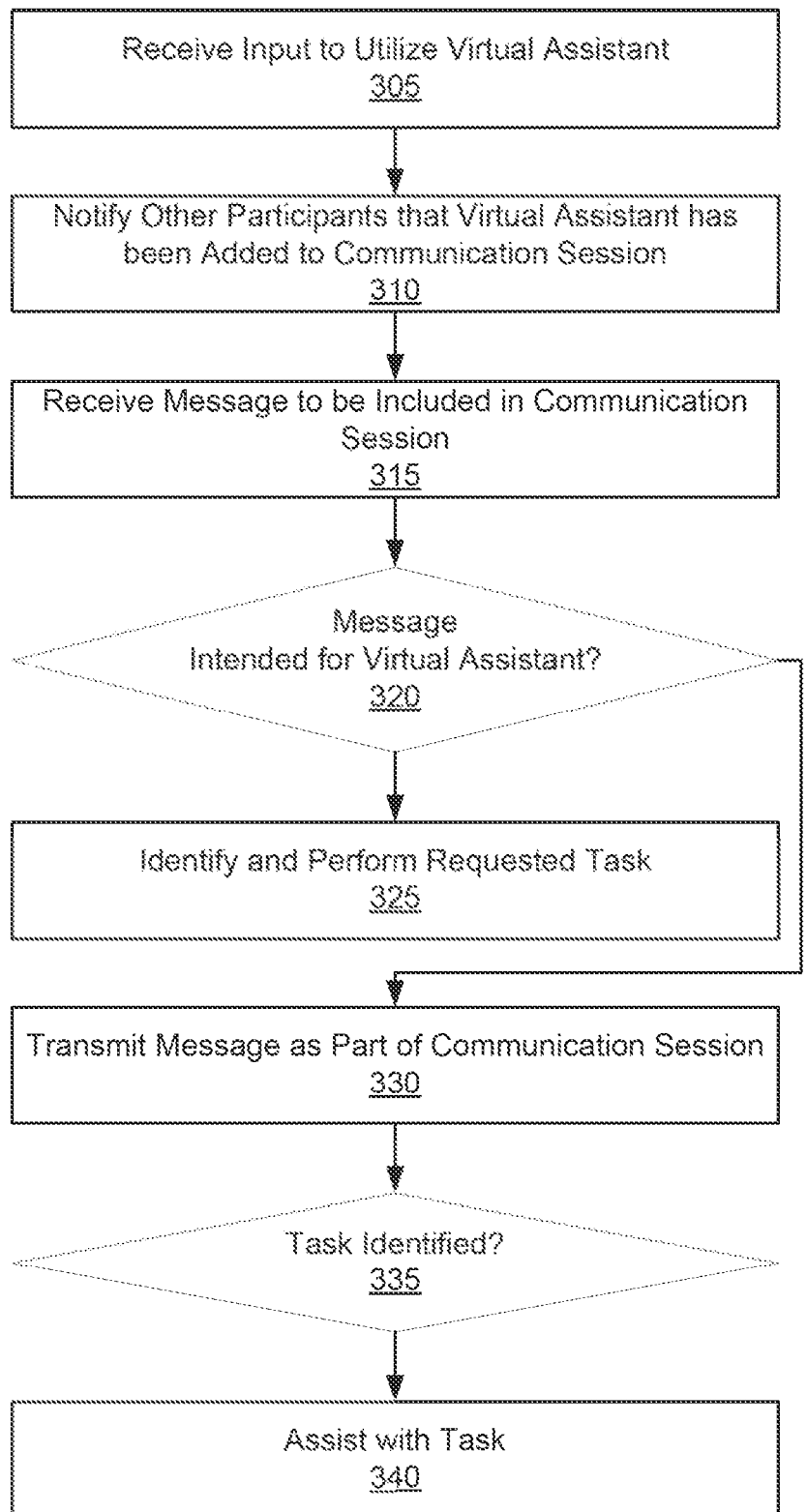
FIG. 3 shows a method of a client device utilizing a virtual assistant to assist with a communication session.

FIG. 3 shows a method of a client device $115_i$ utilizing a virtual assistant 120 to assist with a communication session. The method shown in FIG. 3 is described in view of the systems shown in FIG. 1 and FIG. 2. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 3.

At block 305, communication application 205 receives an input indicating that the user of client device $115_i$ would like to utilize virtual assistant 210 to assist with tasks in relation to a specified communication session. For example, the user may have added a nickname associated with virtual assistant 210 as a participant to the communication session. Alternatively, the user may have selected a user interface element indicating that the user would like to utilize virtual assistant 210. In another example, the user can select to utilize virtual assistant 210 by directly addressing virtual assistant 210 in the communication session. For example, the user can enter a message that begins with the a nickname associated with virtual assistant 210, thereby automatically adding virtual assistant 210 to the communication session. In other examples, any other participant of in the communication session can separately confirm and/or consent whether to include virtual assistant 210.

At block 310, communication application 205 can notify the other participant that the virtual assistant is being utilized. For example, the nickname for the personal assistant can be presented as a member of the communication session. Alternatively, communication application 205 can transmit a message to the other participants as part of the communication session that indicates that virtual assistant 210 is being utilized. In some embodiments, the message can prompt the other participants to select to utilize the virtual assistant as well.

At block 315, communication application 205 receives a message to be included in the communication session. For example, a user of client device $115_i$ can enter a message using the communication application.

At block 320, virtual assistant 210 determines whether the message was intended for virtual assistant 210. For example, virtual assistant 210 can use semantic recognition to analyze the message and determine whether the message was intended for virtual assistant 210 or, alternatively, for the other participants of the communication session.

If at block 320, virtual assistant 210 determines that the message was intended for virtual assistant 210, the method continues to block 325. At block 325 the virtual assistant 210 identifies and assists the user with the requested task. The message may not be transmitted to the other recipients of the communication session because it was intended for virtual assistant 210.

Alternatively, if at block 320, virtual assistant 210 determines that the message was not intended for virtual assistant 210 (i.e., the message was intended for the other recipients of the communication session) the method continues to block 330. At block 220 communication application 205 transmits the message as part of the communication session to the other participants of the communication session.

If virtual assistant 210 determines the message is not intended for virtual assistant 210 then at block 335, virtual assistant 210 determines whether there is a task that virtual assistant 210 can assist with. For example, virtual assistant 210 can use semantic recognition to analyze one or more messages included in the communication session to determine whether there is a task that virtual assistant 210 can assist with. If at block 335, virtual assistant identifies a task, the method continues to block 340 where virtual assistant 210 assists the user with the task.

Figure 4A:
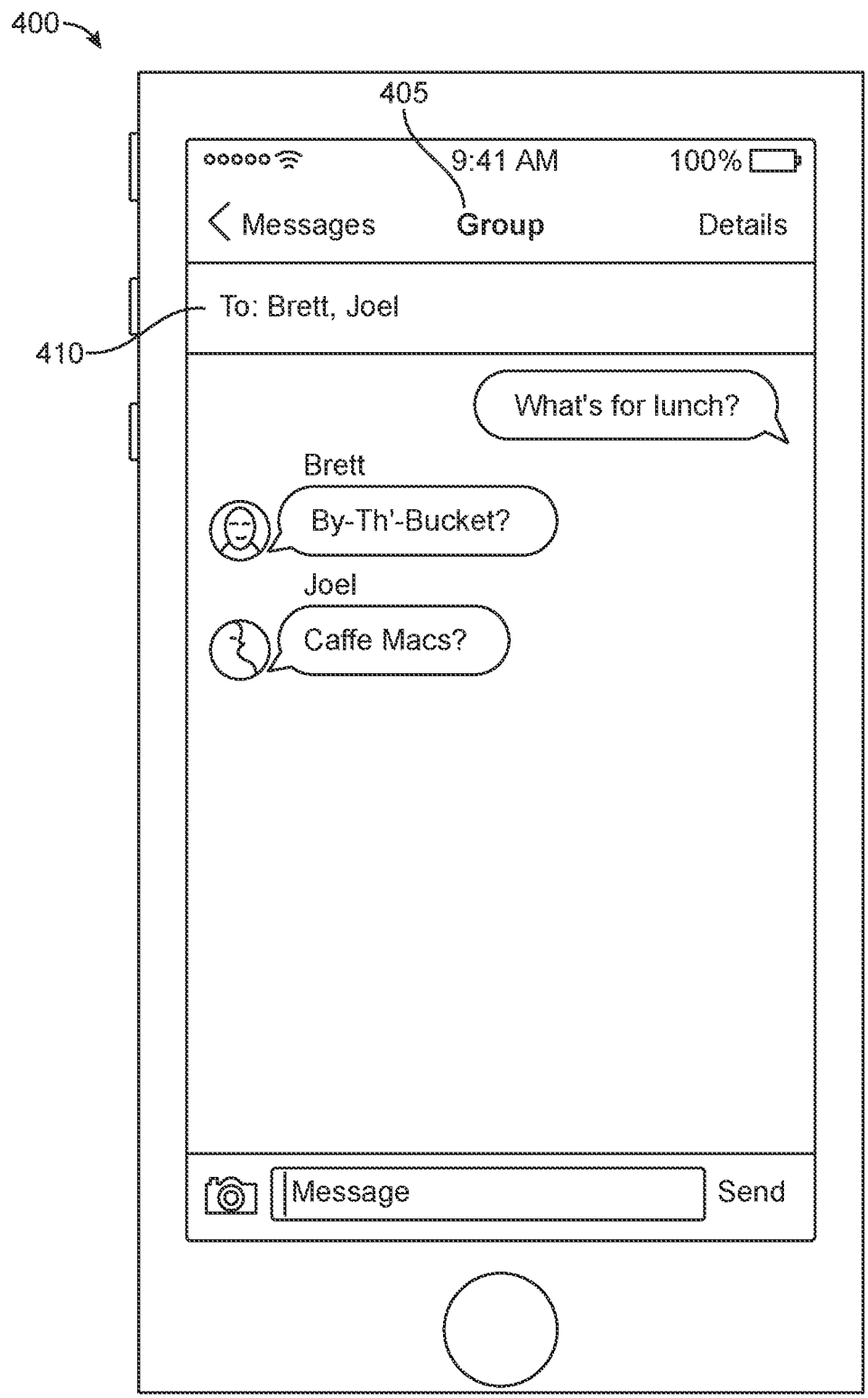
FIGS. 4A-4F shows an example of a virtual assistant assisting a participant of a communication session.

FIGS. 4A-4F show an example of a virtual assistant assisting a participant of a communication session. FIG. 4A shows a client device 400 used to conduct a communication session 405 between multiple participants. As shown,. the communication session 405 includes a recipient list 410 identifying the participants of the communication session 405 that will receive messages from the user of client device 400. Accordingly, the communication session 405 has three participants: the user of the client device 400, Brett and Joel. The participants are using the communication session 405 to determine where to eat lunch.

Figure 4B:
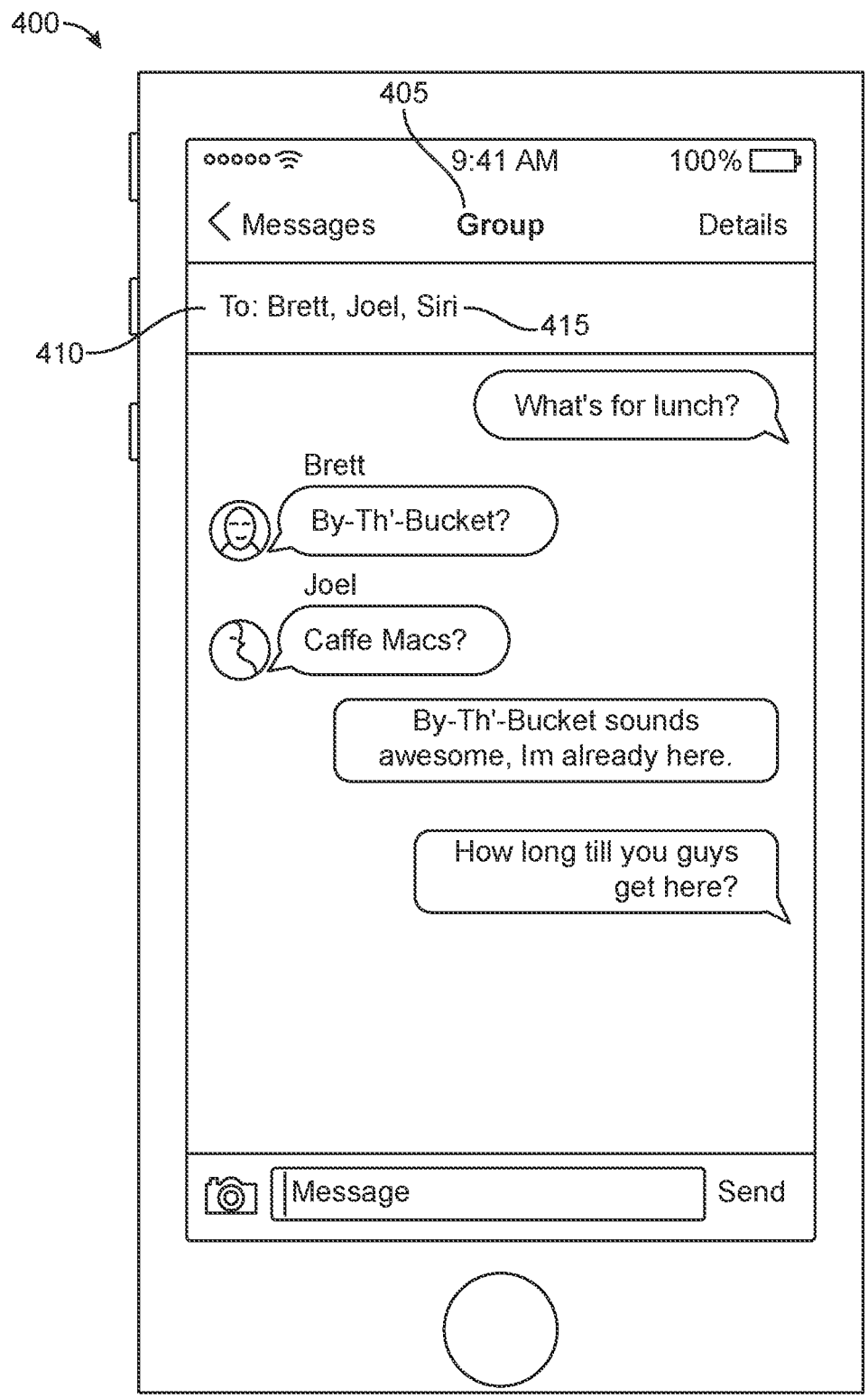

FIG. 4B shows that virtual assistant 415 is included in the recipient list 410, indicating that the user of client device 400 has selected to utilize the virtual assistant in relation to the communication session 405. As shown, the user of the client device 400 has entered the message "how long till you guys get here?"

Figure 4C:
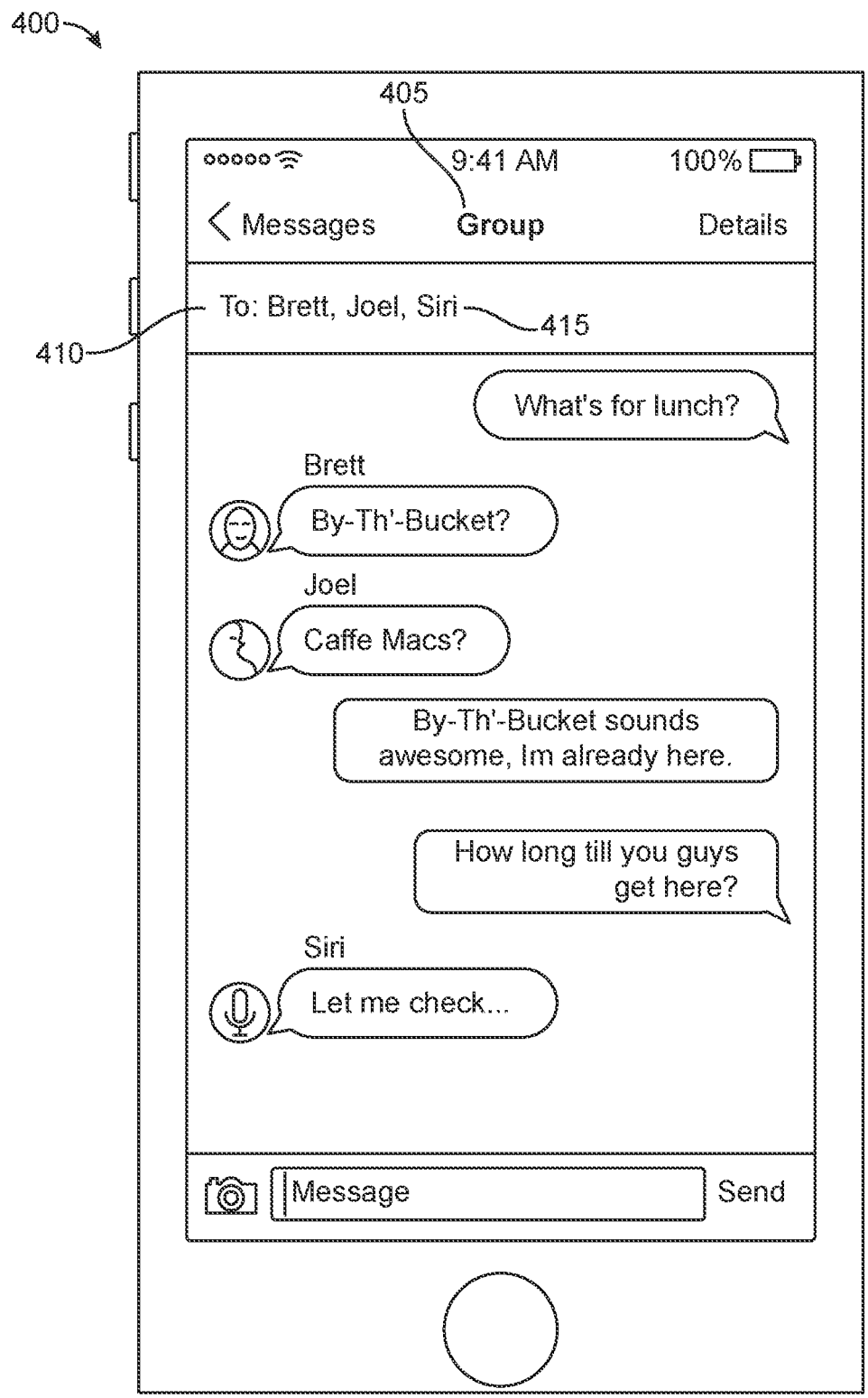

FIG. 4C shows that virtual assistant 415 has presented a message as part of the communication session 405 indicating that the virtual assistant has identified a task and is assisting the user with the identified task. In this case, the task is determining when the other participants of the communication session 405 will arrive at the restaurant for lunch. In some embodiments, the message from virtual assistant 415 can be presented on only the client device 400 and not on the client devices of the other participants of the communication session 405. Alternatively, in some embodiments can be presented on the client device of one or more of the other participants of the communication session 405.

Figure 4D:
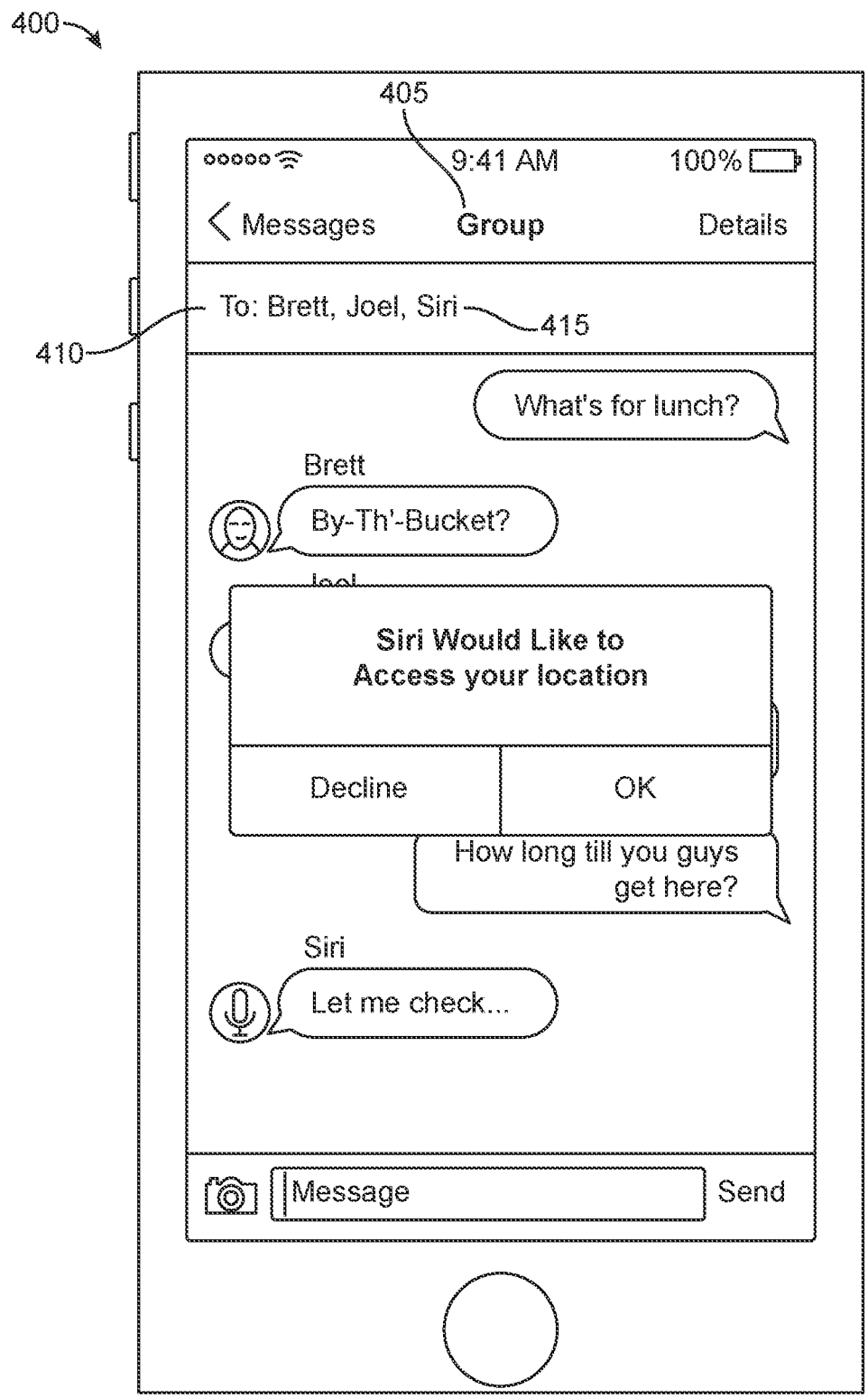

FIG. 4D shows that virtual assistant 415 is requesting authorization to access the location information of the user. This message can be presented to each of the participants of the communication session. If a user selects to decline the authorization request, the virtual assistant will not be able to access the location information of the user. If a user selects to authorize the personal assistant to access the location information of the user, virtual assistant 415 will be able to request and receive the location information. For example, the virtual assistant can request the location information from the users client device. Alternatively, virtual assistant 415 can gather the location information from a content management system that maintains user accounts for the users, such as content management system 105 of FIG. 1.

Figure 4E:
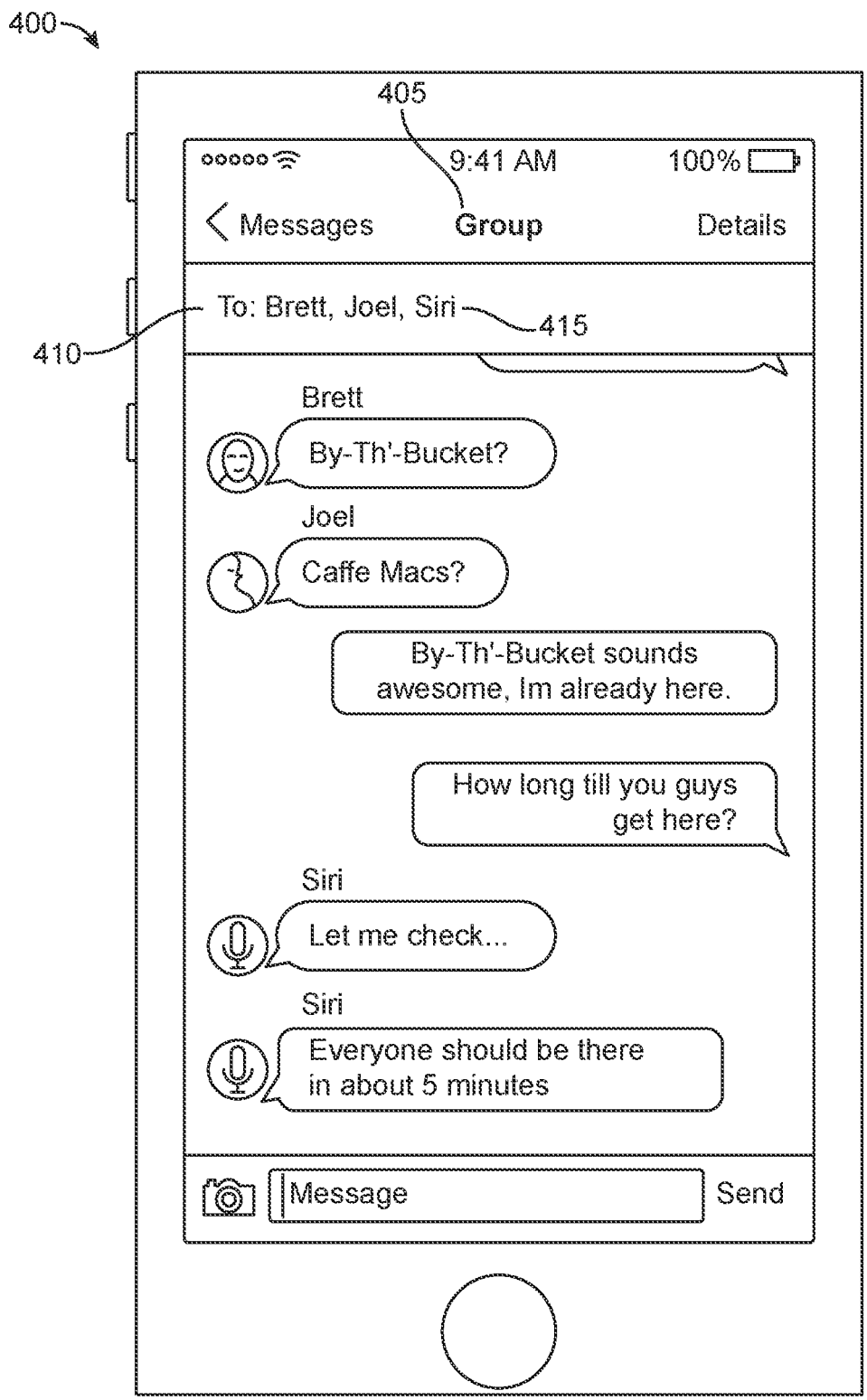

FIG. 4E shows that the virtual assistant 415 has entered a message into the communication session that completes the user's task of determining when the other participants will arrive at the restaurant. The message from virtual assistant 415 can be presented only to the user of the client device 400 as part of the communication session 405. Alternatively, the message from virtual assistant 415 can be presented on the client device of one or more of the other participants of the communication session 405.

Figure 4F:
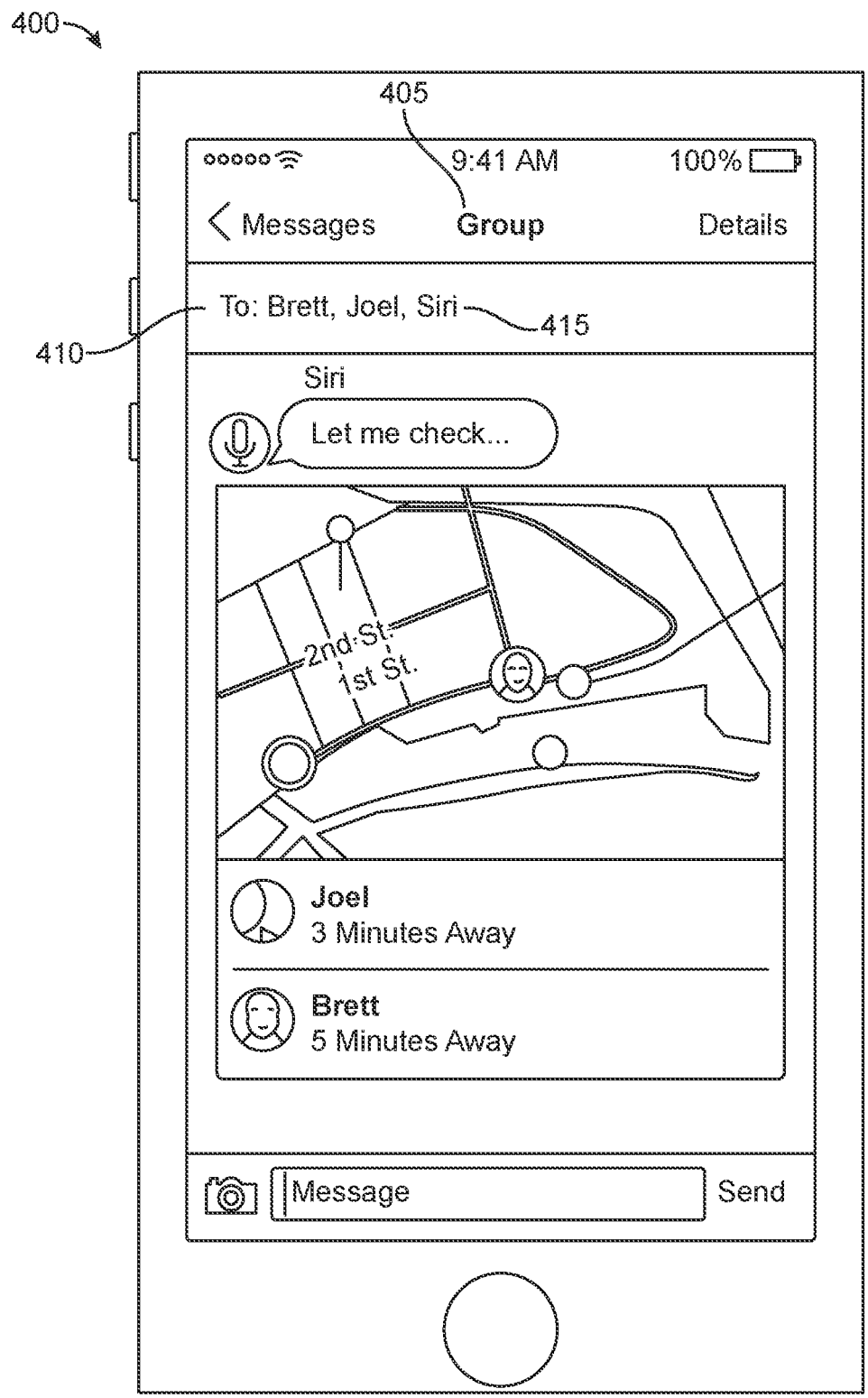

FIG. 4F shows another embodiment of virtual assistant 415 providing the user with the estimated time of arrival of the other participants of the communication session. As shown, a map interface is presented as part of the communication session and the location of the other participants is presented on the map interface.

Figure 5A:
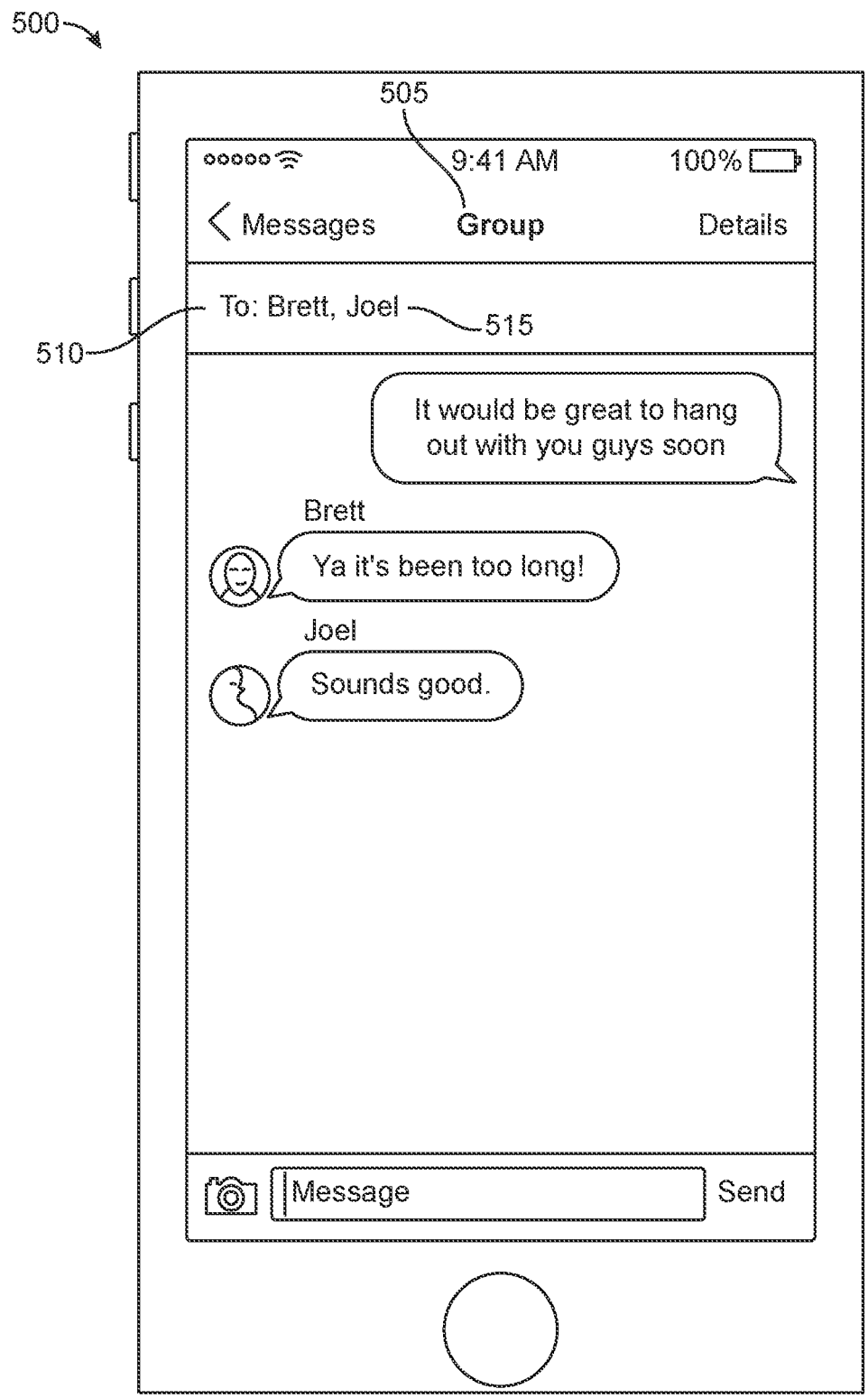
FIGS. 5A-5D show an example of the virtual assistant assisting participants of a communication session to schedule a meeting.

FIGS. 5A-5D show an example of the virtual assistant assisting participants of a communication session to schedule a meeting. As shown in FIG. 5A, a user of a client device 500 is participating in a communication session 505 with two other participants. The participants of a communication session 505 are discussing meeting up to hang out. As shown by the participant list 510, the virtual assistant is not being utilized in relation to the communication session 505.

Figure 5B:
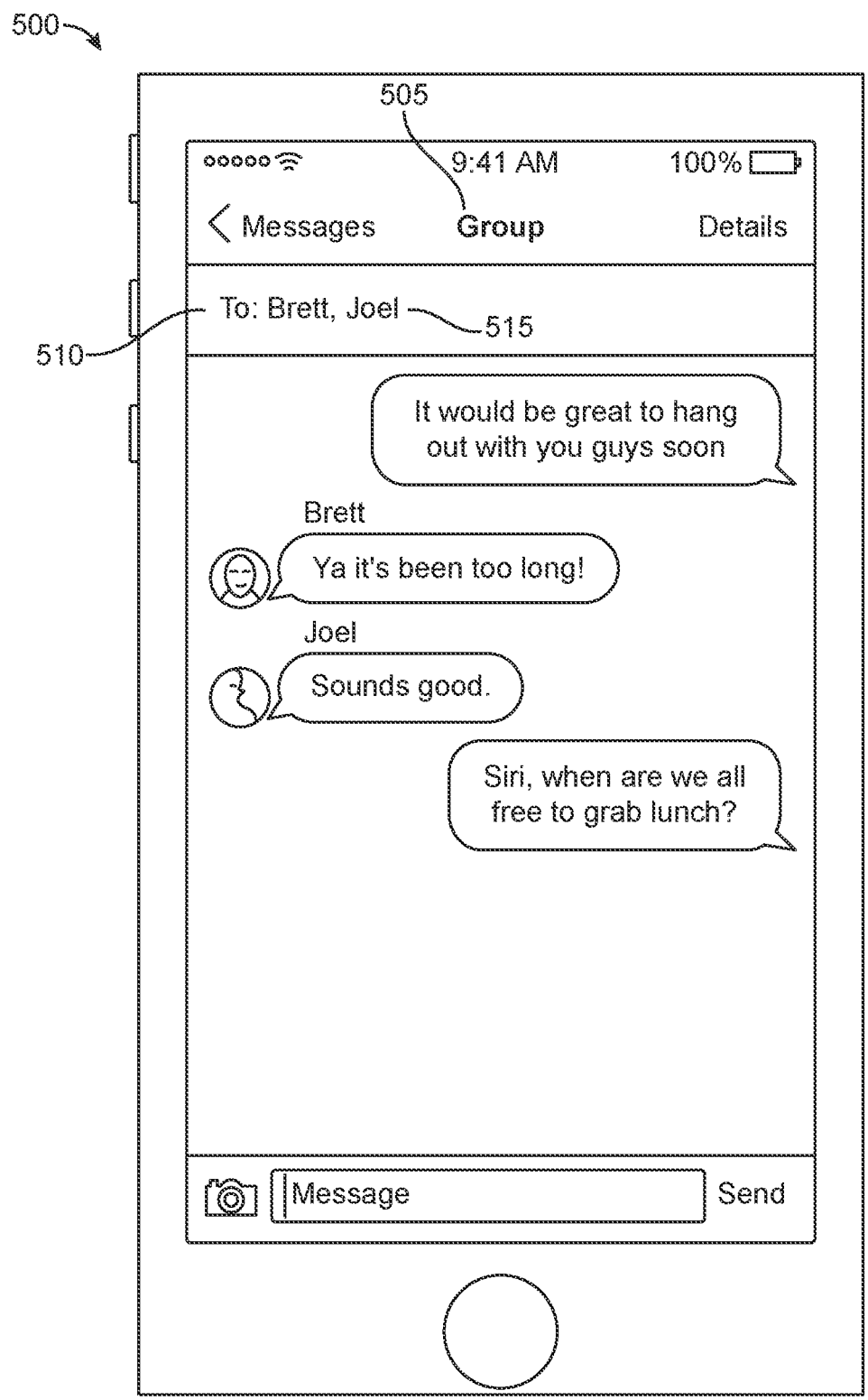

FIG. 5B shows a message entered by the user of client device 500 that is addressed to virtual assistant 515. The message further identifies a task of determining a time when each participant of the communication session 505 is available for lunch. This message can indicate that the user would like to utilize the virtual assistant as well as provide the specified task.

Figure 5C:
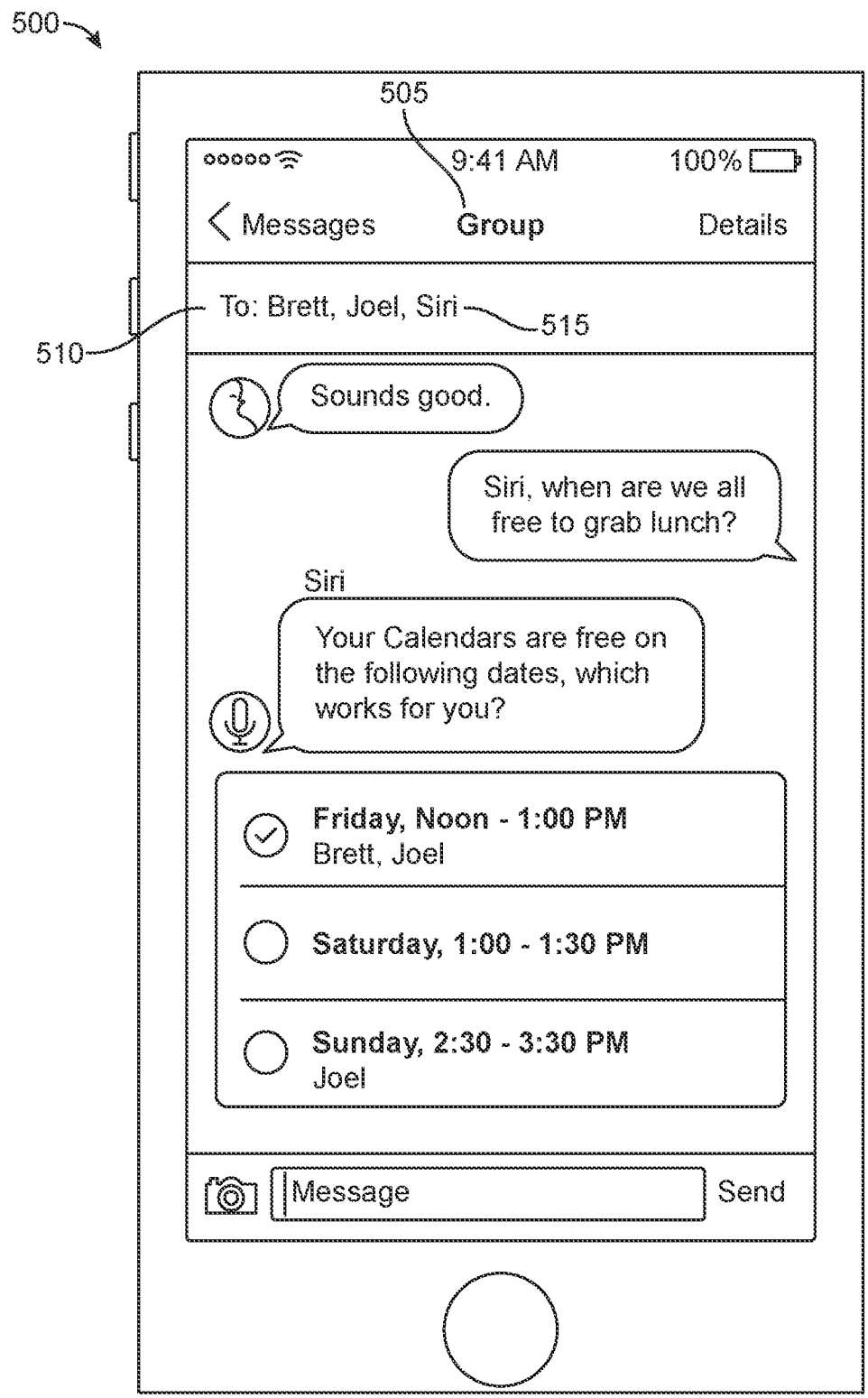

FIG. 5C shows that virtual assistant 515 has been added to the participant list 510 of the communication session 505, indicating that a user has selected to utilize virtual assistant 515. Further, the virtual assistant has presented a poll as part of the communication session 505 that provides the participants with an opportunity to select the time that best works for them. Virtual assistant 515 can determine the presented times based on calendar data gathered from each participant. For example, virtual assistant 515 can gather the calendar data from the client devices of the participants or, alternatively, from a content management system that maintains user accounts for the participants. The presented times can be times at which each of the participants' calendars is not booked (e.g., times at which each participant is free). Further, in some embodiments, virtual assistant 515 can place a temporary hold on each of the participants' calendars for the presented times. This can ensure that the presented times will not be booked while virtual assistant 515 is awaiting responses from the participants. Virtual assistant 515 can place this hold by communicating with the participants' client devices and/or by communicating with the content management system to edit calendar data for the participants.

Figure 5D:
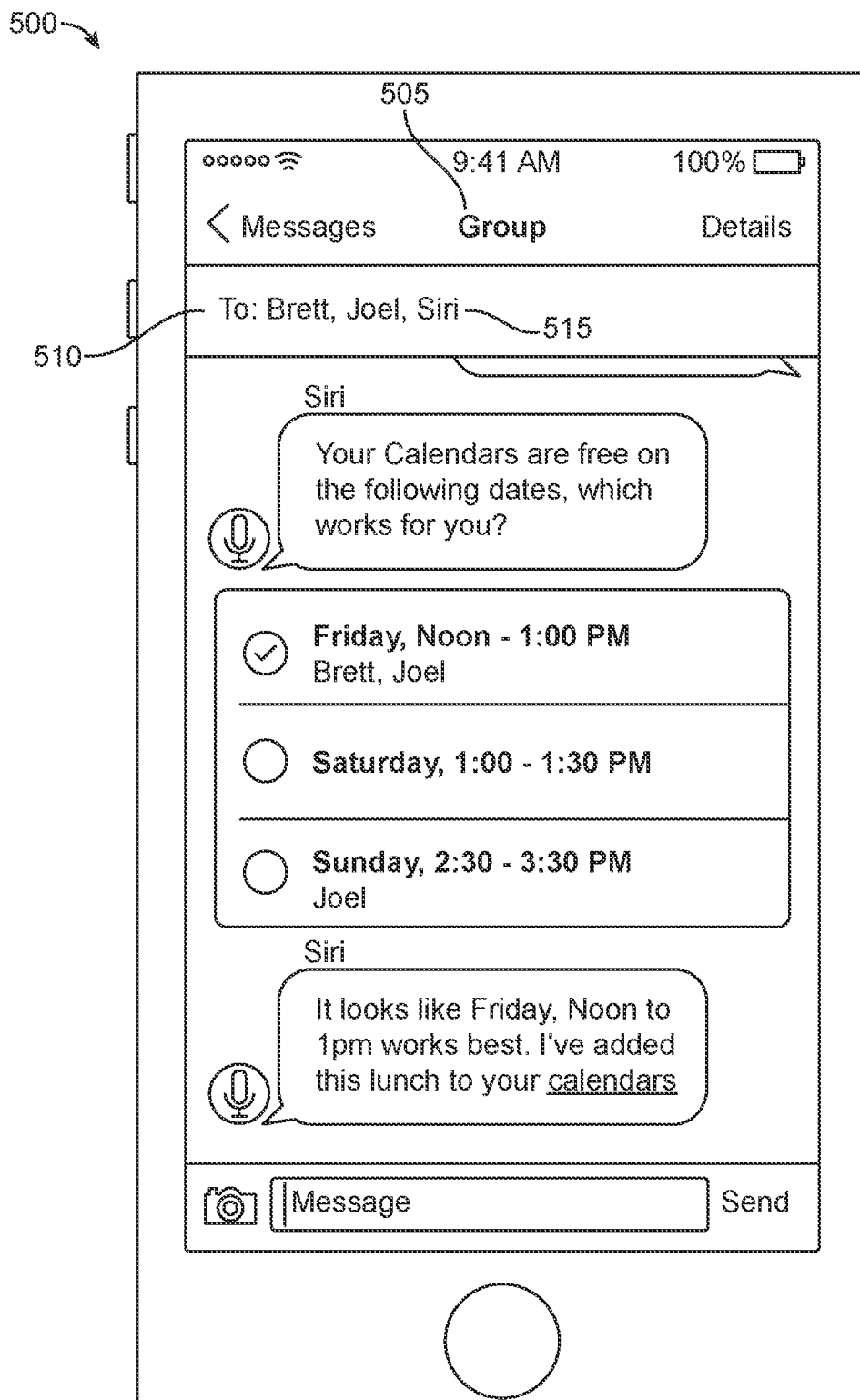

FIG. 5D shows that virtual assistant 515 has determined that Friday from noon to 1 pm is the best time for the meeting and that virtual assistant 515 has added the lunch meeting to the participants' calendars.

Figure 6A:
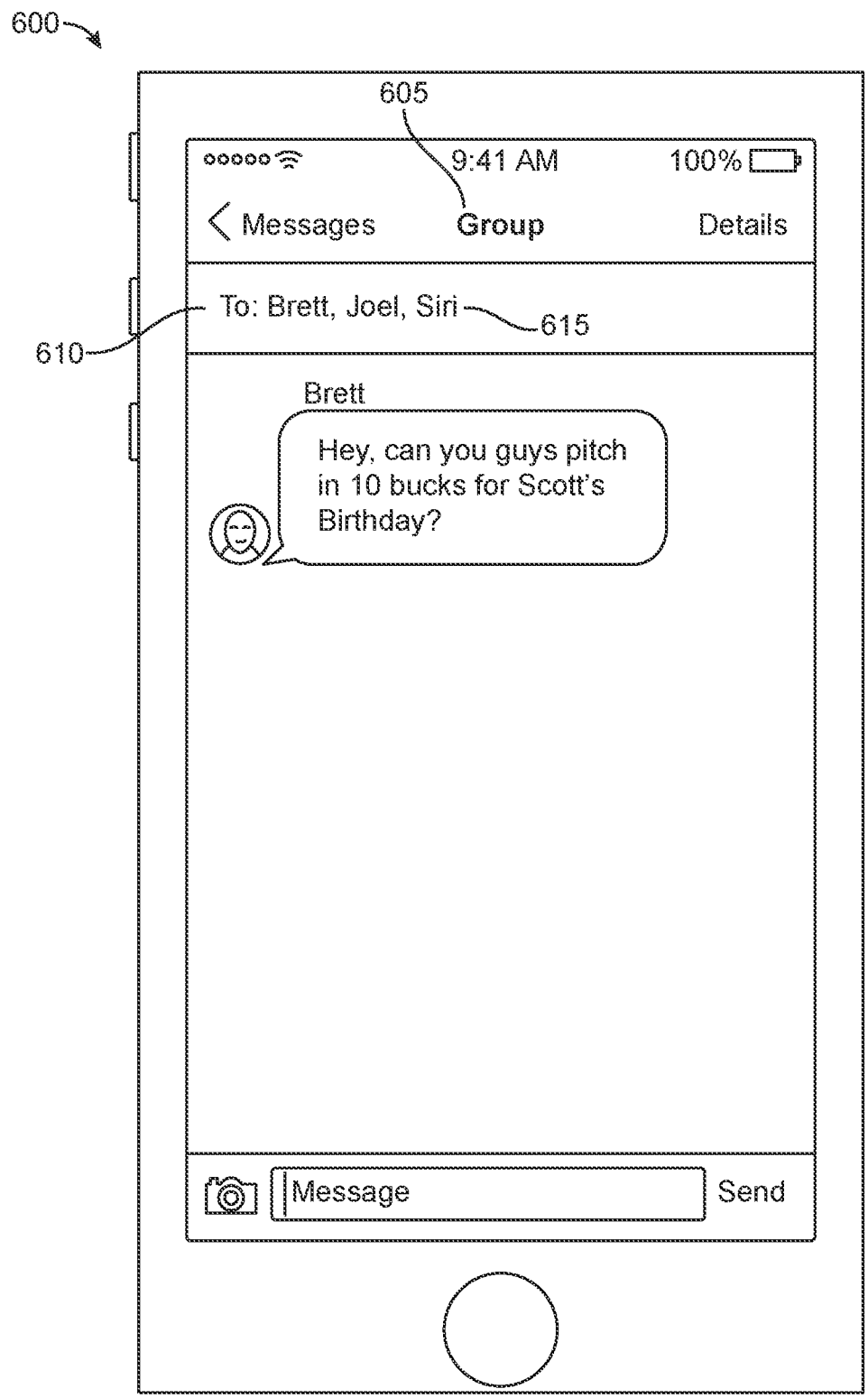
FIGS. 6A-6E show an example of a virtual assistant assisting participants of a communication session to complete a financial transaction.

FIGS. 6A-6E show an example of a virtual assistant assisting participants of a communication session to complete a financial transaction. As shown in FIG. 6A, a user of the client device 600 has received a message as a part of a communication session 605. As indicated by the participant list 610, the virtual assistant is being utilized.

Figure 6B:
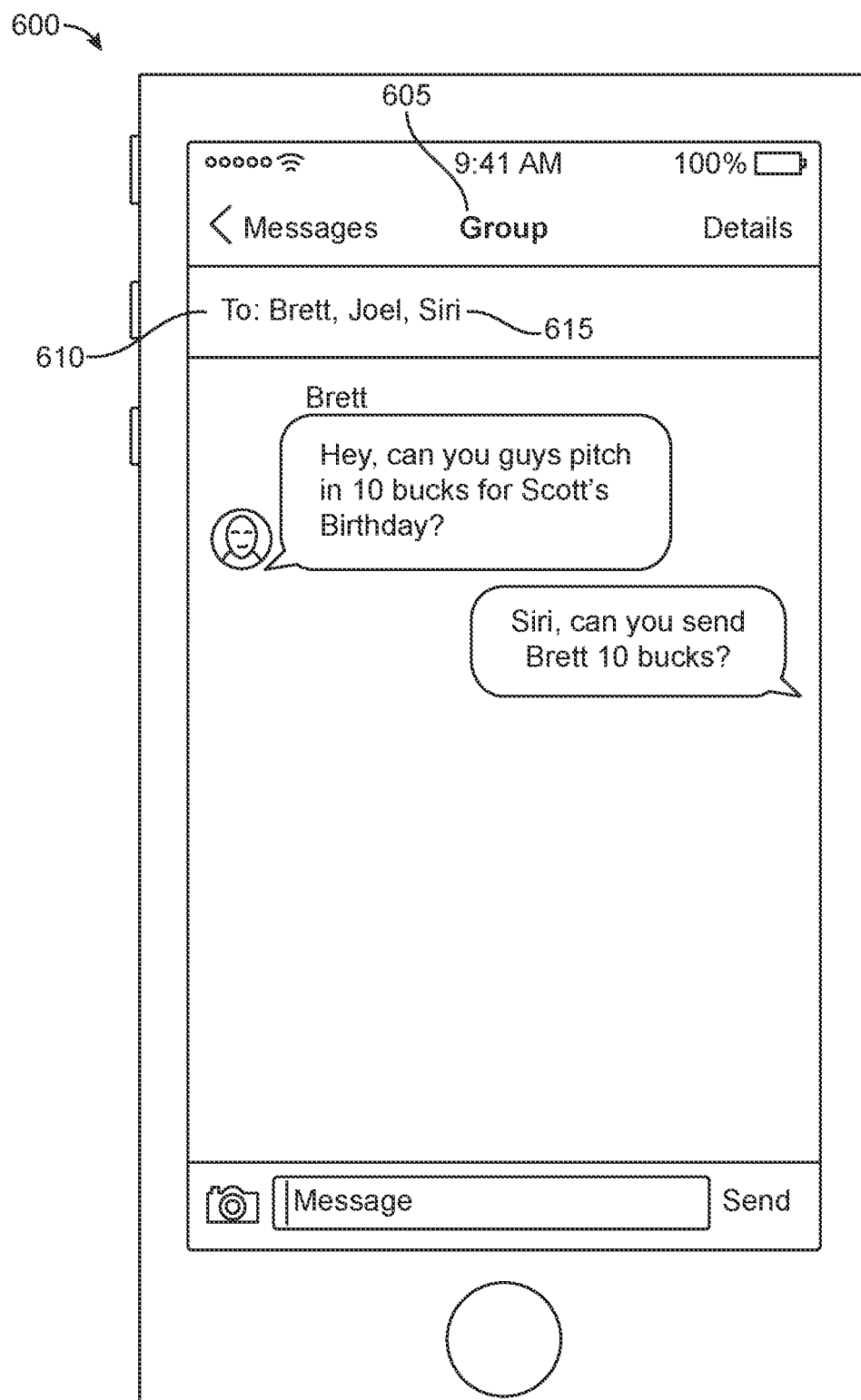

FIG. 6B shows that the user of the client device 600 has entered a message as part of the communication session and that the message is directed to virtual assistant 615. Further, the message requests that virtual assistant 615 send ten dollars to Brett. This message is intended for virtual assistant 615 rather than the other participants of the communication session 605 so the message can be presented on only client device 600 and not shown or presented on the client devices of the other participants.

Figure 6C:
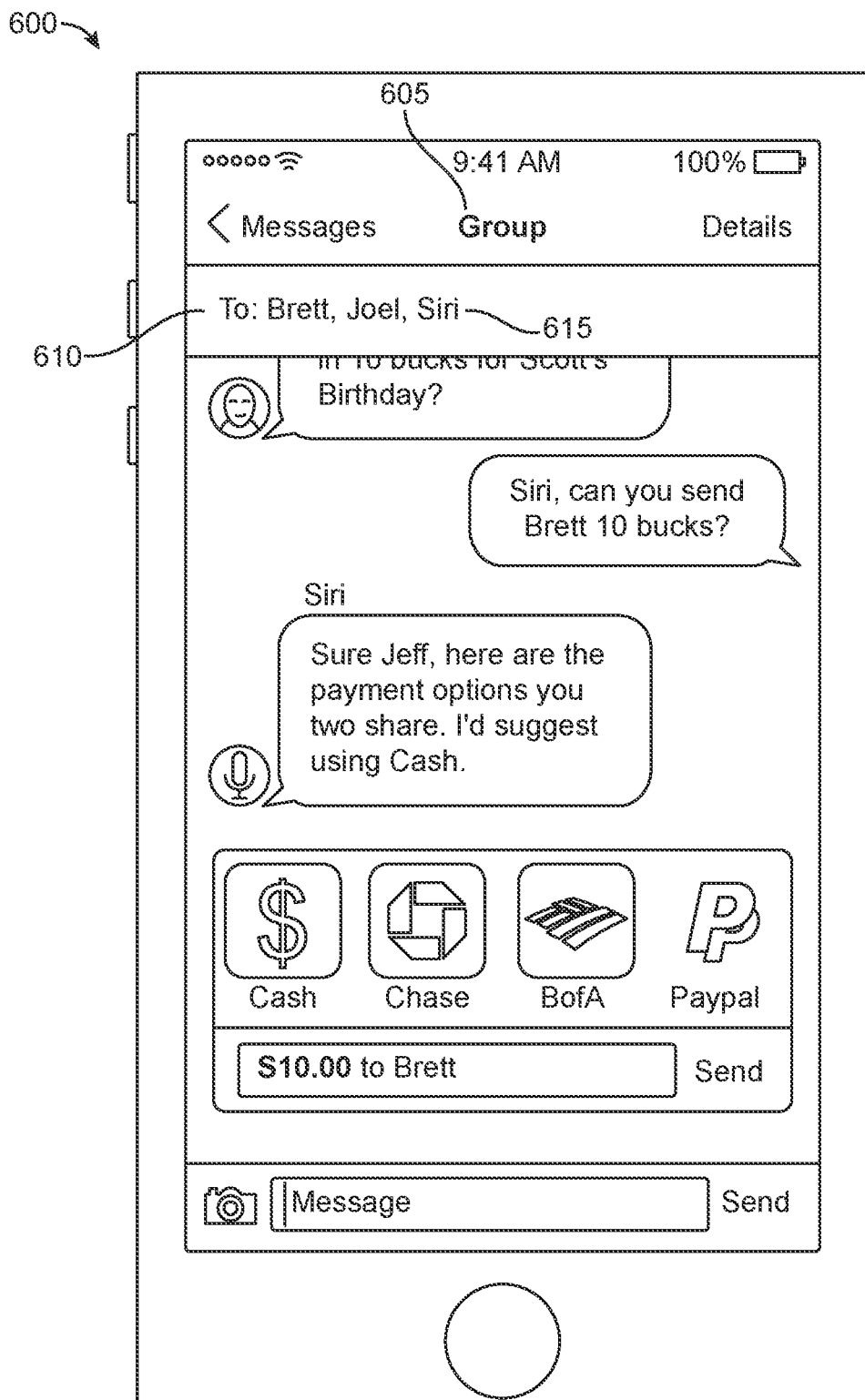

FIG. 6C shows that virtual assistant 615 has entered a message in response to the user's request. Again, this message can be presented only on the user's client device 600 and not shown to the other participants of the communication session.

As shown, virtual assistant 615 has presented the user with multiple payments options which the user can use to send money. The presented payment options can include financial applications that are available to the user as well as the intended recipient. Virtual assistant 615 can gather data identifying the financial applications that are available to the user and the intended recipient by querying the respective users' client devices and/or communicating with a content management system that maintains user accounts for the respective users.

Virtual assistant 615 also suggests a specific payment option which may be the financial application that is used most commonly by both the user and the intended recipient. The user can select the desired financial application to send the money as well as confirm the payment amount and the intended recipient.

Figure 6D:
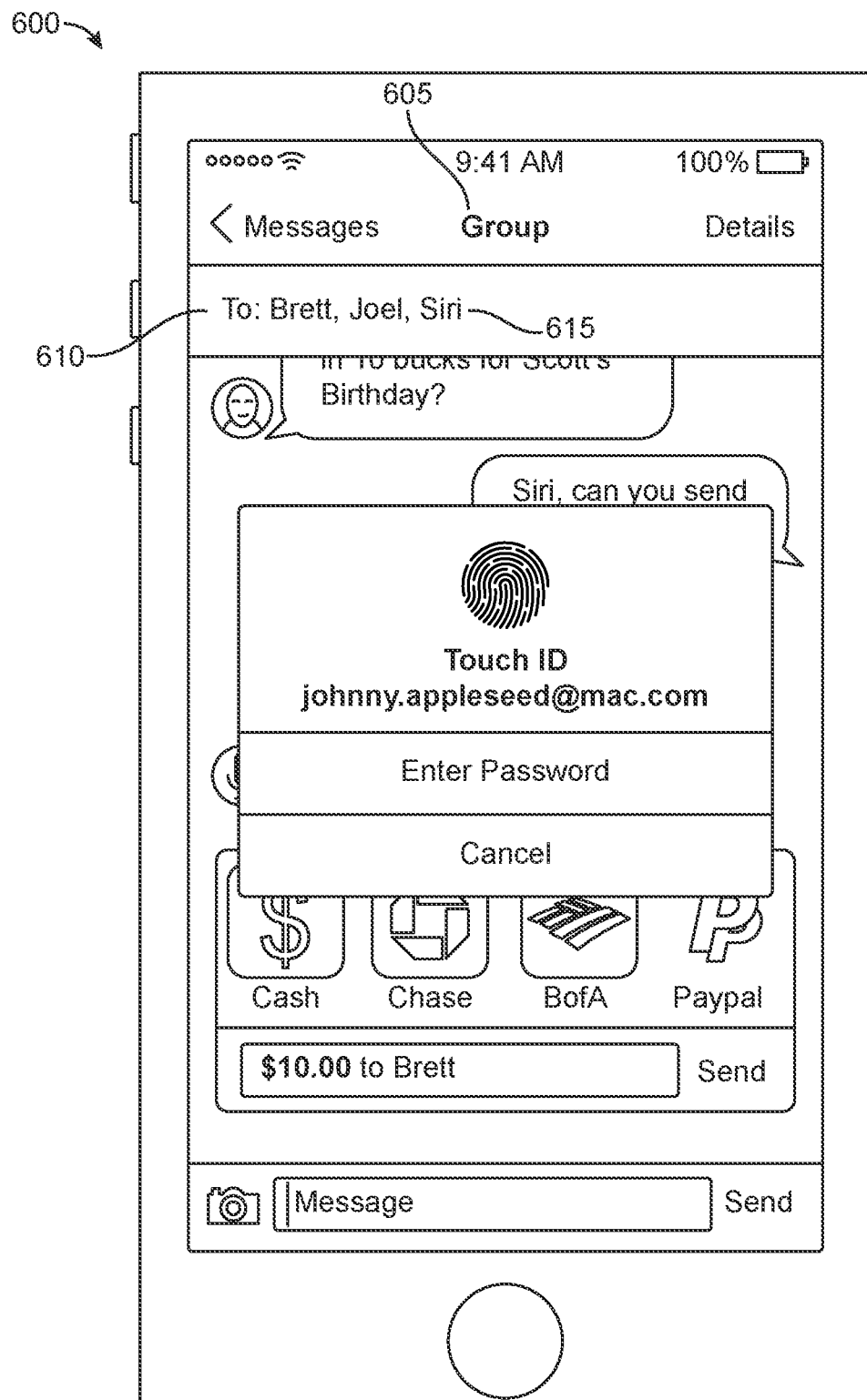

FIG. 6D shows that Virtual assistant 615 can be required to provide authentication information to complete the financial transaction. For example, the user can be required to enter a password, fingerprint, etc.

Figure 6E:
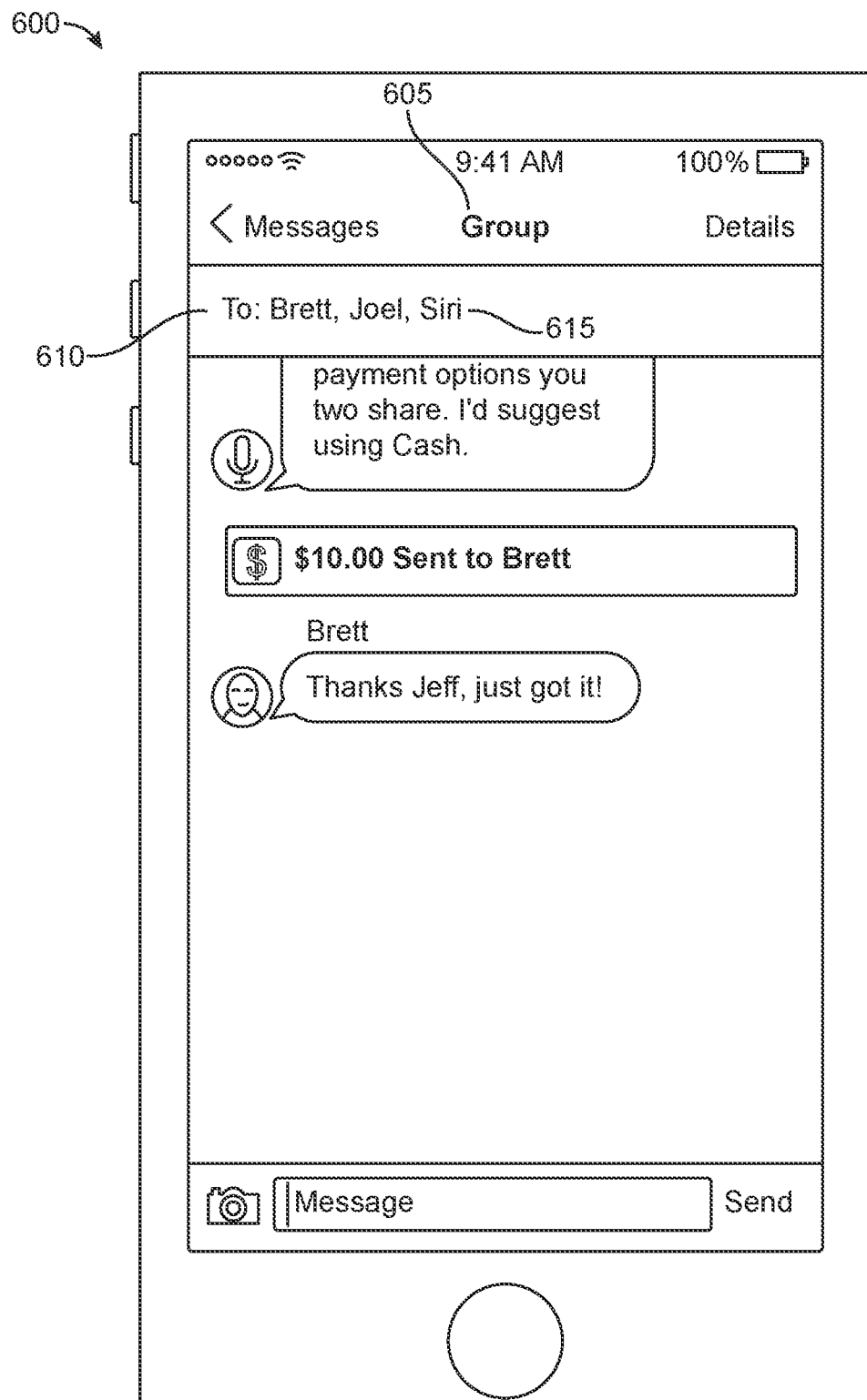

FIG. 6E shows that virtual assistant 615 has presented a message confirming that the funds were transferred as part of the financial transaction. Again, this message can be presented only to the user rather than to the other participants of the communication session 605. Finally, the recipient of the funds has entered a message into the communication session 605 confirming that the funds have been received.

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable storage medium containing instructions that, when executed by a computer processor of a first client device, cause the first client device to:
    display, by the first client device, as part of a communication session that takes place within a messaging application between a first user operating the first client device and a second user operating a second client device, a first message prepared by the first user;
    determine, by a virtual assistant of the first client device, that the first message identifies a first task with which the virtual assistant can assist the first user;
    in response to determining that the first message identifies the first task, assist, by the first client device, the first user with the first task, wherein assisting the first user with the first task includes:
        displaying, as part of the communication session and within the messaging application, a response generated by the virtual assistant based on the first task, wherein the response is not transmitted to the second client device;
    receive a user selection of the displayed response;
    in response to receiving the user selection of the displayed response, present, on the first client device and as part of the communication session, additional content generated by the virtual assistant based on the displayed response;
    while presenting the additional content, receive a user selection of the additional content; and
    in accordance with receiving the user selection of the additional content:
        transmit, to the second client device, a second message associated with the additional content.

2. The non-transitory computer-readable storage medium of claim 1, wherein the instructions, when executed by the computer processor, further cause the first client device to:
    display, by the first client device, as part of the communication session, a third message prepared by the first user;
    determine, by the virtual assistant of the first client device, based on a semantic analysis of the third message, whether the third message is directed to the virtual assistant or to the second user;
    determine, by the virtual assistant of the first client device, based on the semantic analysis of the third message, that the third message is directed to the second user; and
    in response to determining that the third message is directed to the second user, transmit, by the first client device to the second client device, the third message as part of the communication session.

3. The non-transitory computer-readable storage medium of claim 2, wherein the instructions, when executed by the computer processor, further cause the first client device to:
    determine, by the virtual assistant of the first client device, based on the semantic analysis of the third message, that the third message identifies a second task with which the virtual assistant can assist the first user; and
    in response to determining that the third message identifies the second task, assist, by the first client device, the first user with the second task.

4. The non-transitory computer-readable storage medium of claim 3, wherein the instructions, when executed by the computer processor, further cause the first client device to:
    present, on the first client device and as part of the communication session, a request message asking the first user whether the first user would like the virtual assistant to assist the first user with the second task; and
    receive an input indicating that the first user would like the virtual assistant to assist the first user with the second task.

5. The non-transitory computer-readable storage medium of claim 1, wherein the displayed response includes one or more words determined based on the first task.

6. The non-transitory computer-readable storage medium of claim 1, wherein the instructions, when executed by the computer processor, further cause the first client device to:
identify, by the virtual assistant of the first client device, a plurality of applications installed on the first client device that are capable of completing the first task, wherein:
the displayed response prompts the first user to select an application from the plurality of applications to complete the first task; and
the user selection of the displayed response selects a first application from the plurality of applications;
in accordance with receiving user selection of the displayed response, execute the selected first application to perform the first task; and
present, on the first client device and as part of the communication session, a confirmation message indicating the first task was performed.

7. The non-transitory computer-readable storage medium of claim 1, wherein the first task comprises retrieving information associated with the first message.

8. The non-transitory computer-readable storage medium of claim 1, wherein the instructions, when executed by the computer processor, further cause the first client device to:
transmit, to the second client device, and as part of the communication session, a notification message indicating that the virtual assistant is being utilized in relation to the communication session.

9. The non-transitory computer-readable storage medium of claim 1, wherein the first task comprises performing a financial transaction between the first user and the second user.

10. The non-transitory computer-readable storage medium of claim 9, wherein the instructions, when executed by the computer processor, further cause the first client device to:
identify, by the virtual assistant of the first client device, a set of financial applications installed on both the first client device and the second client device that are capable of completing the financial transaction;
transmit, to the second client device, a third message as part of the communication session, the third message prompting the second user to select a financial application from the set of financial applications to complete the financial transaction;
receive, from the second client device, a first reply message identifying the financial application selected from the set of financial applications selected by the second user to complete the financial transaction; and
execute the financial application.

11. The non-transitory computer-readable storage medium of claim 1, wherein the first task comprises scheduling a meeting including the first user and the second user.

12. The non-transitory computer-readable storage medium of claim 11, wherein the instructions, when executed by the computer processor, further cause the first client device to:
identify, based on calendar data for the first user and the second user, a set of candidate times for the meeting;
place a temporary hold on the set of candidate times, wherein the set of candidate times appear booked in calendars of the first user and the second user while the temporary hold is in place;
present the first user and the second user with a poll to select from the set of candidate times, the poll presented as part of the communication session; and
schedule the meeting during one of the candidate times based on response data received from the first user and the second user to the poll.

13. The non-transitory computer-readable storage medium of claim 1, wherein the first task comprises determining an estimated time of arrival for the second user.

14. The non-transitory computer-readable storage medium of claim 13, wherein determining the estimated time of arrival for the second user comprises:
requesting authorization to access location information of the second user; and
in accordance with a determination that the second user selects to authorize access to the location information of the second user:
gathering the location information of the second user; and
displaying, based on the location information of the second user, the estimated time of arrival the second user.

15. The non-transitory computer-readable storage medium of claim 1, wherein the virtual assistant of the first client device determines, based on a semantic analysis of the first message, that the first message identifies the first task with which the virtual assistant can assist the first user.

16. The non-transitory computer-readable storage medium of claim 1, wherein the displayed response corresponds to a suggestion generated by the virtual assistant of the first client device.

17. The non-transitory computer-readable storage medium of claim 1, wherein the user selection of the additional content authorizes information to be sent to the second client device, wherein the information corresponds to the first task.

18. The non-transitory computer-readable storage medium of claim 1, wherein the instructions, when executed by the computer processor, further cause the first client device to:
after transmitting, to the second client device, the second message:
receive, from the second client device, a response to the second message; and
display, as part of the communication session, the response to the second message.

19. A method, comprising:
at a first client device with one or more processors, memory, and a display:
displaying, by the first client device, as part of a communication session that takes place within a messaging application between a first user operating the first client device and a second user operating a second client device, a first message prepared by the first user;
determining, by a virtual assistant of the first client device, that the first message identifies a first task with which the virtual assistant can assist the first user;
in response to determining that the first message identifies the first task, assisting, by the first client device, the first user with the first task, wherein assisting the first user with the first task includes:
displaying, as part of the communication session and within the messaging application, a response generated by the virtual assistant based on the first task, wherein the response is not transmitted to the second client device;

receiving a user selection of the displayed response;
in response to receiving the user selection of the displayed response, presenting, on the first client device and as part of the communication session, additional content generated by the virtual assistant based on the displayed response;
while presenting the additional content, receiving a user selection of the additional content; and
in accordance with receiving the user selection of the additional content:
transmitting, to the second client device, a second message associated with the additional content.

20. A first client device, comprising:
a computer processor; and
a memory containing instructions that, when executed by the computer processor, cause the first client device to:
display, by the first client device, as part of a communication session that takes place within a messaging application between a first user operating the first client device and a second user operating a second client device, a first message prepared by the first user;
determine, by a virtual assistant of the first client device, that the first message identifies a first task with which the virtual assistant can assist the first user;
in response to determining that the first message identifies the first task, assist, by the first client device, the first user with the first task, wherein assisting the first user with the first task includes:
displaying, as part of the communication session and within the messaging application, a response generated by the virtual assistant based on the first task, wherein the response is not transmitted to the second client device;
receive a user selection of the displayed response;
in response to receiving the user selection of the displayed response, present, on the first client device and as part of the communication session, additional content generated by the virtual assistant based on the displayed response;
while presenting the additional content, receive a user selection of the additional content; and
in accordance with receiving the user selection of the additional content: transmit, to the second client device, a second message associated with the additional content.

21. The method of claim 19, further comprising:
displaying, by the first client device, as part of the communication session, a third message prepared by the first user;
determining, by the virtual assistant of the first client device, based on a semantic analysis of the third message, whether the third message is directed to the virtual assistant or to the second user;
determining, by the virtual assistant of the first client device, based on the semantic analysis of the third message, that the third message is directed to the second user; and
in response to determining that the third message is directed to the second user, transmitting, by the first client device to the second client device, the third message as part of the communication session.

22. The method of claim 21, further comprising:
determining, by the virtual assistant of the first client device, based on the semantic analysis of the third message, that the third message identifies a second task with which the virtual assistant can assist the first user; and
in response to determining that the third message identifies the second task, assisting, by the first client device, the first user with the second task.

23. The method of claim 22, further comprising:
presenting, on the first client device and as part of the communication session, a request message asking the first user whether the first user would like the virtual assistant to assist the first user with the second task; and
receiving an input indicating that the first user would like the virtual assistant to assist the first user with the second task.

24. The method of claim 19, wherein the displayed response includes one or more words determined based on the first task.

25. The method of claim 19, further comprising:
identifying, by the virtual assistant of the first client device, a plurality of applications installed on the first client device that are capable of completing the first task, wherein:
the displayed response prompts the first user to select an application from the plurality of applications to complete the first task; and
the user selection of the displayed response selects a first application from the plurality of applications;
in accordance with receiving user selection of the displayed response, executing the selected first application to perform the first task; and
presenting, on the first client device and as part of the communication session, a confirmation message indicating the first task was performed.

26. The method of claim 19, wherein the first task comprises retrieving information associated with the first message.

27. The method of claim 19, further comprising:
transmitting, to the second client device, and as part of the communication session, a notification message indicating that the virtual assistant is being utilized in relation to the communication session.

28. The method of claim 19, wherein the first task comprises performing a financial transaction between the first user and the second user.

29. The method of claim 28, further comprising:
identifying, by the virtual assistant of the first client device, a set of financial applications installed on both the first client device and the second client device that are capable of completing the financial transaction;
transmitting, to the second client device, a third message as part of the communication session, the third message prompting the second user to select a financial application from the set of financial applications to complete the financial transaction;
receiving, from the second client device, a first reply message identifying the financial application selected from the set of financial applications selected by the second user to complete the financial transaction; and
executing the financial application.

30. The method of claim 19, wherein the first task comprises scheduling a meeting including the first user and the second user.

31. The method of claim 30, further comprising:
identifying, based on calendar data for the first user and the second user, a set of candidate times for the meeting;

placing a temporary hold on the set of candidate times, wherein the set of candidate times appear booked in calendars of the first user and the second user while the temporary hold is in place;

presenting the first user and the second user with a poll to select from the set of candidate times, the poll presented as part of the communication session; and scheduling the meeting during one of the candidate times based on response data received from the first user and the second user to the poll.

32. The method of claim 19, wherein the first task comprises determining an estimated time of arrival for the second user.

33. The method of claim 32, wherein determining the estimated time of arrival for the second user comprises:

requesting authorization to access location information of the second user; and in accordance with a determination that the second user selects to authorize access to the location information of the second user:

gathering the location information of the second user; and displaying, based on the location information of the second user, the estimated time of arrival the second user.

34. The method of claim 19, wherein the virtual assistant of the first client device determines, based on a semantic analysis of the first message, that the first message identifies the first task with which the virtual assistant can assist the first user.

35. The method of claim 19, wherein the displayed response corresponds to a suggestion generated by the virtual assistant of the first client device.

36. The method of claim 19, wherein the user selection of the additional content authorizes information to be sent to the second client device, wherein the information corresponds to the first task.

37. The method of claim 19, further comprising:

after transmitting, to the second client device, the second message:

receiving, from the second client device, a response to the second message; and displaying, as part of the communication session, the response to the second message.

38. The first client device of claim 20, wherein the instructions, when executed by the computer processor, further cause the first client device to:

display, by the first client device, as part of the communication session, a third message prepared by the first user;

determine, by the virtual assistant of the first client device, based on a semantic analysis of the third message, whether the third message is directed to the virtual assistant or to the second user;

determine, by the virtual assistant of the first client device, based on the semantic analysis of the third message, that the third message is directed to the second user; and in response to determining that the third message is directed to the second user, transmit, by the first client device to the second client device, the third message as part of the communication session.

39. The first client device of claim 38, wherein the instructions, when executed by the computer processor, further cause the first client device to:

determine, by the virtual assistant of the first client device, based on the semantic analysis of the third message, that the third message identifies a second task with which the virtual assistant can assist the first user; and in response to determining that the third message identifies the second task, assist, by the first client device, the first user with the second task.

40. The first client device of claim 39, wherein the instructions, when executed by the computer processor, further cause the first client device to:

present, on the first client device and as part of the communication session, a request message asking the first user whether the first user would like the virtual assistant to assist the first user with the second task; and receive an input indicating that the first user would like the virtual assistant to assist the first user with the second task.

41. The first client device of claim 20, wherein the displayed response includes one or more words determined based on the first task.

42. The first client device of claim 20, wherein the instructions, when executed by the computer processor, further cause the first client device to:

identify, by the virtual assistant of the first client device, a plurality of applications installed on the first client device that are capable of completing the first task, wherein:

the displayed response prompts the first user to select an application from the plurality of applications to complete the first task; and the user selection of the displayed response selects a first application from the plurality of applications;

in accordance with receiving user selection of the displayed response, execute the selected first application to perform the first task; and present, on the first client device and as part of the communication session, a confirmation message indicating the first task was performed.

43. The first client device of claim 20, wherein the first task comprises retrieving information associated with the first message.

44. The first client device of claim 20, wherein the instructions, when executed by the computer processor, further cause the first client device to:

transmit, to the second client device, and as part of the communication session, a notification message indicating that the virtual assistant is being utilized in relation to the communication session.

45. The first client device of claim 20, wherein the first task comprises performing a financial transaction between the first user and the second user.

46. The first client device of claim 45, wherein the instructions, when executed by the computer processor, further cause the first client device to:

identify, by the virtual assistant of the first client device, a set of financial applications installed on both the first client device and the second client device that are capable of completing the financial transaction;

transmit, to the second client device, a third message as part of the communication session, the third message prompting the second user to select a financial application from the set of financial applications to complete the financial transaction;

receive, from the second client device, a first reply message identifying the financial application selected from the set of financial applications selected by the second user to complete the financial transaction; and execute the financial application.

47. The first client device of claim 20, wherein the first task comprises scheduling a meeting including the first user and the second user.

48. The first client device of claim 47, wherein the instructions, when executed by the computer processor, further cause the first client device to:
  identify, based on calendar data for the first user and the second user, a set of candidate times for the meeting;
  place a temporary hold on the set of candidate times, wherein the set of candidate times appear booked in calendars of the first user and the second user while the temporary hold is in place;
  present the first user and the second user with a poll to select from the set of candidate times, the poll presented as part of the communication session; and
  schedule the meeting during one of the candidate times based on response data received from the first user and the second user to the poll.

49. The first client device of claim 20, wherein the first task comprises determining an estimated time of arrival for the second user.

50. The first client device of claim 49, wherein determining the estimated time of arrival for the second user comprises:
  requesting authorization to access location information of the second user; and
  in accordance with a determination that the second user selects to authorize access to the location information of the second user:
    gathering the location information of the second user; and
    displaying, based on the location information of the second user, the estimated time of arrival the second user.

51. The first client device of claim 20, wherein the virtual assistant of the first client device determines, based on a semantic analysis of the first message, that the first message identifies the first task with which the virtual assistant can assist the first user.

52. The first client device of claim 20, wherein the displayed response corresponds to a suggestion generated by the virtual assistant of the first client device.

53. The first client device of claim 20, wherein the user selection of the additional content authorizes information to be sent to the second client device, wherein the information corresponds to the first task.

54. The first client device of claim 20, wherein the instructions, when executed by the computer processor, further cause the first client device to:
  after transmitting, to the second client device, the second message:
    receive, from the second client device, a response to the second message; and
    display, as part of the communication session, the response to the second message.

* * * * *